US012698300B2

(12) United States Patent
Nakayama et al.

(10) Patent No.: US 12,698,300 B2
(45) Date of Patent: Aug. 4, 2026

(54) RUTHENIUM COMPLEX, PRODUCTION METHOD OF THE COMPLEX, AND PRODUCTION METHOD OF OPTICALLY ACTIVE SECONDARY ALCOHOLS USING THE COMPLEX AS CATALYST

(71) Applicant: TAKASAGO INTERNATIONAL CORPORATION, Tokyo (JP)

(72) Inventors: Yuji Nakayama, Kanagawa (JP); Yamato Yuki, Kanagawa (JP); Kazuhiko Sakaguchi, Kanagawa (JP); Nao Tamaki, Kanagawa (JP)

(73) Assignee: TAKASAGO INTERNATIONAL CORPORATION, Tokyo (JP)

( * ) Notice: Subject to any disclaimer, the term of this patent is extended or adjusted under 35 U.S.C. 154(b) by 567 days.

(21) Appl. No.: 18/031,999

(22) PCT Filed: Sep. 29, 2021

(86) PCT No.: PCT/JP2021/035933

§ 371 (c)(1),
(2) Date: Apr. 14, 2023

(87) PCT Pub. No.: WO2022/085384

PCT Pub. Date: Apr. 28, 2022

(65) Prior Publication Data

US 2023/0391812 A1 Dec. 7, 2023

(30) Foreign Application Priority Data

Oct. 19, 2020 (JP) ................................ 2020-175074

(51) Int. Cl.
*C07F 15/00* (2006.01)
*B01J 31/24* (2006.01)

(52) U.S. Cl.
CPC ....... *C07F 15/0046* (2013.01); *B01J 31/2409* (2013.01); *C07B 2200/07* (2013.01)

(58) Field of Classification Search
CPC ... C07C 253/30; C07C 255/53; C07C 29/145; C07C 33/22; C07C 67/31; C07C 69/76; C07F 15/0046
See application file for complete search history.

(56) References Cited

U.S. PATENT DOCUMENTS

| | | | | |
|---|---|---|---|---|
| 6,720,439 | B1 | 4/2004 | Ohkuma et al. | |
| 9,328,079 | B2 * | 5/2016 | Ohkuma .............. | C07D 241/42 |
| 2013/0041151 | A1 | 2/2013 | Nara et al. | |
| 2015/0210657 | A1 | 7/2015 | Ohkuma et al. | |

FOREIGN PATENT DOCUMENTS

| | | | |
|---|---|---|---|
| JP | 2003-104993 | A | 4/2003 |
| JP | 2011-246435 | A | 12/2011 |
| WO | 2007/017141 | A1 | 2/2007 |
| WO | 2007/065891 | A1 | 6/2007 |
| WO | 2011/135753 | A1 | 11/2011 |

OTHER PUBLICATIONS

Ohkuma, Takeshi et al., "Asymmetric Hydrogenation of Alkenyl, Cyclopropyl, and Aryl Ketones. $RuCl_2$(xylbinap)(1,2-diamine) as a Precatalyst Exhibiting a Wide Scope", J. Am. Chem. Soc., 1998, vol. 120, pp. 13529-13530.

Ohkuma, Takeshi et al., "trans-RuH($\eta^1$-$BH_4$)(binap)(1,2-diamine): A Catalyst for Asymmetric Hydrogenation of Simple Ketones under Base-Free Conditions", J. Am. Chem. Soc, 2002, vol. 124, pp. 6508-6509.

Sandoval, Christian A. et al., "Solution structures and behavior of trans-RuH($\eta^1$-$BH_4$) (binap)(1,2-diamine) complexes", Magn. Reson. Chem., 2006, vol. 44, pp. 66-75.

Matsumura, Kazuhiko et al., "Chiral Ruthenabicyclic Complexes: Precatalysts for Rapid, Enantioselective, and Wide-Scope Hydrogenation of Ketones", J. Am. Chem. Soc., 2011, vol. 133, pp. 10696-10699.

International Search Report (PCT/ISA/210) issued Nov. 30, 2021 by the International Searching Authority in International Patent Application No. PCT/JP2021/035933.

(Continued)

*Primary Examiner* — Pancham Bakshi

(74) *Attorney, Agent, or Firm* — Sughrue Mion, PLLC

(57) ABSTRACT

A ruthenium complex of the following formula (1), a production method thereof, and uses of the ruthenium complex are disclosed. A method for producing the ruthenium complex includes a process of reacting a specific ruthenium complex with a borohydride compound. The ruthenium complex can be used as a catalyst in a production of optically active secondary alcohols.

(1)

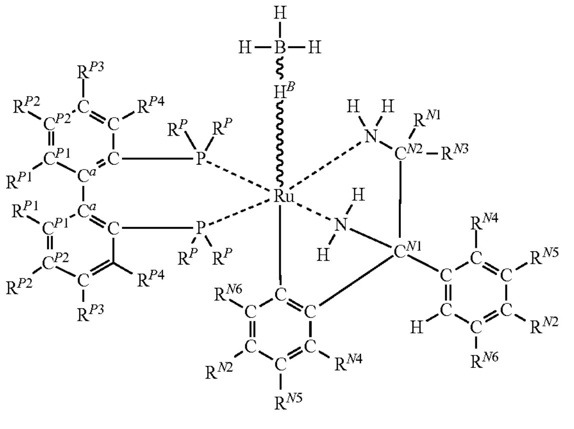

7 Claims, 14 Drawing Sheets

(56) References Cited

OTHER PUBLICATIONS

Written Opinion (PCT/ISA/237) issued Nov. 30, 2021 by the International Searching Authority in International Patent Application No. PCT/JP2021/035933.
Communication dated Feb. 25, 2025, issued by the China National Intellectual Property Administration in Chinese Application No. 202180071396.7.
Ohkuma et al., "Asymmetric Hydrogenation of tert-Alkyl Ketones", Journal of the American Chemical Society, 2005, vol. 127, No. 23, pp. 8288-8289 (2 pages total).
Extended European Search Report dated Oct. 29, 2024, issued by the European Patent Office in counterpart European Patent Application No. 21882525.5.

* cited by examiner

RUTHENIUM COMPLEX, PRODUCTION METHOD OF THE COMPLEX, AND PRODUCTION METHOD OF OPTICALLY ACTIVE SECONDARY ALCOHOLS USING THE COMPLEX AS CATALYST

CROSS-REFERENCE TO RELATED APPLICATIONS

This application is a National Phase Entry of PCT International Application No. PCT/JP2021/035933, filed on Sep. 29, 2021, which claims priority to Japanese Patent Application No. 2020-175074 filed on Oct. 19, 2020, the contents of all of which are incorporated herein by reference in their entirety.

TECHNICAL FIELD

The present invention relates to a novel ruthenium complex, a method for producing the complex and a method for producing optically active secondary alcohols using the complex as a catalyst.

BACKGROUND ART

As optically active secondary alcohols are extremely important compounds for pharmaceuticals, agrochemicals, functional materials, perfumes and synthetic intermediates, their production methods are still being actively researched and developed. Among these production methods, catalytic asymmetric hydrogenation of unsymmetrical ketones using molecular hydrogen as a reducing agent is one of the most important from a viewpoint of SDG's and green chemistry, which have recently been the focus of attention, due to its superior atomic efficiency and significant reduction of waste.

Since catalysts with excellent catalytic activity, asymmetric induction ability, and stability are essential for the industrialization of such catalytic asymmetric hydrogenation, their development has been vigorously pursued over the years. Among the catalysts developed in this way, ruthenium complexes such as $RuCl_2$(dm-hinap)(dpen) and $RuCl_2$(dm-binap)(daipen) [Non-Patent Literature 1], RuH($\eta^1$-$BH_4$)(dm-binap)(dpen) [Non-Patent Literature 2], and RuH($\eta^1$-$BH_4$)(t-binap)(daipen) [Non-Patent Literature 3] developed by Ryoji Noyori who was awarded the Nobel Prize in Chemistry in 2001 and his colleagues, are known to exhibit excellent catalytic activity and asymmetric induction ability in the asymmetric hydrogenation of unsymmetrical ketones. Several years later, a ruthenabicyclic complex [Patent Literature 1 and Non-Patent Literature 4] which is an advanced form of the aforementioned ruthenium complexes has been developed, and it has been reported that the ruthenabicyclic complex has even better catalytic activity than the complexes developed by Noyori and his colleagues. For reference, structural formulas of these ruthenium complexes are shown in following Formula 1.

Formula 1

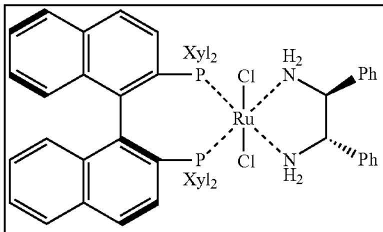

$RuCl_2$(dm-binap)(dpen)

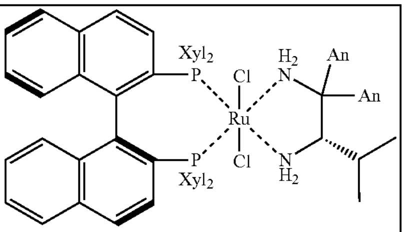

$RuCl_2$(dm-binap)(daipen)

[Non-Patent Literature 1]

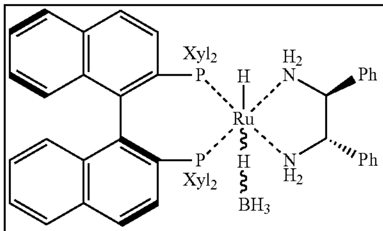

RuH($\eta^1$-$BH_4$)(dm-binap)(dpen)

[Non-Patent Literature 2]

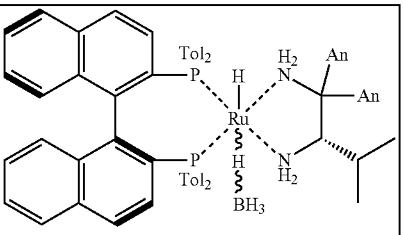

RuH($\eta^1$-$BH_4$)(t-binap)(daipen)

[Non-Patent Literature 3]

-continued

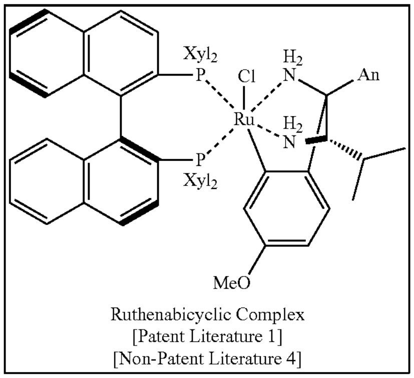

Ruthenabicyclic Complex
[Patent Literature 1]
[Non-Patent Literature 4]

[In the above structural formulas, An represents a 4-methoxyphenyl group, Ph represents a phenyl group, Tol represents a 4-rnethylphenyl group, and Xyl represents a 3,5-dimethylphenyl group.]

CITATION LIST

Patent Literature

Patent Literature 1: WO2011/135753.

Non-Patent Literature

Non-Patent Literature 1: Takeshi Ohkunia, Masatoshi Koizumi, Henri Doucet, Trang Pham, Masami Kozawa, Kunihiko Murata, Eiji Katayama, Tohru Yokozawa, Takao Ikariya, and Ry6i Noyori, J. Am. Chem. Soc., 1998, 120, 13529.

Non-Patent Literature 2: Takeshi Ohkuma, Masatoshi Koizumi, Kilian Muniz, Gerhard Hilt, Chizuko Kabuto, and Ryoji Noyori, J. Am. Chart. Soc., 2002, 124, 6508.

Non-Patent Literature 3: Christian A. Sandoval, Yoshiki Yamaguchi, Takeshi Ohkuma, Koichi Kato, and Ryoji Noyori, Magn. Resort. Chem., 2006, 44, 66.

Non-Patent Literature 4: Kazuhiko Matsumura, Noriyoshi Arai, Takao Saito, Noboru Sayo, and Takeshi Ohkuma, J. Am. Chem. Soc., 2011, 133, 10696.

SUMMARY OF INVENTION

Technical Problem

Although a number of catalysts for the asymmetric hydrogenation have been developed to date as mentioned above, there are still issues that need to be improved at present. For example, all of the ruthenium complexes described in Non-Patent Literature 1 require the addition of base to activate them as catalysts. Therefore, it is difficult to use the unsymmetrical ketone that is unstable under basic conditions as a substrate. Even if the unsymmetrical ketone that is stable under basic conditions is used as a substrate, complicated. weighing operations using special equipment such as a grove box are necessary to carry out the reaction because potassium tert-butoxide, which is commonly used as a base for the reaction, easily absorbs moisture to decompose. The ruthena.bicyclic complex described in Patent Literature 1 and Non-patent Literature 4, which is the advanced form of the aforementioned complexes, also requires a base to activate itself, so these issues still remain.

On the other hand, the ruthenium complex described in Non-Patent Literature 2, obtained by the reaction of the complex in Non-Patent Literature 1 with sodium borohydride, exhibits catalytic activity without the addition of a base. Therefore, this complex enables us to expand the range of substrate application and simplify the reaction operation compared to the aforementioned ruthenium complexes and ruthena.bicyclic complex. However, this complex is difficult to isolate and purify by crystallization due to its lack of crystallinity and stability and must be prepared immediately before use in order to achieve its full performance. Furthermore, the ruthenium complex described in Non-Patent Literature 3, obtained by a similar reaction to the one mentioned above, also shows excellent catalytic activity without base, but is extremely unstable and decomposes within a few hours even in deuterated benzene, making it difficult to synthesize large quantity of this complex industrially and utilize it for the catalytic asymmetric hydrogenation. Therefore, the catalyst for asymmetric hydrogenation that does not require activation with a base and has excellent crystallinity, stability, catalytic activity, and asymmetric induction ability is still strongly desired from a viewpoint of improving the production efficiency of optically active secondary alcohols.

The present invention has been made in view of the current situation discussed above. That is, the objects of the invention are to provide a novel ruthenium complex having the following features: 1) no need for the addition of base to activate itself as a catalyst, 2) excellent crystallinity and stability, 3) easiness of large-scale synthesis and long-term storage. 4) excellent catalytic activity and asymmetry induction ability in asymmetric hydrogenation; and to provide an efficient production of optically active secondary alcohols using this complex as a catalyst.

Solution To Problem

In the course of investigation to solve the issues discussed above, the inventors attempted the reaction of the ruthenabicyclic complex described in Patent Literature 1 with sodium borohydride (Formula 3), inspired by the synthesis of the ruthenium complex described in Non-Patent Literature 3 (Formula 2). As a result, a novel complex of unknown structure was formed, but very strangely, neither the hydrido (H) ligand nor the $\eta^1$-borohydride ($\eta^1$-$BH_4$) ligand that should be introduced by the reaction could be observed by proton nuclear magnetic resonance spectroscopy ($^1$H NMR) analysis of this complex (FIG. 1) [According to Non-Patent Literature 3, the H ligand is observed around −13.9 ppm and the $\eta^1BH_4$ ligand around −0.24 ppm in $^1$H NMR].

Formula 2

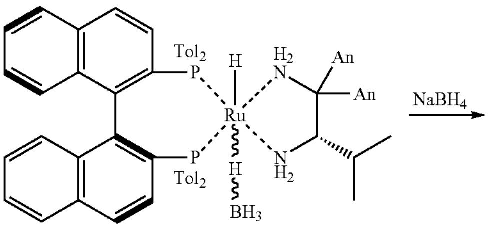

$RuCl_2$(t-binap)(daipen)

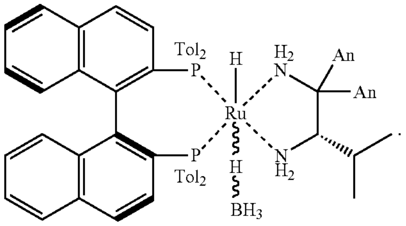

RuH($\eta^1$~$BH_4$)(t-binap)(daipen)
$^1$H NMR: -13.89 (H), -0.24 ($\eta^1$-$BH_4$)

Formula 3

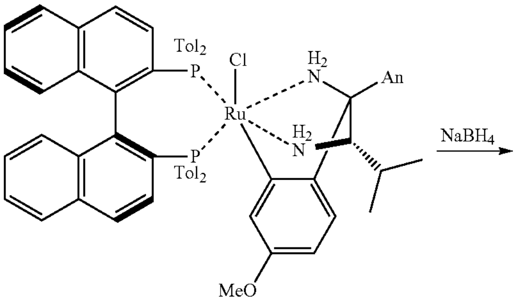

Ruthenabicyclic Complex

-continued

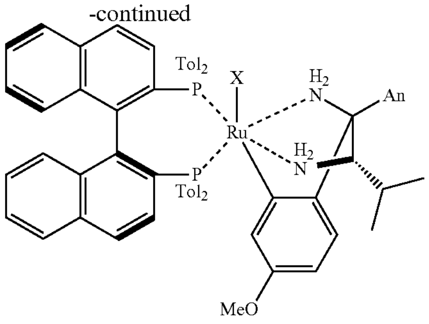

Structure-Unknown Complex
(X = H or $\eta^1$-$BH_4$?)

Based on this finding, the inventors further studied the novel ruthenium complex and found that it has unexpectedly excellent crystallinity and stability. Taking advantage of these features, the inventors decided to prepare a single crystal of this complex to perform X-ray crystallography. The result of analysis revealed that the $\eta^1$-$BH_4$ ligand, not the H ligand, is surprisingly incorporated into the voids of this complex, and that the free motion of this ligand is inhibited and therefore could not be observed by $^1$H NMR. For reference, a typical result of X-ray crystallography (thermal ellipsoid plot) of the novel ruthenium complex is shown in following FIG. 2, but the invention is not limited to this figure in any way.

Furthermore, the inventors found that the novel complex exhibits catalytic activity without the addition of a base in a hydrogen atmosphere and excellent catalytic activity and asymmetric induction ability in the asymmetric hydrogenation of unsymmetrical ketones, despite the absence of H ligand on the complex that acts as a reducing agent. The inventors have completed the present invention through further investigation based on these basic findings.

Specifically, the present invention includes following [1] to [7].

[1] A ruthenium complex represented by following general formula (1):

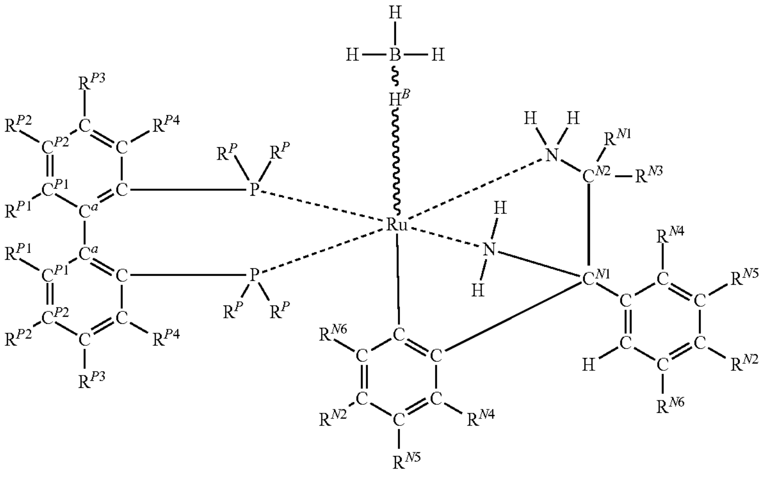

(1)

[wherein a solid line represents a single bond, a double line represents a double bond, a dashed line represents a coordinate bond, and a wavy line represents three-center two-electron bond; B represents a boron atom, N represents a nitrogen atom, and P represents a phosphorus atom; H and $H^B$ each represents a hydrogen atom; C, $C^{P1}$, $C^{P2}$, $C^a$, $C^{N1}$, and $C^{N2}$ each represents a carbon atom; Ru represents a divalent ruthenium ion; $R^P$ represents a group selected from the group consisting of an alkyl group, a cycloalkyl group, a heteroaryl group, and an aryl group which may have a substituent; $R^{P1}$, $R^{P2}$, $R^{P3}$, and $R^{P4}$ each independently represents a hydrogen atom, or a group selected from the group consisting of an alkyl group, alkenyl group, an alkoxy group, a halogenoalkoxy group, a hydroxy group, and a halogen° group; $R^{P1}$ and $R^{P2}$ may combine with each other to form a ring with $C^{P1}$ and $C^{P2}$; $R^{N1}$ and $R^{N3}$ each independently represents a hydrogen atom, or a group selected from the group consisting of an alkyl group, an aryl group, and an aralkyl group; $R^{N2}$, $R^{N4}$, $R^{N5}$, and $R^{N6}$ each independently represents a hydrogen atom, or a group selected from the group consisting f an alkyl group, a halogenoalkyl group, an alkoxy group, and a halogeno group].

[2] The ruthenium complex according to the above [1], wherein $R^P$ is an aryl group which may have a substituent.

[3] The ruthenium complex according to the above [1] or [2], wherein $R^{P3}$, $R^{P4}$, $R^{N3}$, $R^{N4}$, $R^{N5}$, and $R^{N6}$ are all hydrogen atoms.

[4] The ruthenium complex according to any one of the above [I] to [3], which is an optically active substance.

[5] A method for producing the ruthenium complex according to any one of the above [1] to [4], comprising a process of reacting a ruthenium complex represented by following general formula (2) with a borohydride compound, and a halogeno group; $R^{P1}$ and $R^{P2}$ may combine with each other to form a ring with $C^{P1}$ and $C^{P2}$, $R^{N1}$ and $R^{N3}$ each independently represents a hydrogen atom, or a group selected from the group consisting of an alkyl group, an aryl group, and an aralkyl group; $R^{N2}$, $R^{N4}$, $R^{N5}$, and $R^{N6}$ each independently represents a hydrogen atom, or a group selected from the group consisting of an alkyl group, a halogenoalkyl group, an alkoxy group, and a halogen group).

[6] The method for producing a ruthenium complex according to the above [5], wherein the borohydride compound is sodium borohydride.

[7] A method for producing optically active secondary alcohols by catalytic asymmetric hydrogenation of unsymmetrical ketones using the ruthenium complex according to the above [4] as a catalyst.

ADVANTAGEOUS EFFECTS OF INVENTION

The ruthenium complex represented by the general formula (1) [hereinafter referred to as ruthenium complex (1)] can be easily synthesized, has excellent crystallinity, can be isolated and purified by crystallization or recrystallization, and can be stored for a long time with excellent stability in air, making it suitable for mass production during industrialization.

In addition, the ruthenium complex (1) exhibits excellent catalytic activity and asymmetric induction ability in asymmetric hydrogenation of unsymmetrical ketones even without the addition of a base, so that substrates that tend to decompose under basic conditions can be used in the reaction, and complicated weighing operations of a base using special equipment are not necessary. Therefore, optically

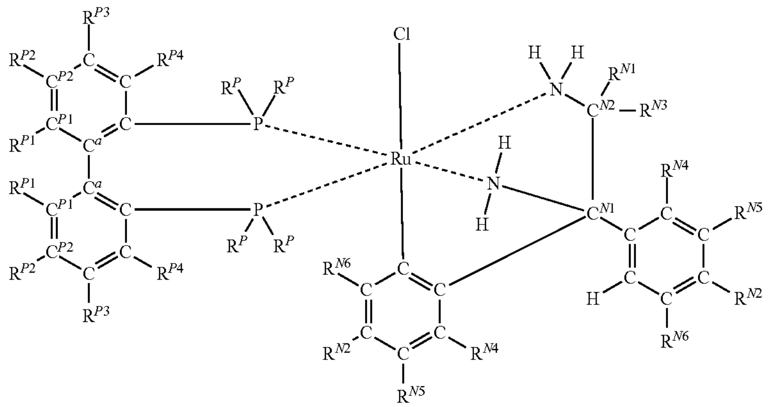

(2)

(wherein a solid line represents a single bond, a double line represents a double bond, and a dashed line represents a coordinate bond; Cl represents a chlorine atom, H represents a hydrogen atom, N represents a nitrogen atom, and P represents a phosphorus atom; C, $C^{P1}$, $C^{P2}$, $C^a$, $C^{N1}$, and $C_{N2}$, each represents a carbon atom; Ru represents a divalent ruthenium ion; $R^P$ represents a group selected from the group consisting of an alkyl group, a cycloalkyl group, a heteroaryl group, and an aryl group which may have a substituent; $R^{P1}$, $R^{P2}$, $R^{P3}$, and $R^{P4}$ each independently represents a hydrogen atom, or a group selected from the group consisting of an alkyl group, an alkenyl group, an alkoxy group, a haloaenoalkoxy group, a hydroxy group, active secondary alcohols of high industrial value can be produced more efficiently by using the ruthenium complex (1) as a catalyst.

DESCRIPTION OF EMBODIMENTS

Figure 1:
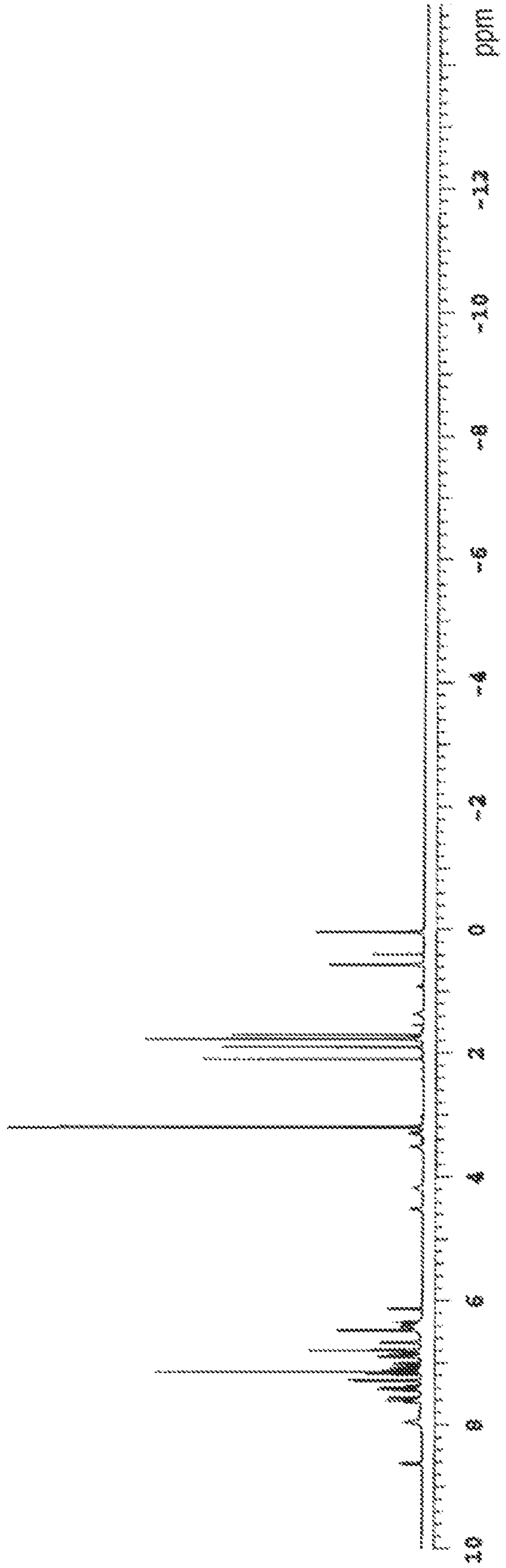
FIG. 1 is a spectrum showing the results of proton nuclear magnetic resonance spectroscopy ($^1$H NMR) of a novel complex formed by the reaction of the ruthenabicyclic complex described in the Patent Literature 1 with sodium borohydride.
Figure 2:
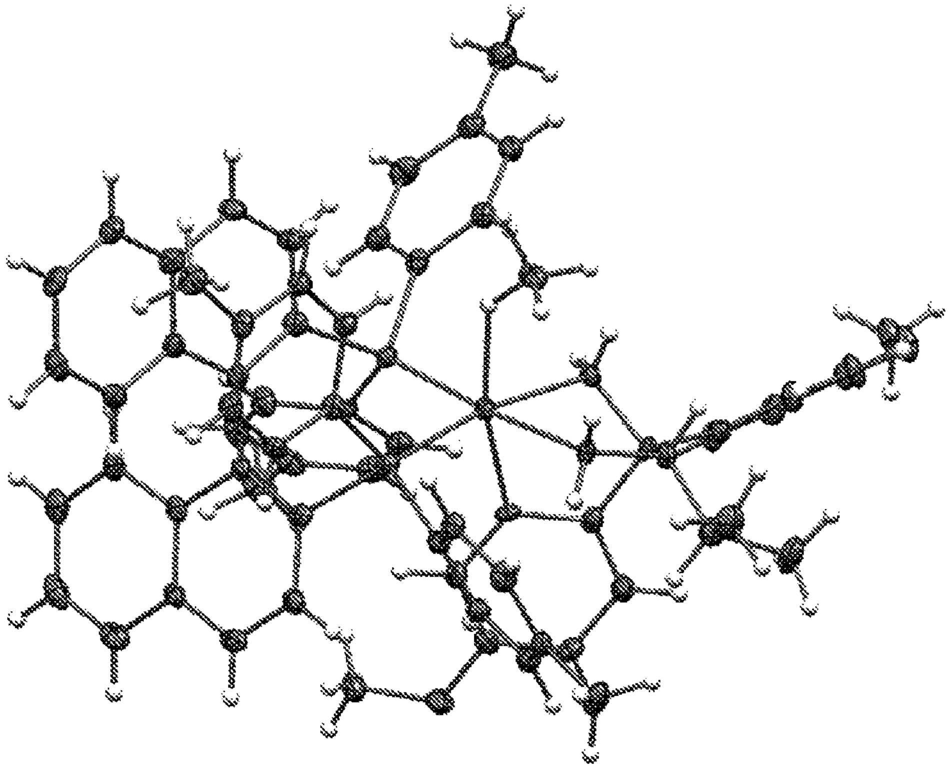
FIG. 2 shows a typical result of X-ray crystallography (thermal ellipsoid plot) of the ruthenium complex of the present invention.

Hereinafter, the ruthenium complex (1) of the present invention is described in detail. In the general formula (1). a solid line represents a single bond, a double line represents a. double bond, a dashed line represents a coordinate bond, and a wavy line represents three-center two-electron bond. B represents a boron atom, N represents a nitrogen atom, and P represents a phosphorus atom. H and $H^B$ both represent a hydrogen atom. C, $C^{P1}$, $C^{P2}$, $C^a$, $C^{N1}$, and $C^{N2}$ all represent a carbon atom. Ru represents a divalent ruthenium ion. $R^P$ represents a group selected from the group consisting of an alkyl group, a cycloalkyl group, a heteroaryl group, and an aryl group which may have a substituent, and preferably an aryl group which may have a substituent. $R^{P1}$, $R^{P2}$, $R^{P3}$, and $r^{P4}$ each independently represent a. hydrogen atom, or a group selected from the group consisting of an alkyl group, an alkenyl group, an alkoxy group, a halogenoalkoxy group, a hydroxy group, and a halogeno group, and preferably a hydrogen atom. or a group selected from the group consisting of an alkyl group, an alkenyl group, an alkoxy group, and a hydroxy group. $R^{P1}$ and $R^{P2}$ may combine with each other to form a ring with $C^{P1}$ and $C^{P2}$. $R^{N1}$ and $R^{N3}$ each independently represent a hydrogen atom, or a group selected from the group consisting of an alkyl group, an aryl group, and an aralkyl group, and preferably a hydrogen atom or an alkyl group. $R^{N2}$, $R^{N4}$ $R^{N5}$, and $R^{N6}$ each independently represent a hydrogen atom, or a group selected from the group consisting of an alkyl group, a halogenoalkyl group, an alkoxy group, and a halogen° group, and preferably a hydrogen atom or an alkoxy group.

Next, the wavy lines in the general formula (1) are described in more detail. The wavy lines between Ru—$H^B$ and $H^B$B represent a three-center two-electron bond, that is, a state in which the three atoms of Ru, $H^B$, and B are sharing two electrons, respectively. Due to the nature of this three-center two-electron bond, not only the bond between Ru and $H^B$, but also the bond between $H^B$ and B can be cleaved to activate. Therefore, unlike ordinary ruthenium complexes having simple anionic ligands, the ruthenium complex (1) of the present invention is considered to exhibit catalytic activity even in the absence of a base.

Next, the $R^P$ in the general formula (1) is described in more detail. The alkyl group in $R^P$ may be linear or branched, for example, an alkyl group having 1 to 12 carbon atoms, preferably an alkyl group having 1 to 8 carbon atoms, and more preferably an alkyl group having 1 to 4 carbon atoms; specific examples thereof include a methyl group, an ethyl group, an n-propyl group, an isopropyl group, an n-butyl group, an s-butyl group, an isobutyl group, and a tort-butyl group.

The cycloalkyl group in $R^P$ may he monocyclic or polycyclic, for example, a cycloalkyl group having 3 to 20 carbon atoms, preferably a cycloalkyl group having 3 to 15 carbon atoms, and more preferably a cycloalkyl group having 3 to 10 carbon atoms; specific examples thereof include a cyclopropyl group, a cyclobutyl group, a cyclopentyl group, a cyclohexyl group, a 1-adaman0 group, and a 2-adamantyl group.

Examples of the heteroaryl group in R' include a heteroaryl group derived from a 5-membered aromatic heterocycle containing an oxygen atom or a sulfur atom; specific examples thereof include a 2-furyl group, a 3-furyl group, a 2-thienyl group, and a 3-thienyl group.

Examples of the aryl group in $R^P$ include an aryl group having 6 to 18 carbon atoms, preferably an aryl group having 6 to 14 carbon atoms, and more preferably an aryl group having 6 to 10 carbon atoms; specific examples thereof include a phenyl group, a 1-naphthyl group, and a 2-naphthyl group; preferred specific examples thereof include a phenyl group. Moreover, the aryl group may also have a substituent.

Examples of the substituent that the aryl group in $R^P$ may have include an alkyl group, a halogenoalkyl group, an alkoxy group, and a dialkylamino group, and preferably an alkyl group. Examples of the alkyl group in these substituents include an alkyl group similar to the group detailed in the description of $R^P$; preferred specific examples thereof include a methyl group.

Examples of the halogenoalkyl group in these substituents include a halogenoalkyl group formed by substituting at least one hydrogen atom on the alkyl group described above with a halogen atom; specific example thereof include a trifluoromethyl group.

The alkoxy group in these substituents may be linear or branched, for example, an alkoxy group having 1 to 12 carbon atoms, preferably an alkoxy group having 1 to 8 carbon atoms, and more preferably an alkoxy group having 1 to 4 carbon atoms; specific examples thereof include a methoxy group, an ethoxy group, an n-propoxy group, an isopropoxy group, an n-butoxy group, an s-butoxy group, an isobutoxy group, and a tert-butoxy group.

Examples of the dialkylamino group in these substituents include a dialkylamino group formed by substituting two hydrogen atoms on an amino group with the alkyl groups described above; specific example thereof include an N,N-dimethylamino group.

Next, the $R^{P1}$, $R^{P2}$, $R^{P3}$, and $R^{P4}$ in the general formula (1) are described in more detail. Examples of the alkyl group in $R^{P1}$ to $R^{P4}$ include an alkyl group having 1 to 9 carbon atoms, preferably an alkyl group having 1 to 6 carbon atoms, and more preferably an alkyl group having 1 to 3 carbon atoms; specific examples thereof include a methyl group, an ethyl group, and an n-propyl group.

Examples of the alkenyl group in $R^{P1}$ and $R^{P4}$ include an alkenyl group having 2 to 9 carbon atoms, preferably an alkenyl group having 2 to 6 carbon atoms, and more preferably an alkenyl group having 2 to 3 carbon atoms; specific examples thereof include a vinyl group and a 1-propenyl group; preferred specific examples thereof include a vinyl group.

The alkoxy group $R^{P4}$ to $R^{P4}$ may be linear or branched, for example, an alkoxy group having 1 to 9 carbon atoms, preferably an alkoxy group having 1 to 6 carbon atoms, and more preferably an alkoxy group having 1 to 3 carbon atoms; specific examples thereof include a methoxy group, an ethoxy group, an n-propoxy group, and an isopropoxy group; preferred specific examples thereof include a methoxy group.

Examples of the halogenoalkoxy group in $R^{P1}$ to $R^{P4}$ include a halogenoalkoxy group formed by substituting at least one hydrogen atom on the alkoxy group described above with a halogen atom; specific examples thereof include a difluoromethoxy group.

Specific examples of the halogeno group in $R^{P1}$ to $R^{P4}$ include a fluoro group, a chloro group, a bronco group, and an iodo group.

In addition, $R^{P1}$ and $R^{P2}$ may combine with each other to form a ring with $C^{P1}$ and $C^{P2}$. Hereinafter, preferred specific examples of this ring formation mode are shown by following general formulas (1-A) to (1-F):

(1-A)

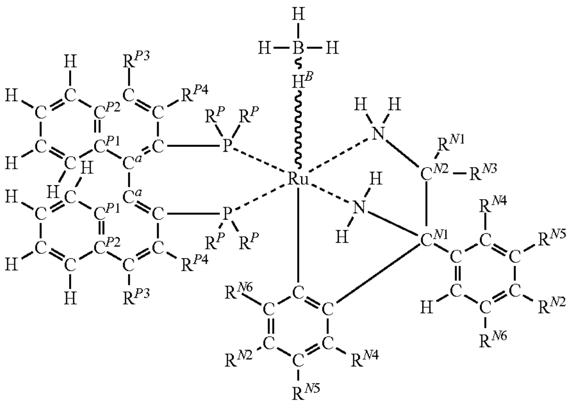

(1-B)

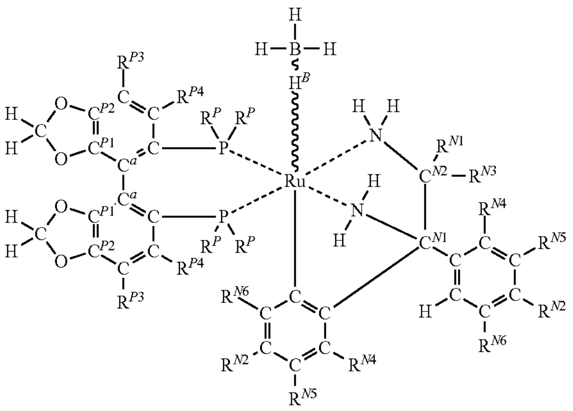

(1-C)

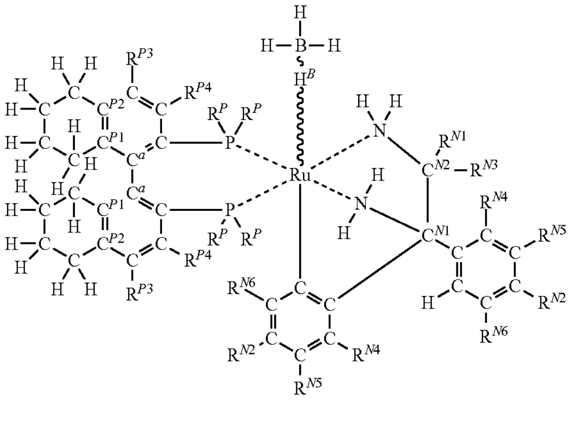

-continued (1-D)

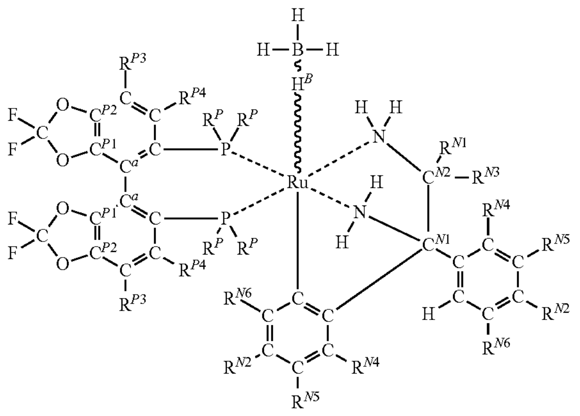

(1-E)

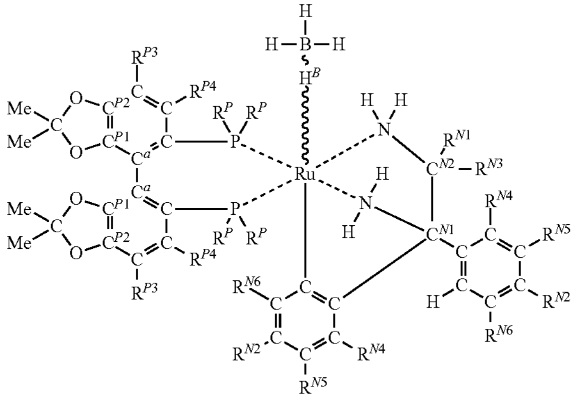

(1-F)

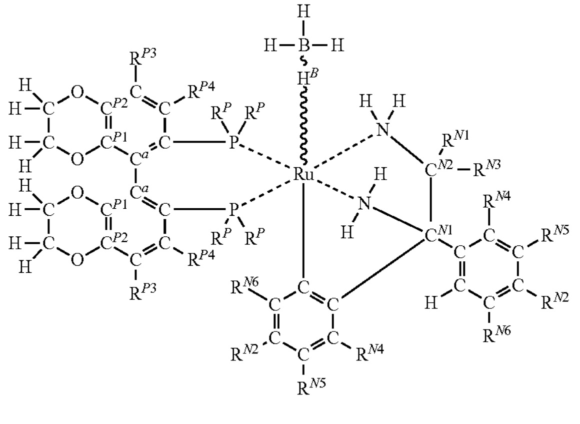

[In the general formulas (1-A) to (1-F), a solid line, a double line, a dashed line, a wavy line, B, N, P, H, $H^B$, C, $C^{P1}$, $C^{P2}$, $C^a$, $C^{N1}$, $C^{N2}$, Ru, $R^P$, $R^{P3}$, $R^{P4}$, $R^{N1}$, $R^{N2}$, $R^{N3}$, $R^{N4}$, $R^{N5}$, and $R^{N6}$ are all the same as those defined in the description of the general formula (1); O represents an oxygen atom, and F represents a fluorine atom; Me represents a methyl group.]

Next, $R^{N1}$ to $R^{N6}$ in the general formula (1) are described in more detail. Examples of the alkyl group in $R^{N1}$ and $R^{N3}$ include a. group similar to the alkyl group detailed in the description of $R^P$; preferred specific examples thereof include an isopropyl group. Examples of the aryl group in $R^{N1}$ and $R^{N3}$ include a group similar to the aryl group detailed in the description of $R^P$. Examples of the aralkyl group in $R^{N1}$ and $R^{N3}$ include an aralkyl group formed by substituting at least one hydrogen atom on the alkyl group described above with the aryl group described above; specific examples thereof include a benzyl group.

Examples of the alkyl group in and $R^{N2}$, and $R^{N4}$ to $R^{N6}$ include a group similar to the alkyl group detailed in the description of $R^P$. Examples of the halogenoalkyl group in $R^{N2}$, and $R^{N4}$ to $R^{N6}$ include a halogenoalkyl group formed by substituting at least one hydrogen atom on the alkyl group described above with a halogen atom; specific examples thereof include a trifluoromethyl group. Examples of the alkoxy group in $R^{N2}$, and $R^{N4}$ to $R^{N6}$, include a group similar to the alkoxy group detailed in the description of $R^{P1}$ to $R^{P4}$; preferred specific examples thereof include a methoxy group. Examples of the halogen group in $R^{N2}$, and $R^{N4}$ to $R^{N6}$ include a group similar to the halogeno group detailed in the description of $R^{P1}$ to $R^{P4}$.

In the ruthenium complex (1) of the present invention, $C^{N1}$ becomes a chiral carbon due to its structural requirements [hereinafter, the absolute configuration of the central chirality caused by this chiral carbon is denoted by 1R and 1S], and $C^{N2}$ may also become a chiral carbon if $R^{N1}$ and $R^{N3}$ are different [hereinafter, the absolute configuration of the central chirality thus induced is denoted by 2R and 2S]. Furthermore, an axial chirality may be induced if the free rotation of the single bond between $C^1$—$C^a$ is suppressed [hereinafter, the absolute configuration of the axial chirality thus induced is denoted by aR and aS], and an octahedral chirality on Ru in the ruthenium complex (1) is secondarily induced by these central and axial chiralities. Therefore, the ruthenium complex (1) of the present invention may be a mixture of stereoisomers or a single stereoisomer derived from these chiralities, preferably a single stereoisomer from a viewpoint of its application as a catalyst.

Specific examples of the absolute configuration of octahedral chirality induced secondarily by the central and axial chiralities described above include OC-6-32-A, OC-6-32-C, OC-6-42-A, OC-6-42-C, OC-6-43-A, and OC-6-43-C due to the structural requirements of the ruthenium complex (1): preferred specific examples thereof include OC-6-32-A and OC-6-32-C.

Specific examples of a preferred form of the ruthenium complex (I) of the present invention include a ruthenium complex represented by following general formula (1') [hereinafter referred to as ruthenium complex (1')], that is, in case of $R^P$ in the general formula (1) is an aryl group which may have substituent, and $R^{P3}$, $R^{P4}$, $R^{N3}$, $R^{N4}$, $R^{N5}$, and $R^{N6}$ are all hydrogen atoms:

(1')

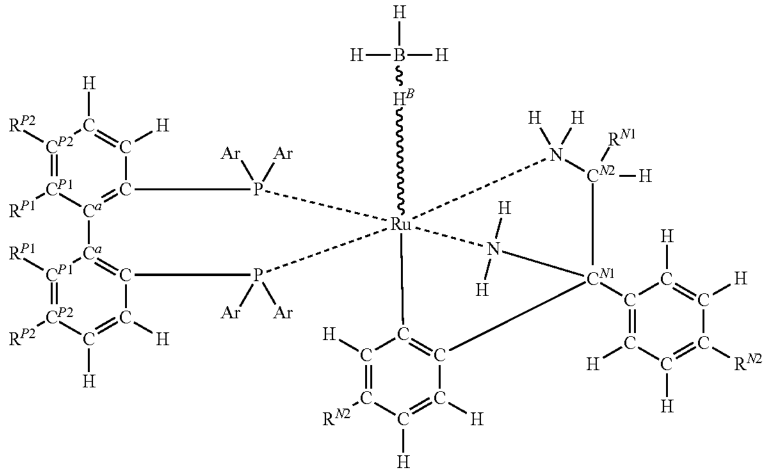

[In the general formula (1'), a solid line, a double line, a dashed line, a wavy line, B, N, P, H, $H^B$, C, $C^{P1}$, $C^{P2}$, $C^a$, $C^{N1}$, $C^{N2}$, Ru, $R^{P1}$, $R^{P2}$, $R^{N1}$, and $R^{N2}$ are all the same as those defined in the description of the general formula (1); Ar represents an aryl group which may have a substituent.]

Particularly preferred specific examples of the ruthenium complex (1) of the present invention include ruthenium complexes ((OC-6-32-A)-(1S,2R,aR)-1'-$A_1$) to ((OC-6-32-C)-(1R,2S,aS)-1'-$G_3$) shown in following Formulas 4 to 7. According to the convention, carbon atoms, hydrogen atoms on carbon atoms, and subscripts on hydrogen atoms are omitted in the preparation of the structural formulas. For clarity of the structural formulas, the absolute configuration of secondarily induced octahedral chiralities are shown separately from the compound numbers, and the possible trivial names are listed alongside the compound numbers.

Formula 4

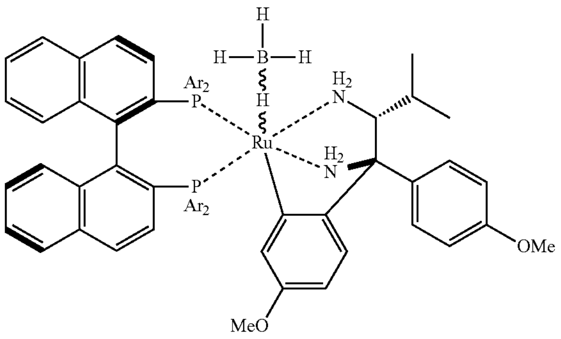

(OC-6-32-A)

Ar = Ph: (1S,2R,aR)-1'-$A_1$ (Ru($\eta^1$-$BH_4$)[(1S,2R)-daipena][(R)-binap])

Ar = Tol: (1S,2R,aR)-1'-$A_2$ (Ru($\eta^1$-$BH_4$)[(1S,2R)-daipena][(R)-t-binap])

Ar = Xyl: (1S,2R,aR)-1'-$A_3$ (Ru($\eta^1$-$BH_4$)[(1S,2R)-daipena][(R)-dm-binap])

-continued

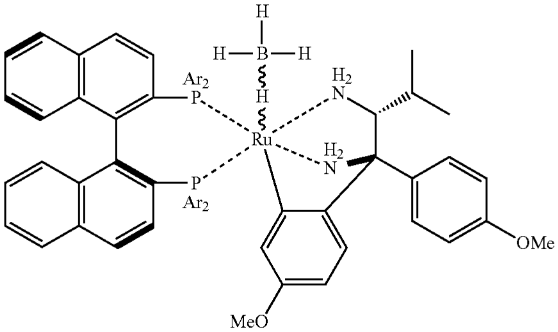

(OC-6-32-A)

Ar = Ph: (1S,2R,aS)-1'-$A_1$ (Ru($\eta^1$-$BH_4$)[(1S,2R)-daipena][(S)-binap])

Ar = Tol: (1S,2R,aR)-1'-$A_2$ (Ru($\eta^1$-$BH_4$)[(1S,2R)-daipena][(S)-t-binap])

Ar = Xyl: (1S,2R,aR)-1'-$A_3$ (Ru($\eta^1$-$BH_4$)[(1S,2R)-daipena][(S)-dm-binap])

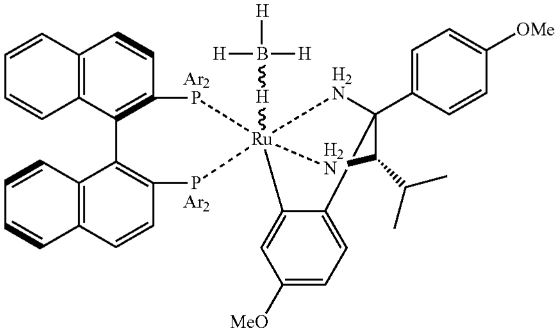

(OC-6-32-C)

Ar = Ph: (1R,2S,aR)-1'-$A_1$ (Ru($\eta^1$-$BH_4$)[(1S,2R)-daipena][(R)-binap])

Ar = Tol: (1S,2S,aR)-1'-$A_2$ (Ru($\eta^1$-$BH_4$)[(1R,2S)-daipena][(R)-t-binap])

Ar = Xyl: (1S,2R,aR)-1'-$A_3$ (Ru($\eta^1$-$BH_4$)[(1R,2S)-daipena][(R)-dm-binap])

-continued

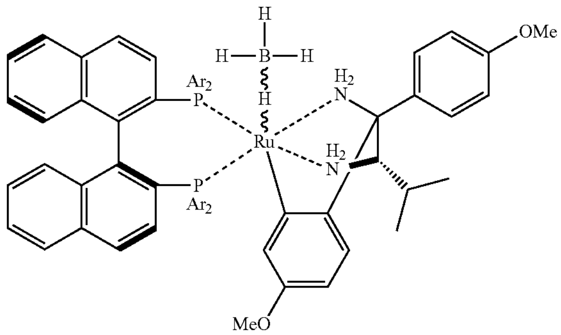

(OC-6-32-C)

Ar = Ph: (1R,2S,aS)-1′-$A_1$ (Ru($\eta^1$-$BH_4$)[(1R,2S)-daipena][(S)-binap])

Ar = Tol: (1R,2S,aS)-1′-$A_2$ (Ru($\eta^1$-$BH_4$)[(1R,2S)-daipena][(S)-t-binap])

Ar = Xyl: (1S,2R,aS)-1′-$A_3$ (Ru($\eta^1$-$BH_4$)[(1R,2S)-daipena][(S)-dm-binap])

Formula 5

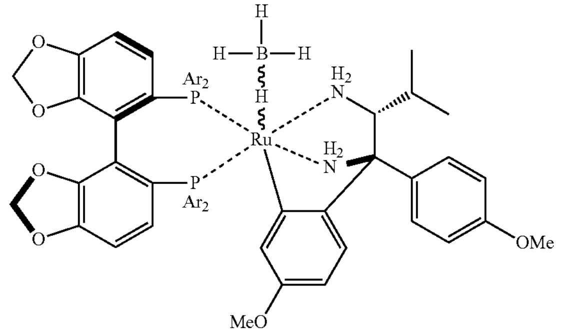

(OC-6-32-A)

Ar = Ph: (1S,2R,aR)-1′-$B_1$ (Ru($\eta^1$-$BH_4$)[(1S,2R)-daipena][(R)-segphos])

Ar = Tol: (1S,2R,aR)-1′-$B_2$ (Ru($\eta^1$-$BH_4$)[(1S,2R)-daipena][(R)-t-segphos])

Ar = Xyl: (1S,2R,aR)-1′-$B_3$ (Ru($\eta^1$-$BH_4$)[(1S,2R)-daipena][(R)-dm-segphos])

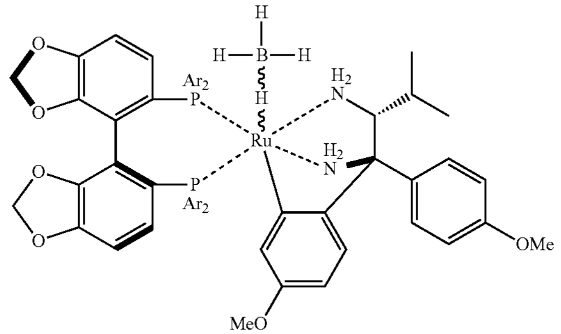

(OC-6-32-A)

Ar = Ph: (1S,2R,aS)-1′-$B_1$ (Ru($\eta^1$-$BH_4$)[(1S,2R)-daipena][(S)-segphos])

Ar = Tol: (1S,2R,aR)-1′-$B_2$ (Ru($\eta^1$-$BH_4$)[(1S,2R)-daipena][(S)-t-segphos])

Ar = Xyl: (1S,2R,aR)-1′-$B_3$ (Ru($\eta^1$-$BH_4$)[(1S,2R)-daipena][(S)-dm-segphos])

-continued

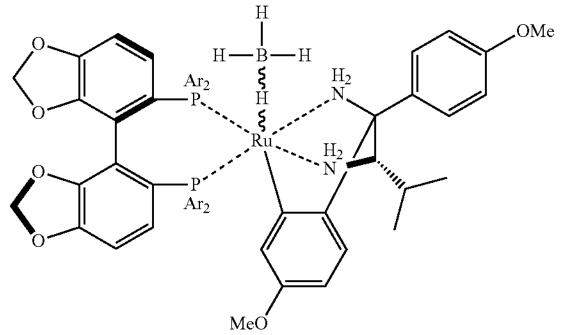

(OC-6-32-C)

Ar = Ph: (1R,2S,aR)-1′-$B_1$ (Ru($\eta^1$-$BH_4$)[(1S,2R)-daipena][(R)-segphos])

Ar = Tol: (1S,2S,aR)-1′-$B_2$ (Ru($\eta^1$-$BH_4$)[(1R,2S)-daipena][(R)-t-segphos])

Ar = Xyl: (1S,2R,aR)-1′-$B_3$ (Ru($\eta^1$-$BH_4$)[(1R,2S)-daipena][(R)-dm-segphos])

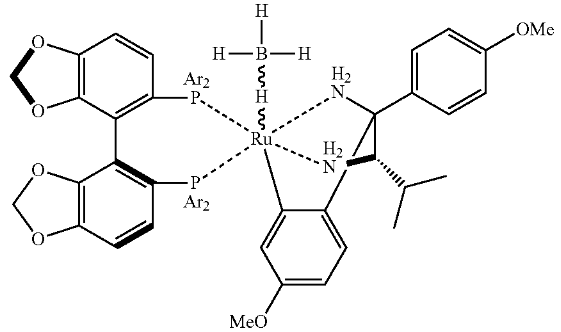

(OC-6-32-C)

Ar = Ph: (1R,2S,aS)-1′-$B_1$ (Ru($\eta^1$-$BH_4$)[(1R,2S)-daipena][(S)-segphos])

Ar = Tol: (1R,2S,aS)-1′-$B_2$ (Ru($\eta^1$-$BH_4$)[(1R,2S)-daipena][(S)-t-segphos])

Ar = Xyl: (1R,2S,aS)-1′-$B_3$ (Ru($\eta^1$-$BH_4$)[(1R,2S)-daipena][(S)-dm-segphos])

Formula 6

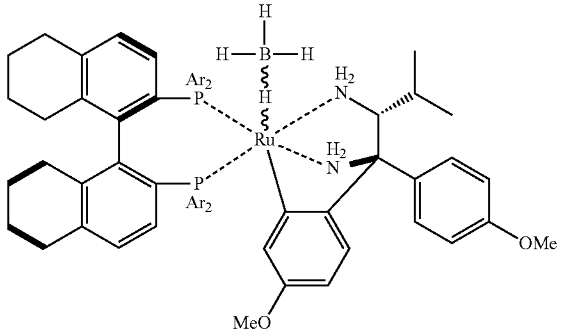

(OC-6-32-A)

Ar = Ph: (1S,2R,aR)-1′-$C_1$ (Ru($\eta^1$-$BH_4$)[(1S,2R)-daipena][(R)-$h_8$-binap])

Ar = Tol: (1S,2R,aR)-1′-$C_2$ (Ru($\eta^1$-$BH_4$)[(1S,2R)-daipena][(R)-t-$h_8$-binap])

Ar = Xyl: (1S,2R,aR)-1′-$C_3$ (Ru($\eta^1$-$BH_4$)[(1S,2R)-daipena][(R)-dm-$h_8$-binap])

-continued

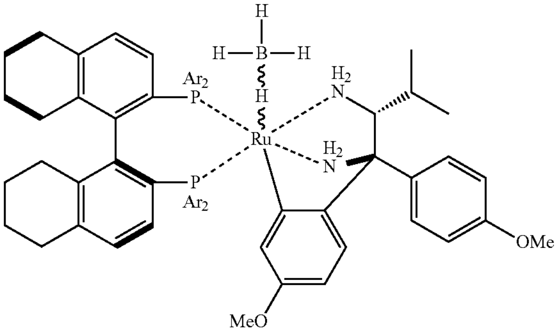

(OC-6-32-A)
Ar = Ph: (1S,2R,aS)-1′-$C_1$
(Ru($\eta^1$-$BH_4$)[(1S,2R)-daipena][(S)-$h_8$-binap])
Ar = Tol: (1S,2R,aR)-1′-$C_2$
(Ru($\eta^1$-$BH_4$)[(1S,2R)-daipena][(S)-t-$h_8$-binap])
Ar = Xyl: (1S,2R,aR)-1′-$C_3$
(Ru($\eta^1$-$BH_4$)[(1S,2R)-daipena][(S)-dm-$h_8$-binap])

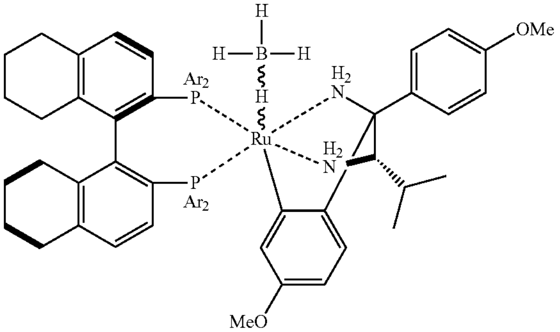

(OC-6-32-C)
Ar = Ph: (1R,2S,aR)-1′-$C_1$
(Ru($\eta^1$-$BH_4$)[(1R,2S)-daipena][(R)-$h_8$-binap])
Ar = Tol: (1S,2R,aR)-1′-$C_2$
(Ru($\eta^1$-$BH_4$)[(1R,2S)-daipena][(R)-t-$h_8$-binap])
Ar = Xyl: (1S,2R,aR)-1′-$C_3$
(Ru($\eta^1$-$BH_4$)[(1R,2S)-daipena][(R)-dm-$h_8$-binap])

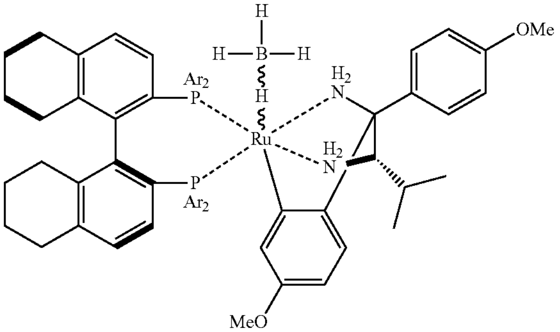

(OC-6-32-C)
Ar = Ph: (1R,2S,aS)-1′-$C_1$
(Ru($\eta^1$-$BH_4$)[(1R,2S)-daipena][(S)-$h_8$-binap])
Ar = Tol: (1S,2R,aS)-1′-$C_2$
(Ru($\eta^1$-$BH_4$)[(1R,2S)-daipena][(S)-t-$h_8$-binap])
Ar = Xyl: (1S,2R,aS)-1′-$C_3$
(Ru($\eta^1$-$BH_4$)[(1R,2S)-daipena][(S)-dm-$h_8$-binap])

-continued

Formula 7

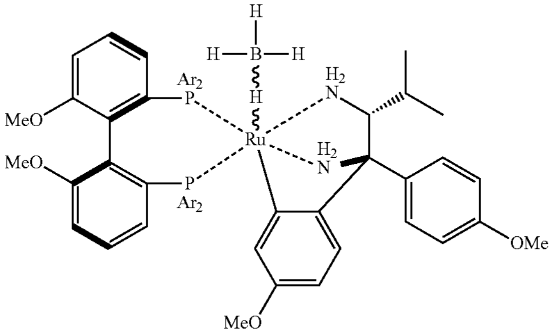

(OC-6-32-A)
Ar = Ph: (1S,2R,aR)-1′-$G_1$
(Ru($\eta^1$-$BH_4$)[(1S,2R)-daipena][(R)-meo-biphep])
Ar = Tol: (1S,2R,aR)-1′-$G_2$
(Ru($\eta^1$-$BH_4$)[(1S,2R)-daipena][(R)-t-meo-biphep])
Ar = Xyl: (1S,2R,aR)-1′-$G_3$
(Ru($\eta^1$-$BH_4$)[(1S,2R)-daipena][(R)-dm-meo-biphep])

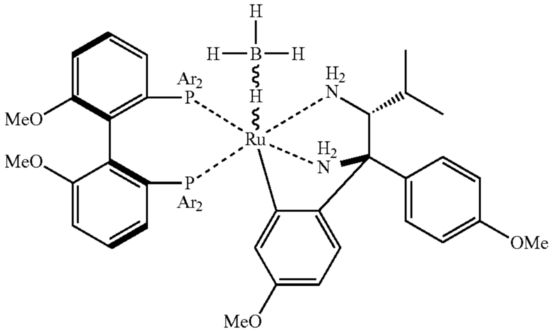

(OC-6-32-A)
Ar = Ph: (1S,2R,aS)-1′-$G_1$
(Ru($\eta^1$-$BH_4$)[(1S,2R)-daipena][(S)-meo-biphep])
Ar = Tol: (1S,2R,aS)-1′-$G_2$
(Ru($\eta^1$-$BH_4$)[(1S,2R)-daipena][(S)-t-meo-biphep])
Ar = Xyl: (1S,2R,aS)-1′-$G_3$
(Ru($\eta^1$-$BH_4$)[(1S,2R)-daipena][(S)-dm-meo-biphep])

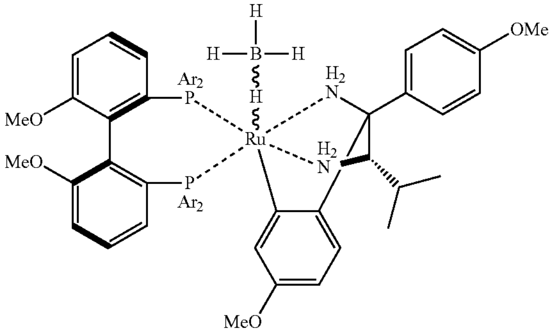

(OC-6-32-C)
Ar = Ph: (1R,2S,aR)-1′-$G_1$
(Ru($\eta^1$-$BH_4$)[(1R,2S)-daipena][(R)-meo-biphep])
Ar = Tol: (1S,2S,aR)-1′-$G_2$
(Ru($\eta^1$-$BH_4$)[(1R,2S)-daipena][(R)-t-meo-biphep])
Ar = Xyl: (1R,2S,aR)-1′-$G_3$
(Ru($\eta^1$-$BH_4$)[(1R,2S)-daipena][(R)-dm-meo-biphep])

-continued

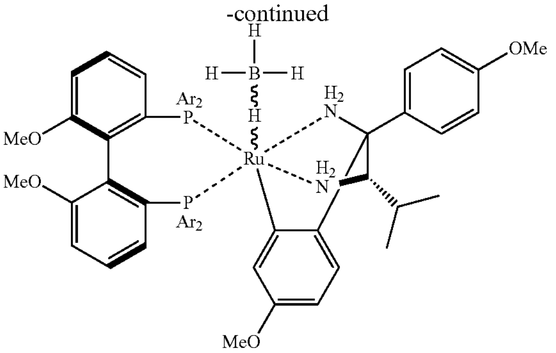

(OC-6-32-C)

Ar = Ph: (1R,2S,aR)-1'-$G_1$ (Ru($\eta^1$-$BH_4$)[(1R,2S)-daipena][(S)-meo-biphep])

Ar = Tol: (1R,2S,aS)-1'-$G_2$ (Ru($\eta^1$-$BH_4$)[(1R,2S)-daipena][(S)-t-meo-biphep])

Ar = Xyl: (1R,2S,aS)-1'-$G_3$ (Ru($\eta^1$-$BH_4$)[(1R,2S)-daipena][(S)-dm-meo-biphep])

[In the above structural formulas, O represents an oxygen atom; MeO and OMe both represent a methoxy group, Ph represents a phenyl group, Tol represents a 4-methylphenyl group, and Xyl represents a 3,5-dimethylphenyl group.]

Next, the method for producing the ruthenium complex ,1) of the present invention is described in detail. The ruthenium complex (1) can be easily produced by reacting a. ruthenium complex represented by the general formula (2) [hereinafter referred to as conventional complex (2)] with a borohydride compound.

Hereinafter, the conventional complex (2), which is a raw material of the ruthenium complex (1) of the present invention, is described in detail. In the general formula (2), a solid line, a double line; a dashed line, H, N, P, C, $C^{P1}$, $C^{P2}$, $C^a$, $C^{N1}$, $C^{N2}$, Ru, $R^P$, $R^{P1}$, $R^{P2}$, $R^{P3}$, $R^{P4}$, $R^{N1}$, $R^{N2}$, $R^{N3}$, $R^{N4}$, $R^{N5}$, and $R^{N6}$ are all the same as those defined and detailed in the description of the general formula (1); Cl is a chlorine atom.

Next, the borohydride compound to be reacted with the conventional complex (2) is described in detail. The borohydride compound is defined as a compound formed from a. negatively charged atomic group ($BH_4$ $^-$) composed of one boron atom (B) and four hydrogen atoms (H), and a positively charged atom or atomic group. Specific examples of the preferred borohydride compound include alkali metal borohydrides such as lithium borohydride, sodium borohydride, and potassium borohydride, magnesium borohydrides such as magnesium borohydride and magnesium borohydride-dimethyl sulfide complex; alkaline earth metal borohydrides such as calcium borohydride and calcium borohydride-tetrahydrofuran complex; ammonium borohydrides such as tetramethylammonium borohydride, tetraethylammonium borohydride, and methyl trioctylammonium borohydride; particularly preferred specific examples thereof include sodium borohydride from a viewpoint of cost and availability. The amount of the borohydride compound used is not particularly limited but is appropriately selected from the range of usually 0.5 to 50 equivalents, preferably 0.8 to 20 equivalents, and more preferably 1 to 10 equivalents relative to the conventional complex (2).

The reaction between the conventional complex (2) and the borohydride compound is preferably carried out in the presence of a solvent. Specific examples of preferred solvent include aliphatic hydrocarbons such as n-pentane, n-hexane, n-heptane, n-octane, n-decane, cyclohexane, and decalin; aromatic hydrocarbons such as benzene, toluene, xylenes, mesitylene, p-cymene, and 1,4-diisopropylbenzene; halogenated aromatic hydrocarbons such as chlorobenzene and o-dichlorobenzene; alcohols such as methanol, ethanol, isopropyl alcohol, n-butyl alcohol, tert-butyl alcohol, 2-methyl-2-butanol, and 2-ethoxyethanol; polyhydric alcohols such as ethylene glycol, propylene glycol, 1,2-propanediol, and glycerol; ethers such as diethyl ether, diisopropyl ether, tort-butyl methyl ether, cyclopentyl methyl ether, 1,2-dimethoxyethane, 1,2-diethoxyethane, tetrahydrofuran, 2-methyltetrahydrofuran, 4-tnethyltetrahydropyran, and 1.4-dioxane; amides such as formamide, N,N-dimethylformamide, N,N-dimethylacetamide, and N-methylpyrrolidone; nitriles such as acetonitrile and benzonitrile; sulfoxides such as dimethyl sulfoxide; particularly preferred specific examples thereof include toluene and ethanol. Each of these solvents may be used alone or in combination with two or more; preferable specific examples of the combination of two or more solvents include a combination of toluene and ethanol. The amount of the solvent used is not particularly limited but is appropriately selected from the range of usually 1 to 200 times by volume, preferably 2 to 100 times by volume, and more preferably 5 to 50 times by volume relative to the conventional complex (2).

The reaction between the conventional complex (2) and the borohydride compound is preferably carried out in an inert gas atmosphere. Specific examples of the inert gas include argon gas and nitrogen gas; preferred specific examples thereof include nitrogen gas. The reaction temperature is appropriately selected from the range of usually −78° C. to 150° C., preferably −20° C. to 125° C. and more preferably 0° C. to 100° C. The reaction time depends on the structure of the borohydride compound, the reaction solvent, and the reaction temperature, but is appropriately selected from the range of usually 1 minute to 12 hours, preferably 2 minutes to 6 hours, and more preferably 5 minutes to 3 hours.

The reaction solution containing the ruthenium complex (1) of the present invention obtained by the reaction between the conventional complex (2) and the borohydride compound may be subjected, if necessary, to a post-treatment. If necessary, the ruthenium complex (1) may be isolated from the reaction solution and further purified. Specific examples of the post-treatment method include concentration, solvent replacement, washing, extraction, filtration, and crystallization, Which may be performed either alone or in combination. Specific examples of the isolation and purification method include decolorization by adsorbent, column chromatography, and recrystallization, which may be performed either alone or in combination.

When using the ruthenium complex (1) of the present invention as a catalyst, the reaction solution of the conventional complex (2) and the borohydride compound may be used as it is, or it may be used after the above post-treatment if necessary, or after the above isolation and purification. On the other hand, since the ruthenium complex (1) has excellent crystallinity and stability, it is preferable to use it after isolation and purification in order to take advantage of these properties, The ruthenium complex (1) may be used alone as a catalyst, or in combination of two or more.

Specific examples of a preferred form of the conventional complex (2) used for producing the ruthenium complex (1) include a ruthenium complex represented by following general formula (2') [hereinafter referred to as conventional complex (2)]. that is, in case of $R^P$ in the general formula (2) is an aryl group which may have substituent, and $R^{P3}$, $R^{P4}$, $R^{N3}$, $R^{N4}$, $R^{N5}$, and $R^{N6}$ are all hydrogen atoms:

(2')

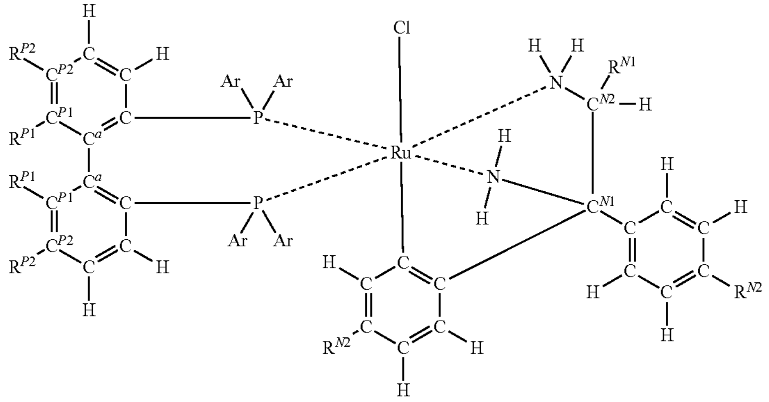

[In the general formula (2'), a solid line, a double line, a dashed line, H, N, P, C, $C^{P1}$, $C^{P2}$, $C^{a}$, $C^{N1}$, $C^{N2}$, Ru, $R^{P1}$, $R^{P2}$, $R^{N1}$, and $R^{N2}$ are all the same as those defined in the description of the general formula (1); Cl represents a chlorine atom Ar represents an aryl group which may have a substituent.]

Furthermore, the ruthenium complex (1') described above, which is the preferred form of the ruthenium complex (1) of the present invention, can be easily produced by reacting the conventional complex (2') with the borohydride compound described above.

For reference, the method for producing the conventional complex (2) is outlined below. Following to the methods described in Patent Literature 1 and Non-Patent Literature 4, the conventional complex (2) can be easily produced by reacting dichloro(p-cymene)ruthenium(II) dimer [hereinafter referred to as $[RuCl_2(p\text{-cymene})]_2$] as a ruthenium source with a compound represented by following general formula. (3) [hereinafter referred to as diphosphine ligand (3)] in the presence of solvent, followed by reacting with a compound represented by following general formula (4) [hereinafter referred to as diamine ligand (4)] in the presence of a base.

(3)

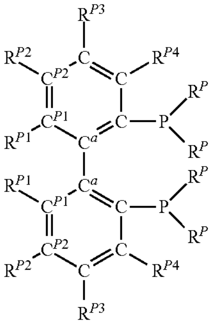

[In the general formula (3), a solid line, a double line, P, C, $C^{P1}$, $C^{P2}$, $C^{a}$, $R^{P}$, $R^{P1}$, $R^{P2}$, $R^{P3}$, and $R^{P4}$ are all the same as those defined in the description of the general formula (1).]

(4)

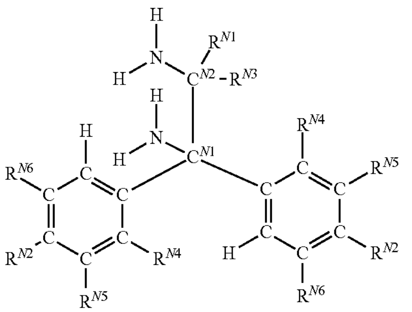

[In the general formula (4), a solid line, a double line, N, H, C, $C^{N1}$, $C^{N2}$, $R^{N1}$, $R^{N2}$, $R^{N3}$, $R^{N4}$, $R^{N5}$, and $R^{N6}$ are all the same as those defined in the description of the general formula (1).]

Specific examples of a preferred form of the diphosphine ligand (3) include a diphosphine ligand represented by following general formula (3') [hereinafter referred to as diphosphine ligand (3')], that is, in case of $R^{P}$ in the general formula (3) is an aryl group which may have substituent, and $R^{P3}$ and $R^{P4}$ are both hydrogen atoms:

(3')

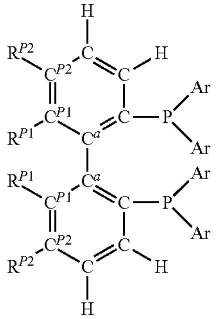

[In the general formula (3'), a solid line, a double line, P, H, C, $C^{P1}$, $C^{P2}$, $C^{a}$, $R^{P}$, $R^{P1}$, and $R^{P2}$ are all the same as those defined in the description of the general formula (1); Ar represents an aryl group which may have a substituent.]

Particularly preferred specific examples of the diphosphine ligand (3) include diphosphine ligands ((aR)-3'-$A_1$) to ((aS)-3'-$G_3$) shown in following Formulas 8 and 9. For clarity of the structural formulas, the trivial names of these diphosphine ligands are listed alongside the compound numbers.

Formula 8

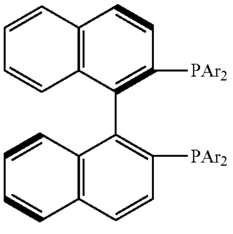

Ar = Ph: (aR)-3'-$A_1$ ((R)-BINAP)
Ar = Tol: (aR)-3'-$A_2$ ((R)-T-BINAP)
Ar = Xyl: (aR)-3'-$A_3$ ((R)-DM-BINAP)

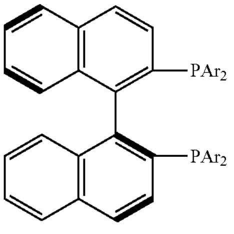

Ar = Ph: (aS)-3'-$A_1$ ((S)-BINAP)
Ar = Tol: (aS)-3'-$A_2$ ((S)-T-BINAP)
Ar = Xyl: (aS)-3'-$A_3$ ((S)-DM-BINAP)

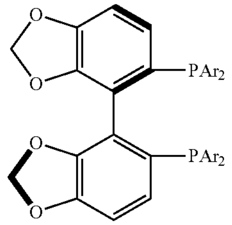

Ar = Ph: (aR)-3'-$B_1$ ((R)-SEGPHOS)
Ar = Tol: (aR)-3'-$B_2$ ((R)-T-SEGPHOS)
Ar = Xyl: (aR)-3'-$B_3$ ((R)-DM-SEGPHOS)

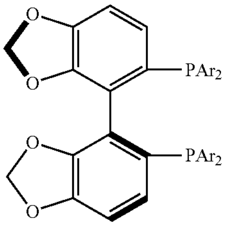

Ar = Ph: (aS)-3'-$B_1$ ((S)-SEGPHOS)
Ar = Tol: (aS)-3'-$B_2$ ((S)-T-SEGPHOS)
Ar = Xyl: (aS)-3'-$B_3$ ((S)-DM-SEGPHOS)

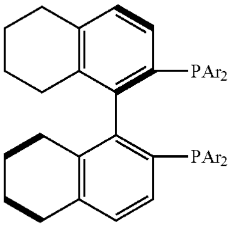

Ar = Ph: (aR)-3'-$C_1$ ((R)-$H_8$-BINAP)
Ar = Tol: (aR)-3'-$C_2$ ((R)-T-$H_8$-BINAP)
Ar = Xyl: (aR)-3'-$C_3$ ((R)-DM-$H_8$-BINAP)

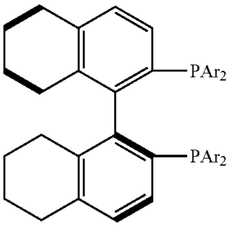

Ar = Ph: (aS)-3'-$C_1$ ((S)-$H_8$-BINAP)
Ar = Tol: (aS)-3'-$C_2$ ((S)-T-$H_8$-BINAP)
Ar = Xyl: (aS)-3'-$C_3$ ((S)-DM-$H_8$-BINAP)

Formula 9

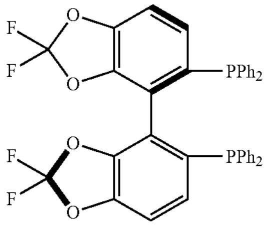

(aR)-3'-$D_1$ ((R)-DIFLUORPHOS)

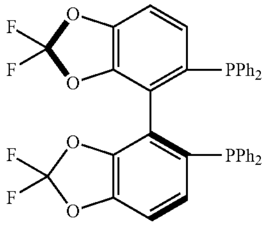

(aS)-3'-$D_1$ ((S)-DIFLUORPHOS)

-continued

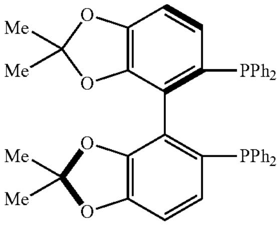

(aR)-3'-$E_1$ ((R)-SUNPHOS)

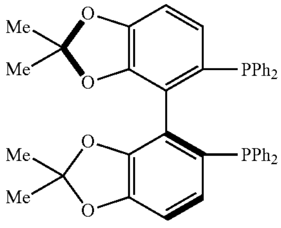

(aS)-3'-$E_1$ ((S)-SUNPHOS)

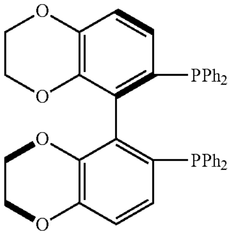

(aR)-3'-$F_1$ ((R)-SYNPHOS)

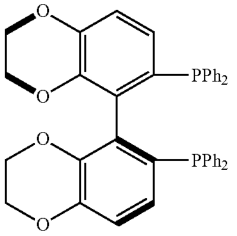

(aR)-3'-$F_1$ ((R)-SYNPHOS)

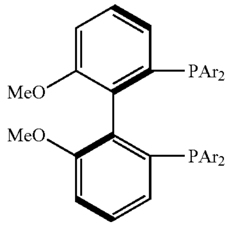

Ar = Ph: (aR)-3'-$G_1$ ((R)-MeO-BIPHEP)
Ar = Tol: (aR)-3'-$G_2$ ((R)-T-MeO-BIPHEP)
Ar = Xyl: (aR)-3'-$G_3$ ((R)-DM-MeO-BIPHEP)

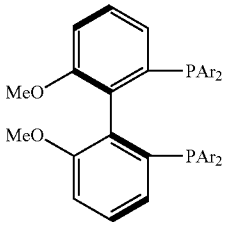

Ar = Ph: (aS)-3'-$G_1$ ((S)-MeO-BIPHEP)
Ar = Tol: (aS)-3'-$G_2$ ((S)-T-MeO-BIPHEP)
Ar = Xyl: (aS)-3'-$G_3$ ((S)-DM-MeO-BIPHEP)

[In the above structural formulas, F represents a fluorine atom, and O represents an oxygen atom; Me represents a methyl group, MeO represents a methoxy group, Ph represents a phenyl group, Tol represents a 4-methylphenyl group, and Xyl represents a 3,5-dimethylphenyl group.]

Specific examples of a preferred form of the diamine ligand (4) include a diamine ligand represented by following general formula (4') [hereinafter referred to as diamine ligand (4')], that is, in case of $R^{N3}$, $R^{N4}$, $R^{N5}$, and $R^{N6}$ in the above general formula (4) are all hydrogen atoms:

(4')

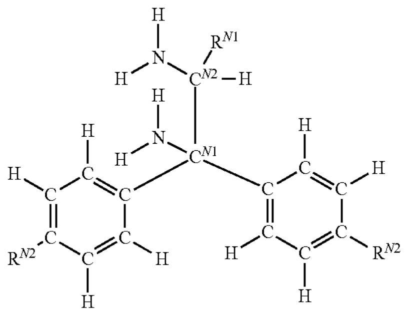

[In the general formula (4'), a solid line, a double line. N, C, $C^{N1}$, $C^{N2}$, $R^{N1}$, and $R^{N2}$ are all the same as those defined in the description of the general formula (1).]

Particularly preferred specific examples of the diamine ligands (4) include diamine ligands ((2R)4-1) and ((2S)-4'-

1) shown in following Formula 10. For clarify the structural formulas, the trivial names of these diamine ligands are listed alongside the compound numbers.

Formula 10

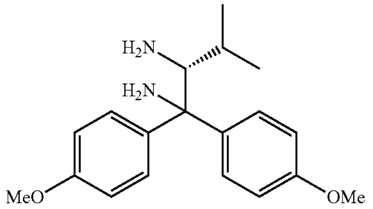

(2R)-4'-1 ((R)-DAIPEN)

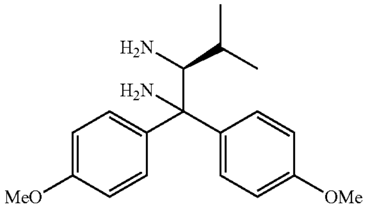

(2S)-4'-1 ((S)-DAIPEN)

[In the above structural formulas, MeO and OMe both represent a methoxy group.]

The conventional complex (2'), which is the preferred form of the conventional complex (2), can be easily produced by reacting $[RuCl_2$ (p-cymene)$]_2$ with the diphosphine ligand (3') in the presence of solvent, followed by reacting with the diamine ligand (4') in the presence of a base.

The ruthenium complex (1) thus produced is useful as a catalyst in various catalytic organic synthetic reactions. These organic synthetic reactions are not particularly limited, but specifically include oxidation reactions, reduction reactions, hydrogenation reactions, dehydrogenation reactions, hydrogen transfer reactions, addition reactions, conjugate addition reactions, pericyclic reactions, functional group conversion reactions, isomerization reactions, rearrangement reactions, polymerization reactions, bond formation reactions, and bond cleavage reactions; all of these organic synthetic reactions may be asymmetric reactions. Preferred specific examples of these organic synthetic reactions include hydrogenation reactions, dehydrogenation reactions, and hydrogen transfer reactions; particularly preferred specific examples thereof include the asymmetric hydrogenation of unsymmetrical ketones.

Hereinafter, a method for producing optically active secondary alcohols by catalytic asymmetric hydrogenation of unsymmetrical ketones using the ruthenium complex (1) of the present invention as a catalyst is described in detail. First, examples of the unsymmetrical ketone include an unsymmetrical ketone represented by following general formula (5) [hereinafter referred to as unsymmetrical ketone (5)].

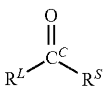

(5)

[In the general formula (5), a solid line represents a single bond, and a double line represents a double bond; O represents an oxygen atom, and $C^C$ represents a carbon atom; $R^L$ and $R^S$ each independently represent a hydrocarbyl group which may have a substituent, and their rank ruled by Cahn-Ingold-Prelog priority is $R^L$>$R^S$; $R^L$ and $R^S$ may be combined with each other to form a ring with $C^C$.]

By subjecting the unsymmetrical ketone (5) to catalytic asymmetric hydrogenation, optically active secondary alcohols represented by following general formulas ((R)-6) and ((S)-6) [hereinafter referred to as optically active secondary alcohol ((R)-6) and optically active secondary alcohol ((S)-6), respectively, and both collectively as optically active secondary alcohols (6)] can be produced.

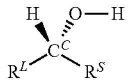

((R)-6)

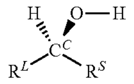

((S)-6)

[In the general formulas ((R)-6) and ((S)-6), a solid line, O, $C^C$, $R^L$, and $R^S$ are all the same as those defined in the description of the general formula (5): a wedge-shaped solid line represents a single bond toward the front side, and a wedge-shaped dashed line represents a single bond toward the back side; H represents a hydrogen atom.]

The optically active secondary alcohol ((R)-6) and the optically active secondary alcohol ((S)-6) can be produced stereoselectively by using the ruthenium complex (I) with appropriate stereoconfiguration as a catalyst, respectively.

The catalytic asymmetric hydrogenation of the unsymmetrical ketone (5) using the ruthenium complex (1) of the present invention as a catalyst can be carried out without solvent; however, it is preferable to carry out the reaction in the presence of solvent from a viewpoint of the reaction control. Specific examples of preferred solvent include aliphatic hydrocarbons such as n-pentane, n-hexane, n-heptane, n-octane, n-decane, cyclohexane, and decalin; aromatic hydrocarbons such as benzene, toluene, xylenes, mesitylene, p-cymene, and 1,4-diisopropylbenzene; alcohols such as methanol, ethanol, isopropyl alcohol, n-butyl alcohol, tert-butyl alcohol, 2-methyl-2-butanol. and 2-ethoxyethanol; polyhydric alcohols such as ethylene glycol, propylene glycol, 1,2-propanediol, and glycerol; ethers such as diethyl ether, diisopropyl ether, tert-butyl methyl ether, cyclopentyl methyl ether, 1,2-dimethoxyethane, 1,2-diethoxyethane, tetrahydrofuran, 2-methyltetrahydrofuran, 4-methyltetrahydropyran, and 1,4-dioxane; amides such as formamide, N,N-dimethylformainide, N,N-dimethylacetatnide, and N-tnethylpyrrolidone; nitrites such as acetonitrile and benzonitrile; sulfoxides such as dimethyl sulfoxide; water; particularly preferred specific examples thereof include ethanol and isopropyl alcohol. Each of these solvents may be used alone or in combination with two or more; preferable specific examples of the combination of two or more solvents include a combination of ethanol and isopropyl alcohol. The amount of the solvent used is not particularly limited but is appropriately selected from the range of usually 0.5 to 100 times by volume, preferably 1 to 75 times by volume, and more preferably 2 to 50 times by volume relative to the unsymmetrical ketone (5).

Although the catalytic activity of the ruthenium complex (1) can be further improved by coexisting not only a solvent but also a base in the reaction, it is preferable to carry out the reaction in the absence of a base because the applicable range of the unsymmetrical ketone (5) as a substrate is limited in the presence of a base and complicated weighing operations of a base are necessary. The amount of the ruthenium complex (1) used in the reaction is not particularly limited, but in the absence of a base, is appropriately selected from the range of usually 0.002 to 2 mol % [substrate/catalyst ratio (S/C)=50 to 50,000], preferably 0.004 to 1 mol % [S/C=100 to 25,000], and more preferably 0.01 to 0.5 mol % [S/C=200 to 10,000] relative to the unsymmetrical ketone (5).

The catalytic asymmetric hydrogenation of the unsymmetrical ketone (5) using the ruthenium complex (1) of the present invention as a catalyst can be carried out under a hydrogen gas atmosphere, a hydrogen/argon mixed gas atmosphere, or a hydrogen/nitrogen. mixed gas atmosphere; however, it is preferable to carry out the reaction under a hydrogen gas atmosphere from a viewpoint of the reaction operations. The pressure of hydrogen gas is not particularly limited but is appropriately selected from the range of usually 0.1 to 10 MPa, preferably 0.2 to 8 MPa, and more preferably 0.5 to 6 MPa. The reaction temperature is appropriately selected from the range of usually −78° C. to 200° C., preferably −20° C. to 150° C., and more preferably 0° C. to 125° C. The reaction time depends on the reaction solvent, the amount of ruthenium complex (1) used, the pressure of hydrogen gas, and the reaction temperature, but is appropriately selected from the range of usually 15 minutes to 48 hours, preferably from 30 minutes to 24 hours, and more preferably from 1 hour to 12 hours.

The reaction solution containing the optically active secondary alcohols (6) obtained by the reaction described above may be subjected, if necessary, to a post-treatment. If necessary, the optically active secondary alcohols (6) may be isolated from the reaction solution and further purified. Specific examples of the post-treatment method include concentration, solvent replacement. washing, filtration, and crystallization, which may be performed either alone or in combination. Specific examples of the isolation and purification method include decolorization by adsorbent, column chromatography, distillation, recrystallization, and sublimation, which may be performed either alone or in combination.

Particularly preferable specific examples of the unsymmetrical ketone (5) and the optically active secondary alcohols (6) include unsymmetrical ketones (5-1) to (5-3) and optically active secondary alcohols ((R)-6-1) to ((S)-6-3) shown in following Formula 11.

Formula 11

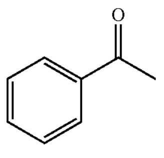

(5-1)

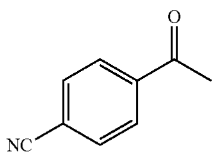

(5-2)

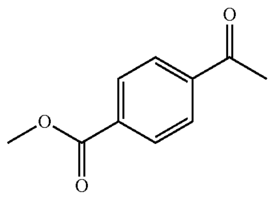

(5-3)

-continued

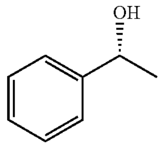

((R)-6-1)

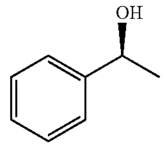

((S)-6-1)

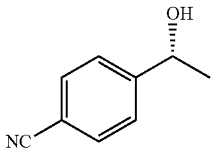

((R)-6-2)

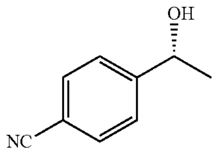

((S)-6-2)

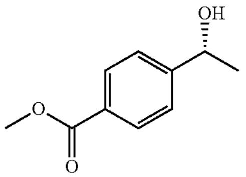

((R)-6-3)

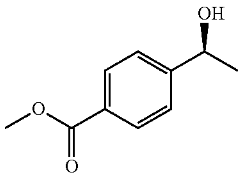

((S)-6-3)

The production method described above, that is, the catalytic asymmetric hydrogenation of the unsymmetrical ketone (5) using the ruthenium complex (1) of the present invention as a catalyst, can efficiently produce the optically active secondary alcohols (6) which are useful compounds.

EXAMPLES

Hereinafter, the production of the ruthenium complex (1) of the present invention and the production of the optically active secondary alcohols (6) using the ruthenium complex (1) as a catalyst are described in detail with reference to specific Examples, but the present invention is not limited to these Examples in any way. In the Examples, the apparatus used for measuring the physical properties, the measurement conditions, and the analysis conditions are as follows:

1) Proton Nuclear Magnetic Resonance Spectroscopy ($^1$H NMR): 400MR DD2 type apparatus (resonance frequency: 400 MHz; manufactured by Agilent Technologies, Inc.)

2) Phosphorus 31 Nuclear Magnetic Resonance Spectroscopy ($^{31}$ P NMR): 400MR DD2 type apparatus (resonance frequency: 161 MHz; manufactured by Agilent Technologies, Inc)

3) X-ray Crystallography: XtaLAB Synergy-S type apparatus (manufactured by Rigaku Oxford Diffraction)

[Measurement and Analysis Conditions] X-ray Source: MoKα ray or CUKα ray; Device Control Program: CrysAlis$^{PRO}$; Structural Analysis Software: Olex$^2$ 1,3-ac4; Structural Analysis Programs: SHELXS and SHEEKL-2018/3; Drawing Software: Mercury 4.3.0.

4) Gas Chromatography (GC): Nexis GC-2030 type apparatus (manufactured by Shimadzu Corporation)

[Measurement Conditions] Column: CP-Chirasil-Dex-CB (manufactured by Agilent Technologies, Inc.); Injector Temperature: 220° C.; Detector Temperature: 250° C.; Measurement Temperature: 120° C.; Measurement Time: 30 minutes.

Examples 1-10 relate to the production of the ruthenium complexes (1) of the present invention; Examples 11-17 relate to the production of the optically active secondary alcohols (6) using the ruthenium complex (1) as a catalyst; Comparative Examples 1-5 relate to attempts of catalytic asymmetric hydrogenation of the unsymmetrical ketone (5) using the conventional complexes (2).

Unless otherwise noted, the substrate and solvent were charged under a nitrogen stream; the reaction and post-treatment were carried out under a nitrogen atmosphere; the isolation and purification of the product was carried out under a nitrogen stream. For clarify the Examples, the compound numbers are omitted for the conventional complex (2), the diphosphine ligand (3), and the diamine ligand (4), and their trivial names are given instead in the descriptions; the compound names and compound numbers are listed together for the unsymmetrical ketone (5) and the optically active secondary alcohols (6) in the descriptions;

the absolute configuration of secondarily induced octahedral chirality is omitted for the ruthenium complex (1) of the present invention, and the possible trivial name and compound number are listed together in the descriptions,

Example 1

Production of Ru($\eta^1$-BH4)[(1S,2R)-daipena][(10-binap] ((1S,2R,aR)-1'$A_1$) (Formula 12)

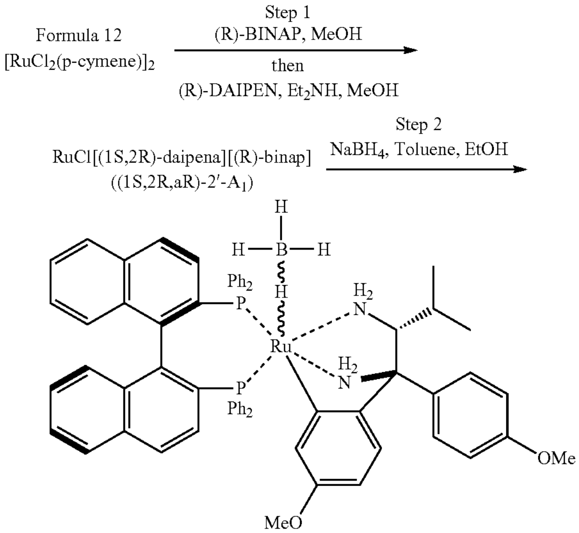

Ru($\eta^1$-$BH_4$)[(1S,2R)-daipena][(R)-binap)]
((1S,2R,aR)-1'-$A_1$)

Step 1: After attaching a magnetic stirring bar, a thermometer, a Dimroth condenser, and a three-way stopcock to a 100 mL four-necked round-bottomed flask, the interior of the flask was replaced with nitrogen gas. [$RuCl_2$(p-cymene)]2 (1,50 g, 2.45 mmol, 1.0 equivalent), (R)-BINAP (3.08 g, 4.95 mmol, 2.02 equivalents), and dehydrated methanol (30 mL) were charged into the flask successively. The resulting red slurry was warmed by using an oil bath while stirring with a magnetic stirrer, and then stirred at 50° C. for 2 hours. After cooling the resulting reddish orange solution to room temperature, (R)-DAIPEN (1.62 g, 5.15 mmol, 2.1 equivalents) and diethylamine (558 μL, 5.39 mmol, 2.2 equivalents) were added successively, and the mixture was stirred at 50° C., for 2 hours while heating by using the oil bath. The resulting yellow slurry was cooled to −20° C. by using a dry ice-acetone bath and then filtered by suction under a nitrogen stream. The filtered crystals were washed with dehydrated methanol cooled to −20° C. (20 mL), and then dried by heating under reduced pressure (1 Torr, 40° C., 1 hour) to produce a conventional complex, RuCl[(1S,2R)-daipena][(R)-binap], in an amount of 4.50 g as a yellow powder. Purity: 99.7% by weight (main impurity was p-cymene); Isolated Yield: 85.4%.

$^{31}$P NMR (161 MHz, $C_6D_6$): δ=61.88 (d, J=39.0 Hz, 1 P), 54.54 (d, J=39.0 Hz, 1 P).

Step 2: After attaching a magnetic stirring bar, a thermometer, a Dimroth condenser, and a three-way stopcock to a 100 mL four-necked round-bottomed flask, the interior of the flask was replaced with nitrogen gas. RuCl[(1S,2R)-daipena][(R)-binap] (Purity: 99.7% by weight, 1.0 g, 0.929 mmol, 1.0 equivalent) produced in Step 1, dehydrated toluene (20 mL), dehydrated ethanol (10 mL), and sodium borohydride (176 mg, 4.64 mmol, 5.0 equivalents) were charged into the flask successively. The resulting yellowish orange suspension was warmed by using an oil bath while stirring with a magnetic stirrer, and then stirred under reflux conditions for 15 minutes. Next, the solvents (ca. 20 mL) were recovered from the reaction solution under reduced pressure while stirring to give a concentrate, which was allowed to cool to room temperature before dehydrated n-hexane (20 mL) was added gently. The resulting yellowish orange slurry was cooled to 5° C. by using an ice-water bath arid then filtered by suction under a nitrogen stream. The filtered crystals were washed with n-hexane (5 mL), tap water(20 mL), and n-hexane (5 mL) successively, and then dried by heating under reduced pressure (1 Torr, 40° C., 1 hour) to produce a ruthenium complex ((1S,2R,aR)-1'-$A_1$) of the present invention, Ru($\eta^1$-$BH_4$)[(1S,2R)-daipena][(R)-binap], in an amount of 1.01 g as a yellowish orange powder. Purity: 86.6% by weight (main impurities were toluene and n-hexane); Isolated Yield: 89.5%.

$^{31}$P NMR (161 MHz, $C_6D_6$): δ=64.56 (d, J=37.5 Hz, 1 P), 61.75 (d, J=37.5 Hz, 1 P).

In spite of $^1$H NMR analysis of this ruthenium complex, neither the H ligand nor the $\eta^1$-$BH_4$ ligand that should be introduced in Step 2 (observed as peaks around −13.9 ppm and −0.24 ppm for the complex described in Non-Patent Literature 3, respectively) could be observed. Therefore, a single crystal of the ruthenium complex was prepared from toluene/n-hexane to perform X-ray crystallography, which revealed that the $\eta^1$-$BH_4$ ligand was incorporated into the complex instead of the H ligand, and the absolute configuration of the complex could also be determined.

Figure 3:
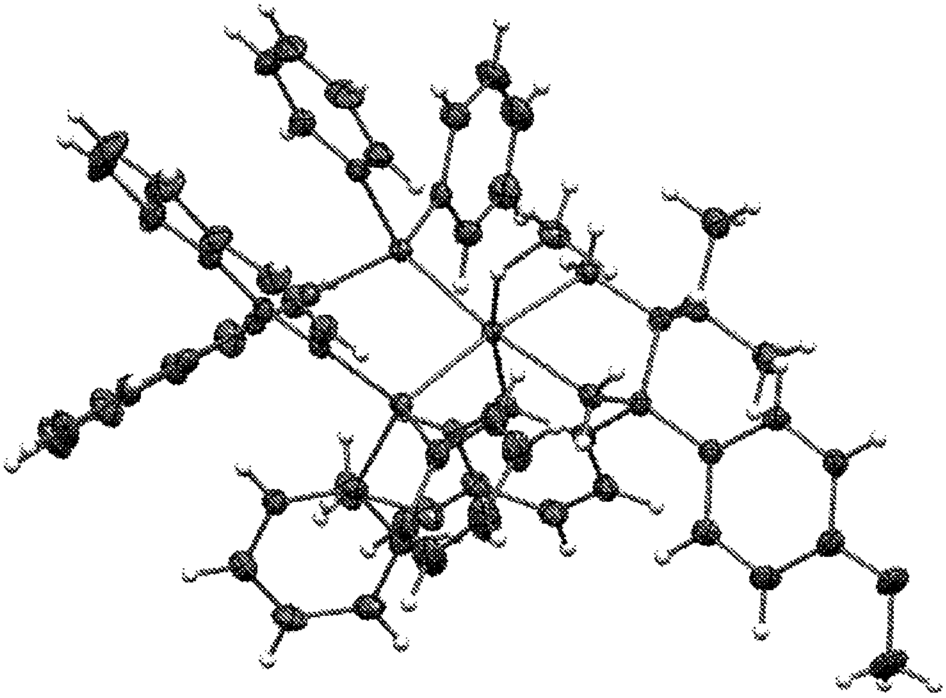
FIG. 3 shows a result of X-ray crystallography (thermal ellipsoid plot; 50% probability level) of the ruthenium complex produced in Example I.

FIG. 3 shows a result of X-ray crystallography (thermal ellipsoid plot; 50% probability level) of the ruthenium complex ((1S,2R,aR)-1'-$A_1$) of the present invention produced in Example 1. Note that the descriptions of solvents contained in the crystal (toluene and n-hexane) are omitted for clarity of the structure of the complex in FIG. 3.

The main parameters that guaranteed the accuracy of the analytical results were as follows. Crystal System: Monoclinic; Space Group: $P2_1$(#4); Lattice Constant: a=11.2546 (2) Å, b=46,7626(6) Å, c=12.0648(2) Å, β=92.2230(10)°; Reliability Factor ($R_1$): 0.0390; Weighted Reliability Factor ($wR_2$): 0.0715; Goodness of Fit (GOY): 1.013; Flack Parameter: −0.026(8).

Figure 4:
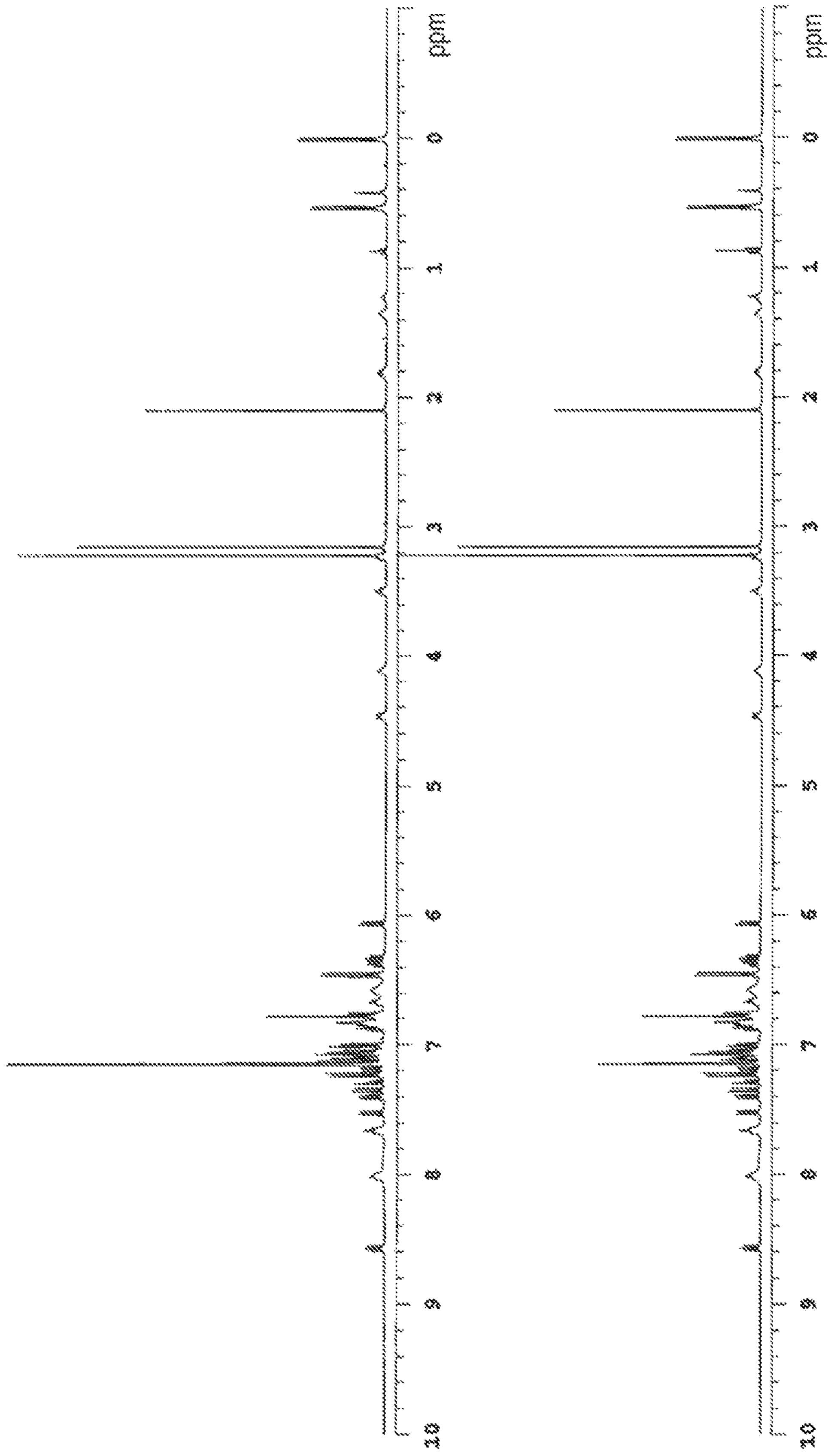
FIG. 4 is a spectrum of the ruthenium complex produced in Example 1, showing the result of $^1$H NMR measured in deuterated benzene immediately after production (right side) and after being left at room temperature in air for 4 weeks (left side).

FIG. 4 summarizes results of $^1$H NMR for the ruthenium complex ((1S,2R,aR)-1'-$A_1$) of the present invention produced in Example 1, measured in deuterated benzene immediately after production (right side) and after being left at room temperature in air for 4 weeks (left side). These analytical results indicate that the complex is extremely stable in air.

Example 2

Production of Ru($\eta^1$-$BH_4$)[(1R,2S)-daipena][(S)-binap]((1R,2S,aS)-1'-$A_1$) (Formula 13)

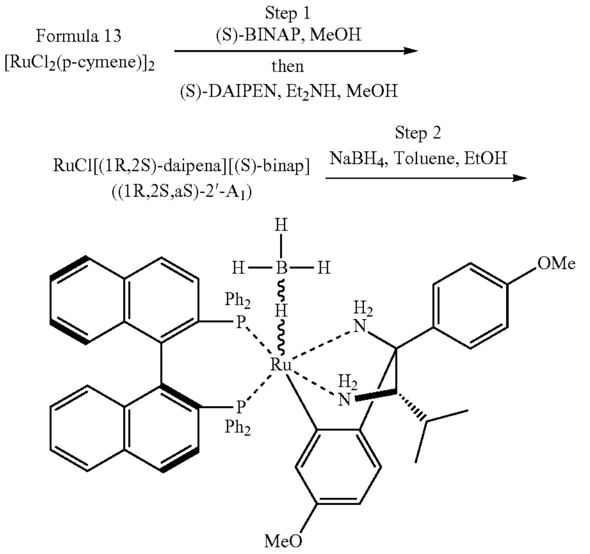

Ru($\eta^1$-$BH_4$)[(1R,2S)-daipena][(S)-binap)]
((1R,2S,aS)-1'-$A_1$)

In the same manner as in Example 1, a ruthenium complex ((1R,2S,aS)-1'-$A_1$) of the present invention, Ru($\eta^1$-BH4)[(1R,2S)-daipena][(S)-binap], was produced in an amount of 1.01 g as a yellowish orange powder stable at room temperature in air by using (S)-BINAP instead of (R)-BINAP and (S)-DAIPEN instead of (R)-DAIPEN. Purity: 88.0% by weight (main impurities were toluene and n-hexane); Isolated Yield in Step 2: 90.3%. Note that a single crystal of the complex could be prepared from toluene/n-hexane.

$^{31}$P NMR (161 MHz, $C_6D_6$): δ=64.60 (d, J=38.0 Hz, 1P), 61.79 (d, J=38.0 Hz, 1 P).

Figure 5:
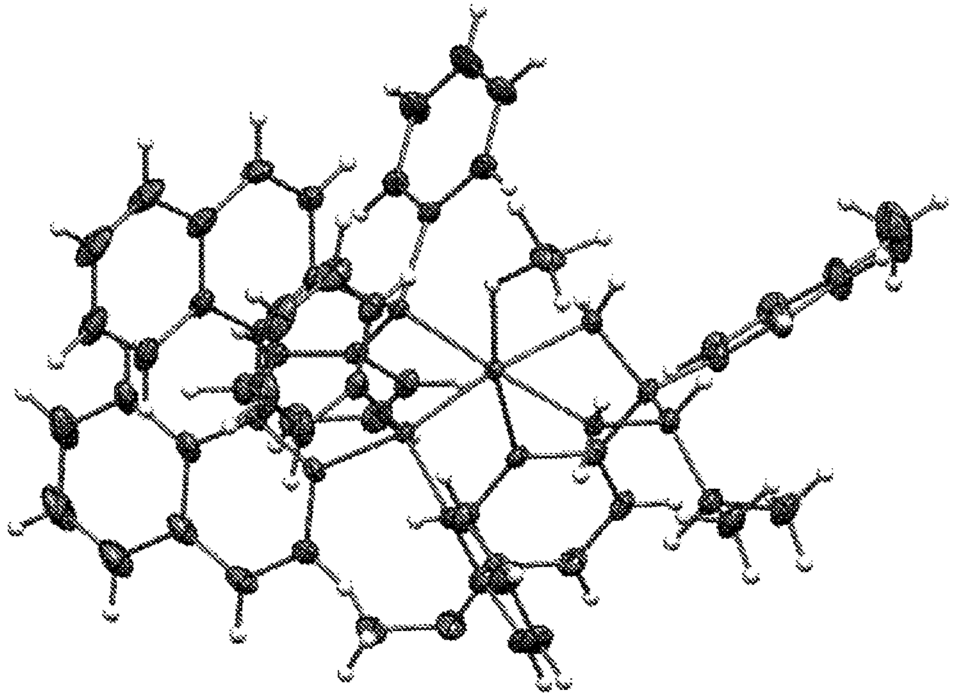
FIG. 5 shows a result of X-ray crystallography (thermal ellipsoid plot; 50% probability level) of the ruthenium complex produced in Example 2.

FIG. 5 shows a result of X-ray crystallography (thermal ellipsoid plot; 50% probability level) of the ruthenium complex ((1R,2S,aS)-1'-$A_1$) of the present invention produced in Example 2. This result reveals that the $\eta^1$-$BH_4$ ligand, which cannot be observed by $^1$H NMR, is incorporated into the complex. Note that the descriptions of solvents contained in the crystal (toluene and n-hexane) are omitted for clarity of the structure of the complex in FIG. 5.

The main parameters that guaranteed the accuracy of the analytical results were as follows. Crystal System: Monoclinic; Space Group: $P2_1$(#4); Lattice Constant: a=11.25710 (10) Å, b=46,8281(7) Å, c=12.0353(2) Å, β=92.2350 (10)°; $R_1$: 0.0417; $wR_2$: 0.0859, GOF: 1.058; Flack Parameter: −0.018(8).

Example 3

Production of Ru($\eta^1$-$BH_4$)[(1S,2R)-daipena][(R)-t-binap]((1S,2R,aR)-1'-$A_2$) (Formula 14)

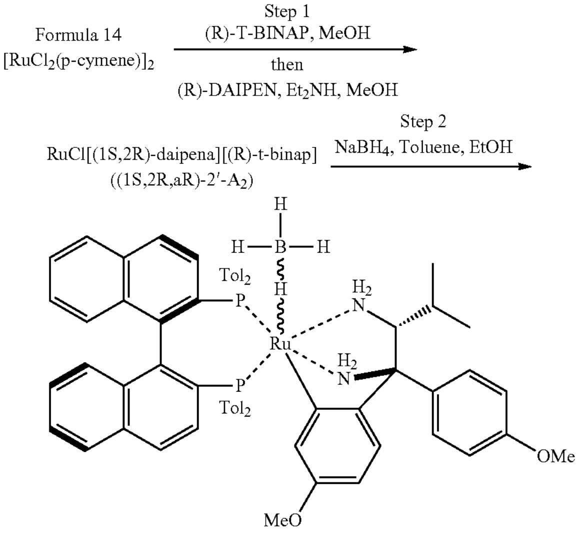

Ru($\eta^1$-$BH_4$)[(1S,2R)-daipena][(R)-t-binap)]
((1S,2R,aR)-1'-$A_2$)

Step 1: After attaching a magnetic stirring bar, a thermometer, a Dimroth condenser, and a three-way stopcock to a 50 mL four-necked round-bottomed flask, the interior of the flask was replaced with nitrogen gas. $[RuCl_2(p\text{-cymene})]_2$ (1.00 g, 1.63 mmol, 1.0 equivalent), (R)-T-BINAP (2.24 g, 3.29 mmol, 2.02 equivalents), and dehydrated methanol (20 mL) were charged into the flask successively. The resulting red slurry was warmed by using an oil bath while stirring with a magnetic stirrer, and then stirred at 50° C. for 2 hours. After cooling the resulting red solution to room temperature, (R)-DAIPEN (1.08 g, 3.42 mmol, 2.1 equivalents) and diethylamine (371 μL, 3.59 mmol, 2.2 equivalents) were added successively, and the mixture was stirred at 50° C. for 2 hours while heating by using the oil bath. The resulting orange slurry was cooled to 5° C. by using an ice-water bath and then filtered by suction under a nitrogen stream. The filtered crystals were washed with dehydrated methanol cooled to 5° C. (15 mL), and then dried by heating under reduced pressure (1 Torr, 40° C., 1 hour) to produce a conventional complex, RuCl[(1S,2R)-daipena][(R)-t-binap], in an amount of 2.85 gas an orange powder. Purity: 99.9% by weight (main impurity was p-cymene); Isolated Yield: 77.5%.

$^{13}$P NMR (161 MHz, $C_6D_6$): δ=60.75 (d, J=39.4 Hz, 1 P), 52.98 (d, J=39.4 Hz, 1 P).

Step 2: After attaching a magnetic stirring bar, a thermometer, a Dimroth condenser, and a three-way stopcock to a 100 mL four-necked round-bottomed flask, the interior of the flask was replaced with nitrogen gas. RuCl[(1S,2R)-daipena][(R)-t-binap] (Purity: 99.9% by weight, 1.0 g, 0.886 mmol, 1.0 equivalent) produced in Step 1, dehydrated toluene (20 mL), dehydrated ethanol (10 mL), and sodium borohydride (168 mg, 4.43 mmol, 5.0 equivalents) were charged into the flask successively. The resulting orange suspension was stirred at room temperature for 1 hour by using a magnetic stirrer. Next, the solvents (ca. 20 mL) were recovered from the reaction solution under reduced pressure while stirring to give a concentrate before dehydrated n-hexane (20 mL) was added gently. The resulting yellow slurry was cooled to 5° C. by using an ice-water bath and then filtered by suction under a nitrogen stream. The filtered crystals were washed with n-hexane (5 mL), tap water(20 mL), and n-hexane (5 mL) successively, and then dried by heating under reduced pressure (1 Torr, 40° C., 1 hour) to produce a ruthenium complex ((1S,2R,aR)-1'-$A_2$) of the present invention, Ru($\eta^1$-$BH_4$)[(1S,2R)-daipena][(R)-t-binap], in an amount of 1.03 g as a yellowish orange powder. Purity: 92.3% by weight (main impurity was toluene); Isolated Yield: 96.9%. Note that a single crystal of the complex could be prepared from toluene/n-hexane.

Figure 6:
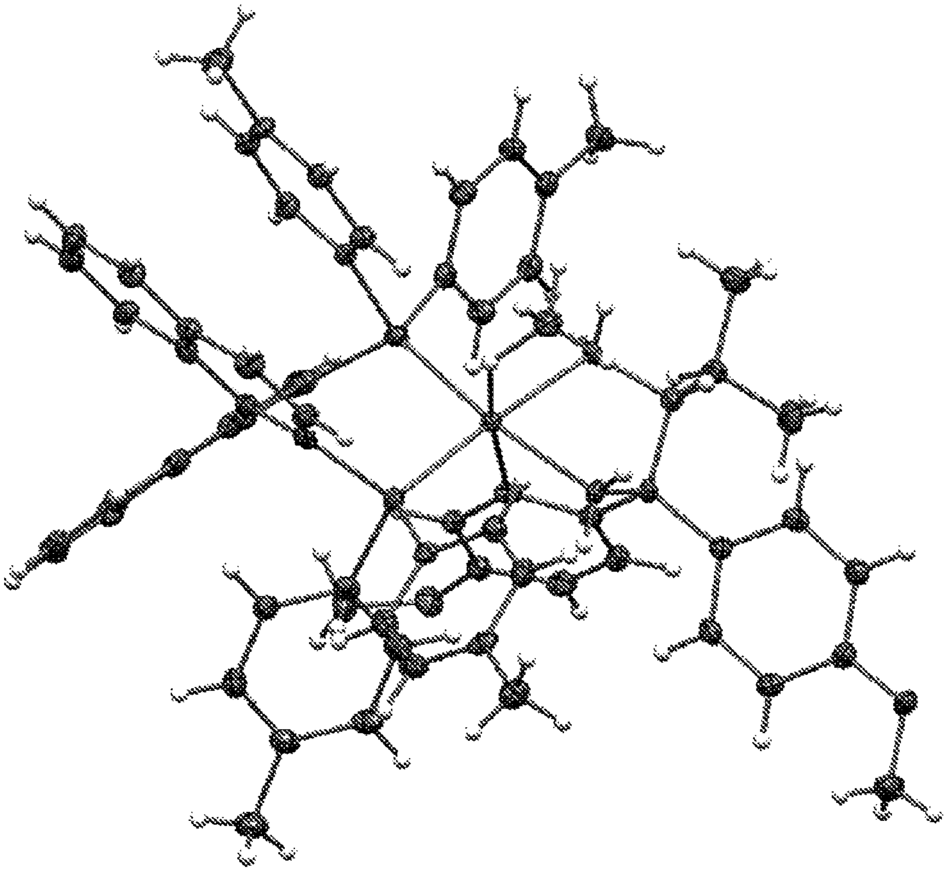
FIG. 6 shows a result of X-ray crystallography (thermal ellipsoid plot; 50% probability level) of the ruthenium complex produced in Example 3.

$^{31}$P NMR (161 MHz, $C_6D_6$): δ=63.26 (d, J=38.0 Hz, 1 P), 59.93 (d, J=38.0 Hz, 1 P),

FIG. 6 shows a result of X-ray crystallography (thermal ellipsoid plot; 50% probability level) of the ruthenium complex ((1S,2R,aR)-1'-$A_2$) of the present invention produced in Example 3. This result reveals that the $\eta^1$-$BH_4$ ligand, which cannot be observed by $^1$H NMR, is incorporated into the complex. Note that the description of solvent contained in the crystal (toluene) is omitted for clarity of the structure of the complex in FIG. 6.

The main parameters that guaranteed the accuracy of the analytical results were as follows. Crystal System: Orthorhombic; Space Group: $P2_12_12_1$ (#19); Lattice Constant: a=12.79926(15) Å, b=19.9189(3) Å, c=23.2821(3) Å; $R_1$: 0.0380, $wR_2$: 0.0854; GOF: 1.038; Flack Parameter: −0.036 (4).

Figure 7:
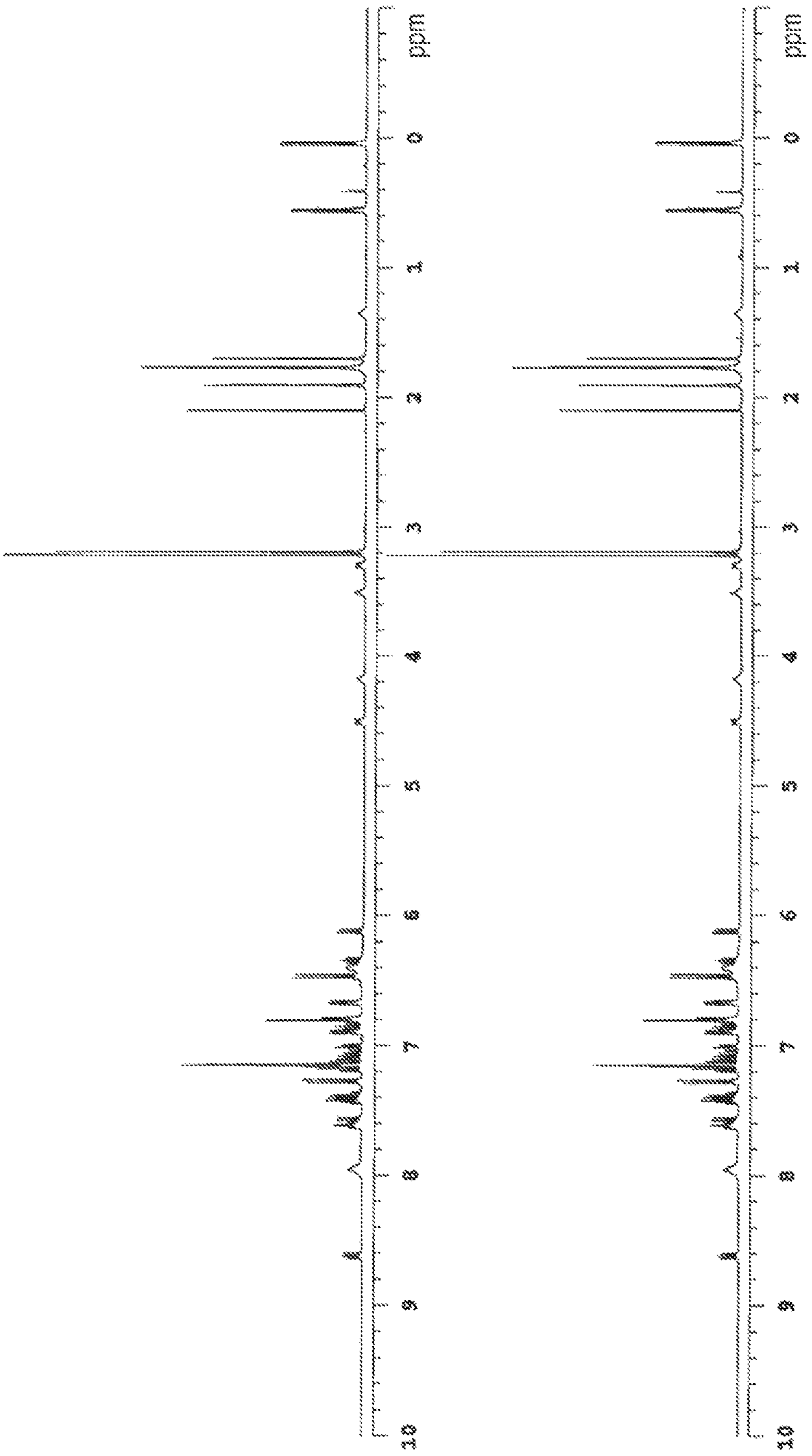
FIG. 7 is a spectrum of the ruthenium complex produced in Example 3, showing the result of $^1$H NMR measured in deuterated benzene immediately after production (right side) and after being left at room temperature in air for 4 weeks (left side).

FIG. 7 summarizes results of $^1$ H NMR for the ruthenium complex ((1S,2R,aR)-1'-$A_2$) of the present invention produced in Example 3, measured in deuterated benzene immediately after production (right side) and after being left at room temperature in air for 4 weeks (left side). These analytical results indicate that the complex is extremely stable in air.

Example 4

Production of Ru($\eta^1$-$BH_4$)[(1R,2S)-daipena][(S)-t-binap]((1R,2S,aS)-1'-$A_2$) (Formula 15)

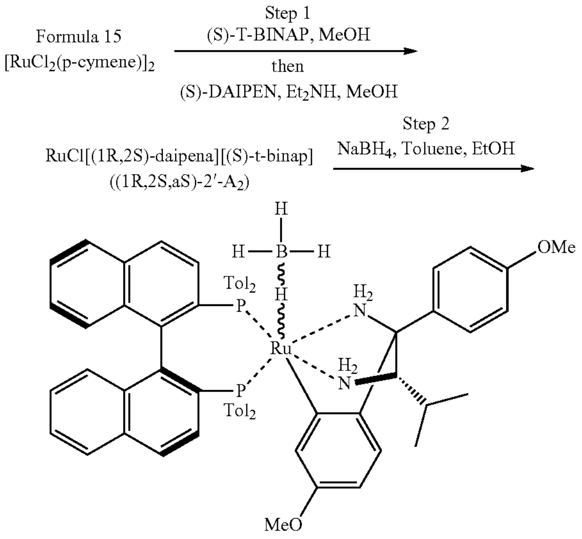

Ru($\eta^1$-$BH_4$)[(1R,2S)-daipena][(S)-t-binap)]
((1R,2S,aS)-1'-$A_2$)

In the same manner as in Example 3, a ruthenium complex ((1R,2S,aS)-1'-$A_2$) of the present invention, Ru($\eta^1$-$BH_4$)[(1R,2S)-daipena][(S)-t-binap], was produced in an amount of 1.02 g as a yellow powder stable at room temperature in air by using (S)-T-BINAP instead of (R)-T-BINAP and (S)-DAIPEN instead of (R)-DAIPEN. Purity: 92.6% by weight (main impurity was toluene); Isolated Yield in Step 2: 97.1%. Note that a single crystal of the complex could be prepared from toluene/n-hexane.

$^{31}$P NMR, (161 MHz, $C_6D_6$): δ=63.29 (d, J=37.0 Hz, 1 P), 59.96 (d, J=37.0 Hz, 1 P).

Figure 8:
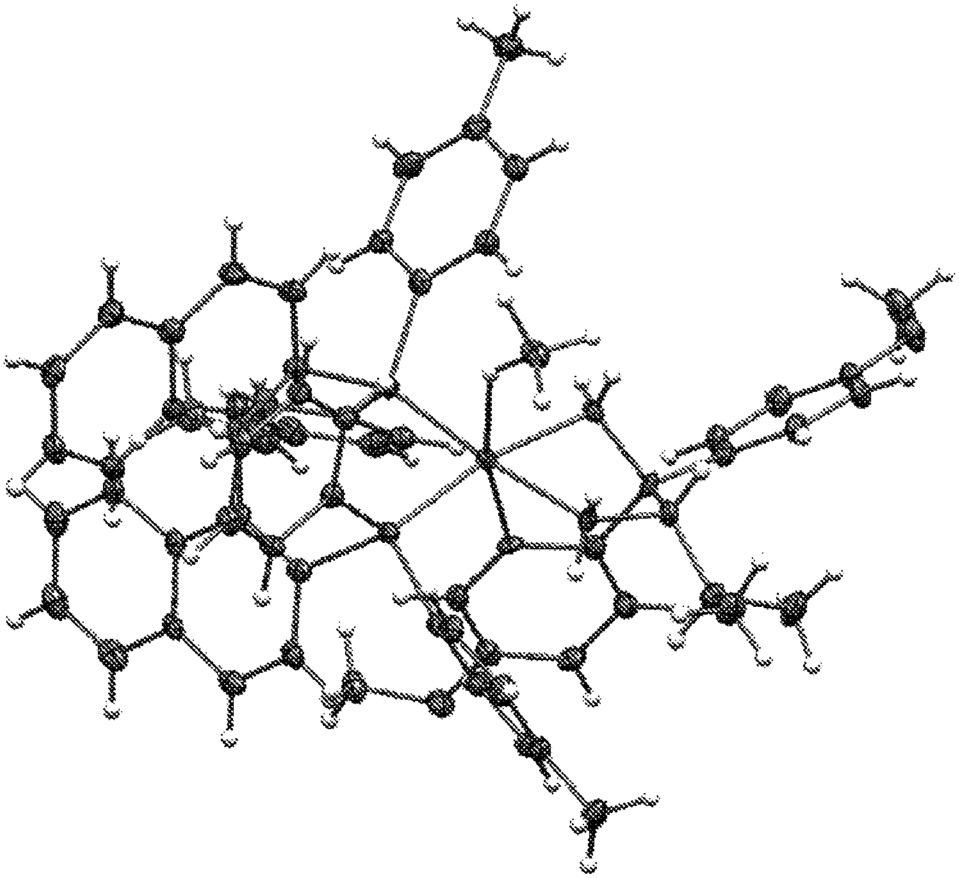
FIG. 8 shows a result of X-ray crystallography (thermal ellipsoid plot; 50% probability level) of the ruthenium complex produced in Example 4.

FIG. 8 shows a result of X-ray crystallography (thermal ellipsoid plot; 50% probability level) of the ruthenium complex ((1R,2S,aS)-1'-$A_2$) of the present invention produced in Example 4. This result reveals that the $\eta^1$-$BH_4$ ligand, which cannot be observed by $^1$H NMR, is incorporated into the complex. Note that the description of solvent contained in the crystal (toluene) is omitted for clarity of the structure of the complex in FIG. 8.

The main parameters that guaranteed the accuracy of the analytical results were as follows. Crystal System: Orthorhombic; Space Group: $P2_12_12_1$(#19); Lattice Constant: a=12.79151(10) Å, b=19.92170(15) Å, c=23.2697(2) Å; $R_1$: 0.0324; $wR_2$: 0.0745; GOF: 1.043; Flack Parameter: −0.018 (4).

Example 5

Production of Ru($\eta^1$-$BH_4$)[(1R,2S)-daipena][(R)-t-binap]((1R,2S,aR)-1'-$A_2$) (Formula 16)

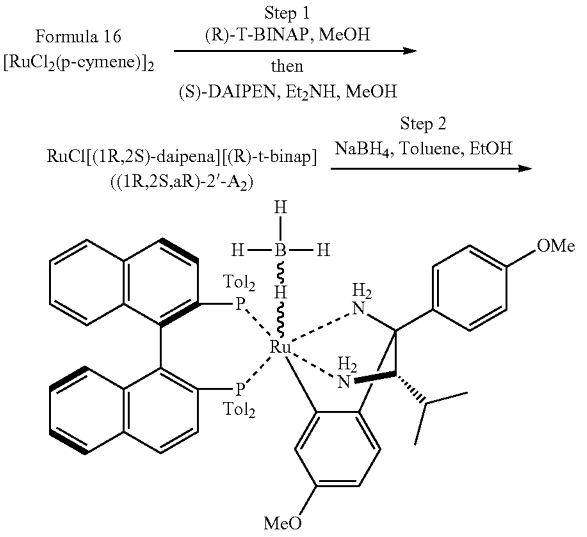

Ru($\eta^1$-$BH_4$)[(1R,2S)-daipena][(R)-t-binap)]
((1R,2S,aR)-1'-$A_2$)

Step 1: After attaching a magnetic stirring bar, a thermometer, a Dimroth condenser, and a three-way stopcock to a 100 mL four-necked round-bottomed flask, the interior of the flask was replaced with nitrogen gas. [$RuCl_2$(p-cymene)]$_2$ (1.50 g, 2.45 mmol, 1.0 equivalent), (R)-T-BINAP (3.36 g, 4.95 mmol, 2.02 equivalents), and dehydrated methanol (30 mL) were charged into the flask successively. The resulting red slurry was warmed by using an oil bath while stirring with a magnetic stirrer, and then stirred at 50° C. for 2 hours. After cooling the resulting red solution to room temperature, (S)-DAIPEN (1.62 g, 5.15 mmol, 2.1 equivalents) and diethylamine (634 μL, 6.13 mmol, 2.5 equivalents) were added successively, and the mixture was stirred at 55° C. for 2 hours while heating by using the oil bath. The resulting orange slurry was cooled to −20° C. by using a. dry ice-acetone bath and then filtered by suction under a nitrogen stream. The filtered crystals were washed twice with dehydrated methanol cooled to −20° C. (7.5 mL×2), and then dried by heating under reduced pressure (1 Torr; 40° C., 1 hour) to produce a conventional complex, RuCl[(1R,2S)-daipena][(R)-t-binap], in an amount of 5.14 g as an orange powder, Purity: 99.7% by weight (main impurity was methanol); Isolated Yield: 92.6%.

$^{31}$P NMR (161 MHz, $C_6D_6$): δ=57.96 (d, J=39.0 Hz, 1 P), 56.27 (d, J=39.0 Hz, 1 P).

Step 2: After attaching a. magnetic stirring bar, a thermometer, a Dimroth condenser, and a three-way stopcock to a 100 mL four-necked round-bottomed flask, the interior of the flask was replaced with nitrogen gas. RuCl[(1R,2S)-daipena][(R)-t-binap](Purity: 99.7% by weight, 1.50 g, 1.32 mmol, 1.0 equivalent) produced in Step 1, dehydrated toluene (30 mL), dehydrated ethanol (7.5 mL), and sodium borohydride (150 mg, 3.96 mmol, 3.0 equivalents) were charged into the flask successively. The resulting orange suspension was warmed by using an oil bath while stirring with a magnetic stirrer, and then stirred at 35° C. for 1 hour. Next, the solvents (ca. 22.5 mL) were recovered from the reaction solution under reduced pressure while stirring to give a concentrate, which was allowed to cool to room temperature before dehydrated n-hexane (30 mL) was added. The resulting reddish orange suspension was filtered through diatomaceous earth (1.5 g) under a nitrogen stream, and the filtrands were washed with a mixture of dehydrated n-hexane (15 mL) and dehydrated toluene (3 mL). The filtrates were collectively concentrated to dryness under reduced pressure, and the obtained residue was dissolved with dehydrated toluene (3 mL), followed by the gentle addition of dehydrated n-hexane (30 mL). The resulting yellowish orange slurry was cooled to −20° C. by using a dry ice-acetone bath and then filtered by suction under a nitrogen stream.

The filtered crystals were washed twice with n-hexane cooled to −20° C. (7.5 mL×2), and then dried by heating under reduced pressure (1 Torr, 40° C., 3 hours) to produce a ruthenium complex ((1R, 2S,aR)-1'-$A_2$) of the present invention, Ru($\eta^1$-$BH_4$)[(1R,2S)-daipena][(R)-t-binap], in an amount of 1.32 gas a yellow powder. Purity: 98.9% by weight (main impurity was n-hexane); Isolated Yield: 89.2%.

$^{31}$P NMR (161 MHz, $C_6D_6$): δ=64.36 (d, J=38.0 Hz, 1 P). 60.21 (d, J=38.0 Hz, 1 P).

Figure 9:
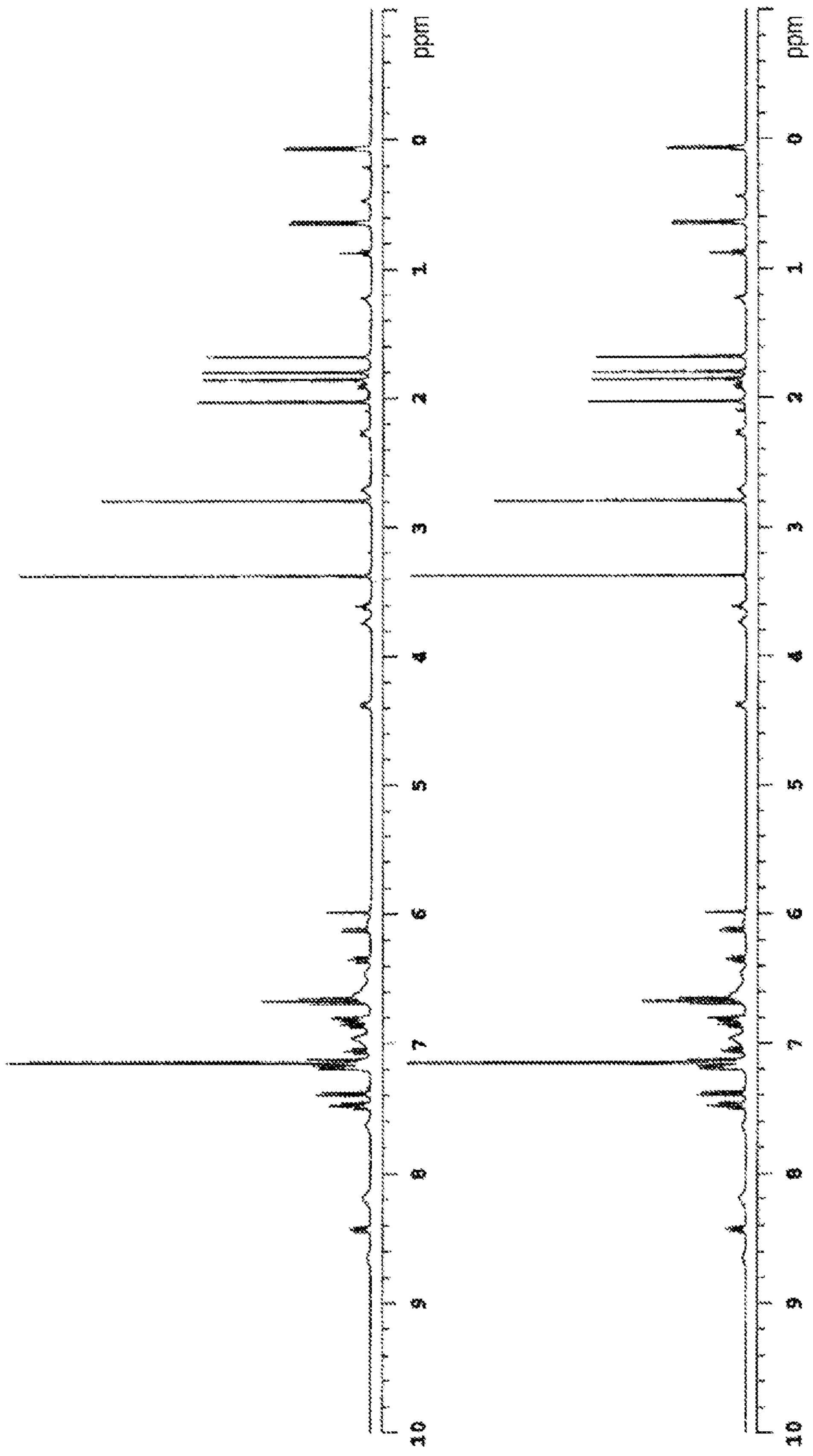
FIG. 9 is a spectrum of the ruthenium complex produced in Example 5, showing the result of $^1$H NMR measured in deuterated benzene immediately after production (right side) and after being left at room temperature in air for 4 weeks (left side).

FIG. 9 summarizes results of $^1$H NMR for the ruthenium complex ((1R,2S,aR)-1'-$A_2$) of the present invention produced in Example 5, measured in deuterated benzene immediately after production (right side) and after being left at room temperature in air for 4 weeks (left side). These analytical results indicate that the complex is extremely stable in air.

Example 6

Production of Ru($\eta^1$-$BH_4$)[(1S,2R)-daipena][(R)-dm-binap]((1S,2R,aR)-1'-$A_3$) (Formula 17)

Formula 17

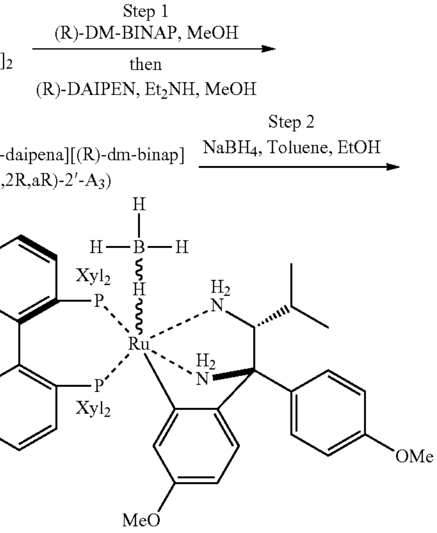

[RuCl$_2$(p-cymene)]$_2$

RuCl[(1S,2R)-daipena][(R)-dm-binap]
((1S,2R,aR)-2'-$A_3$)

Ru($\eta^1$-$BH_4$)[(1S,2R)-daipena][(R)-dm-binap)]
((1S,2R,aR)-1'-$A_3$)

Step 1: After attaching a magnetic stirring bar, a thermometer, a Dimroth condenser, and a three-way stopcock to a 100 mL four-necked round-bottomed flask, the interior of the flask was replaced with nitrogen gas. [RuCl$_2$(p-cymene)]$_2$ (1.50 g, 2.45 mmol, 1.0 equivalent), (R)-DM-BINAP (3.64 g, 4.95 mmol, 2.02 equivalents), and dehydrated methanol (30 mL) were charged into the flask successively. The resulting red slurry was warmed by using an oil bath while stirring with a magnetic stirrer, and then stirred at 50° C. for 1 hour. After cooling the resulting dark red solution to room temperature, (R)-DAIPEN (1.62 g, 5.15 mmol, 2.1 equivalents) and diethylamine (558 μL, 5.39 mmol, 2.2 equivalents) were added, successively, and the mixture was stirred at 60° C. for 2 hours while heating by using the oil bath. After the reaction solution was allowed to cool to room temperature, the orange solid produced was triturated by using a spatula under a nitrogen stream, and the resulting orange slurry was stirred at 40° C. for 1 hour while heating by using the oil bath. The slurry was cooled to −20° C. by using a dry ice-acetone bath and then filtered by suction under a nitrogen stream. The filtered crystals were washed with dehydrated methanol cooled to −20° C. (10 mL), and then dried by heating under reduced pressure (1 Torr, 40° C., 1 hour) to produce a conventional complex, RuCl[(1S,2R)-daipena][(R)-dm-binap], in an amount of 4.56 g as an orange powder. Purity: 97.7% by weight (main impurity was p-cymene); Isolated Yield: 76.7%.

$^{31}$P NMR (161 MHz, $C_6D_6$): δ=61.02 (d, J =39.0 Hz, 1 P), 53.24 (d, J =39.0 Hz, 1 P).

Step 2: After attaching a magnetic stirring bar, a thermometer, a Dimroth condenser, and a three-way stopcock to a 100 mL four-necked round-bottomed flask, the interior of the flask was replaced with nitrogen gas. RuCl[(1S,2R)-daipena][(R)-dm-binap] (Purity: 97.7% by weight, 1.0 g, 0.825 mmol, 1.0 equivalent) produced in Step 1, dehydrated toluene (10 mL), dehydrated ethanol (5 mL), and sodium borohydride (94 mg, 2.48 mmol, 3.0 equivalents) were charged into the flask successively. The resulting reddish orange suspension was warmed by using an oil bath while stirring with a magnetic stirrer, and then stirred under reflux conditions for 15 minutes. Next, the solvents (ca. 7.5 mL) were recovered from the reaction solution under reduced pressure while stirring to give a concentrate, which was allowed to cool to room temperature before dehydrated n-hexane (20 mL) was added. The resulting suspension was filtered through diatomaceous earth (1 g) under a nitrogen stream, and the filtrands were washed with a mixture of dehydrated n-hexane (8 mL) and dehydrated toluene (2 mL). The filtrates were collectively concentrated to dryness under reduced pressure, and the obtained residue was dissolved with dehydrated toluene (2 mL), followed by the gentle addition of dehydrated n-hexane (10 mL). The resulting yellowish orange slurry was cooled to 5° C. by using an ice-water bath and then filtered by suction under a nitrogen stream. The filtered crystals were washed with n-hexane cooled to 5° C. (5 mL), and then dried by heating under reduced pressure (1 Torr, 40° C., 1 hour) to produce a ruthenium complex ((1S,2R,aR)-1'-$A_3$) of the present invention, Ru($\eta^1$$BH_4$)[(1S,2R)-daipena][(R)-dm-binap], in an amount of 777 mg as a yellow powder. Purity: 98.8% by weight (main impurity was n-hexane); Isolated Yield: 80.0%. Note that a single crystal of the complex could be prepared from toluene/n-hexane.

$^{31}$P NMR (161 MHz, $C_6D_6$): δ=63.20 (d, J=37.0 Hz, 1 P), 60.72 (d, J=37.0 Hz, 1 P).

Figure 10:
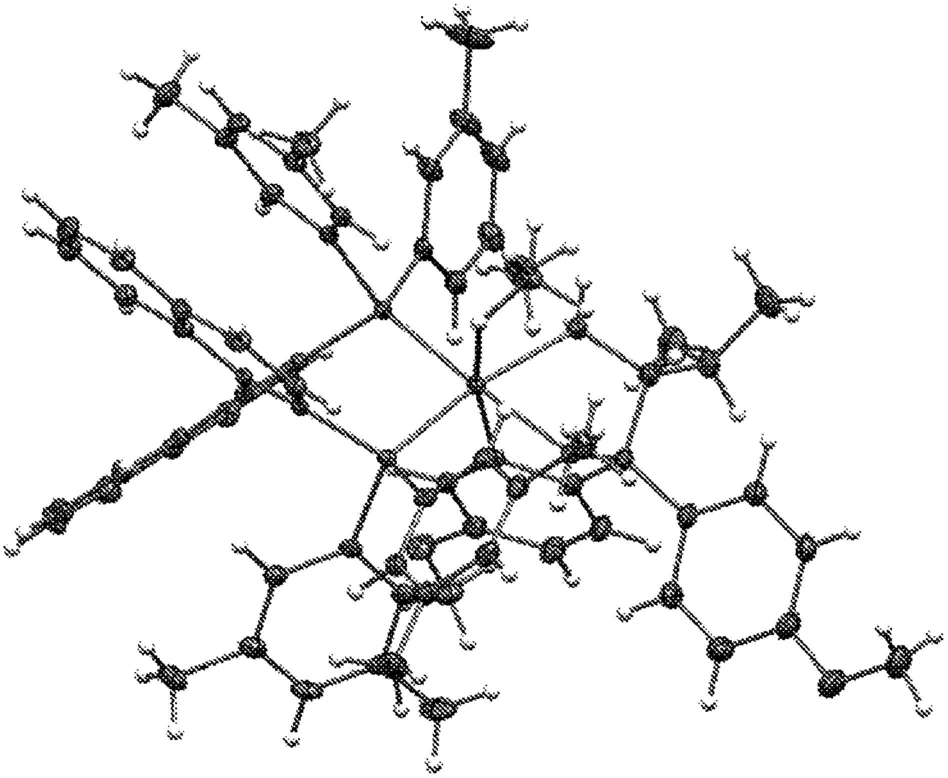
FIG. 10 shows a result of X-ray crystallography (thermal ellipsoid plot; 50% probability level) of the ruthenium complex produced in Example 6.

FIG. 10 shows a result of X-ray crystallography (thermal ellipsoid plot; 50% probability level) of the ruthenium complex ((1S,2R,aR)-1'-$A_3$) of the present invention produced in Example 6. This result reveals that the η-$BH_4$ ligand, which cannot be observed by $^1$H NMR, is incorporated into the complex. Note that the descriptions of solvents contained in the crystal (toluene and n-hexane) are omitted for clarity of the structure of the complex in FIG. 10.

The main parameters that guaranteed the accuracy of the analytical results were as follows. Crystal System: Orthorhombic; Space Group: $P2_12_12_1$(#19), Lattice Constant: a=13.1636(2) Å, b=15.0632(2) Å, c=33.5513(4) Å; $R_1$: 0.0253; $wR_2$: 0.0613; GOF: 1.080; Flack Parameter: −0.017 (4).

Figure 11:
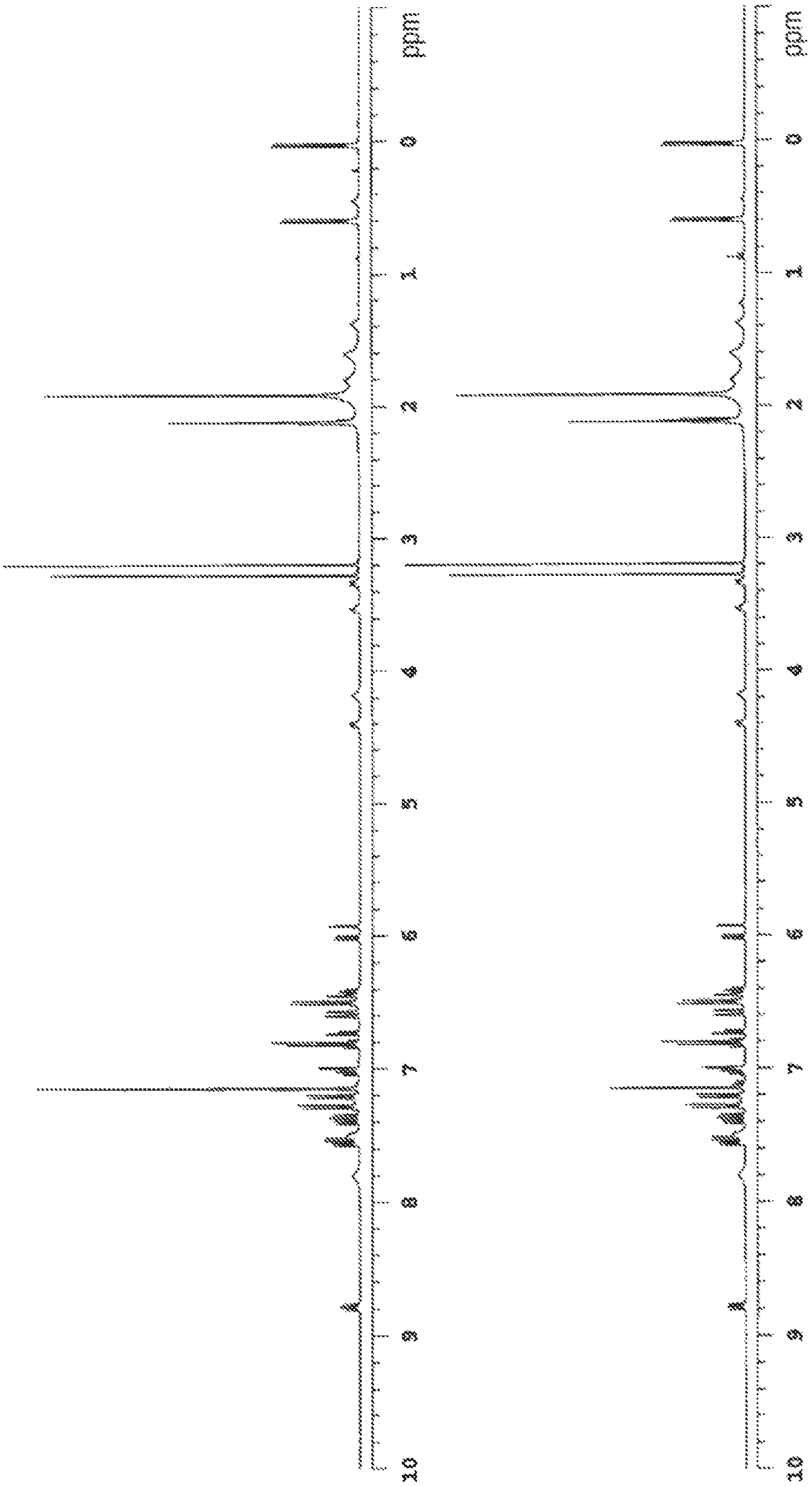
FIG. 11 is a spectrum of the ruthenium complex produced in Example 6, showing the result of $^1$H NMR measured in deuterated benzene immediately after production (right side) and after being left at room temperature in air for 4 weeks (left side)

FIG. 11 summarizes results of $^1$H NMR for the ruthenium complex ((1S,2R,aR)-1'-$A_3$) of the present invention produced in Example 6, measured in deuterated benzene immediately after production (right side) and after being left at room temperature in air for 4 weeks (left side). These analytical results indicate that the complex is extremely stable in air.

Example 7

Production of Ru($\eta^1$-$BH_4$)[(1R,2S)-daipena][(S)-dm-binap]((1R,2S,aS)-1'-$A_3$) (Formula 18)

Formula 18

[$RuCl_2$(p-cymene)]$_2$

Step 1

(S)-DM-BINAP, MeOH then (S)-DAIPEN, $Et_2NH$, MeOH

RuCl[(1R,2S)-daipena][(S)-dm-binap]

((1R,2S,aS)-2'-$A_3$)

Step 2

$NaBH_4$, Toluene, EtOH

-continued

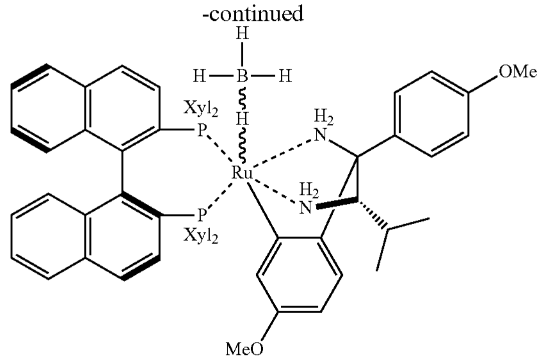

Ru($\eta^1$-$BH_4$)[(1R,2S)-daipena][(S)-dm-binap)]

((1R,2S,aS)-1'-$A_3$)

In the same manner as in Example 6, a ruthenium complex ((1R,2S,aS)-1'-$A_3$) of the present invention, Ru($\eta^1$-$BH_4$)[(1R,2S)-daipena][(S)-dm-binap], was produced in an amount of 766 mg as a yellow powder stable at room temperature in air by using (S)-DM-BINAP instead of (R)-DM-BINAP and (S)-DAIPEN instead of (R)-DAIPEN. Purity: 98.0% by weight (main impurity was n-hexane); Isolated Yield in Step 2: 78.2%. Note that a single crystal of the complex could be prepared from toluene/n-hexane.

$^{31}$P NMR. (161 MHz, $C_6D_6$): δ=63.16 (d, J=37.0 Hz, 1 P). 60.68 (d, J=37.0 Hz, 1 P).

Figure 12:
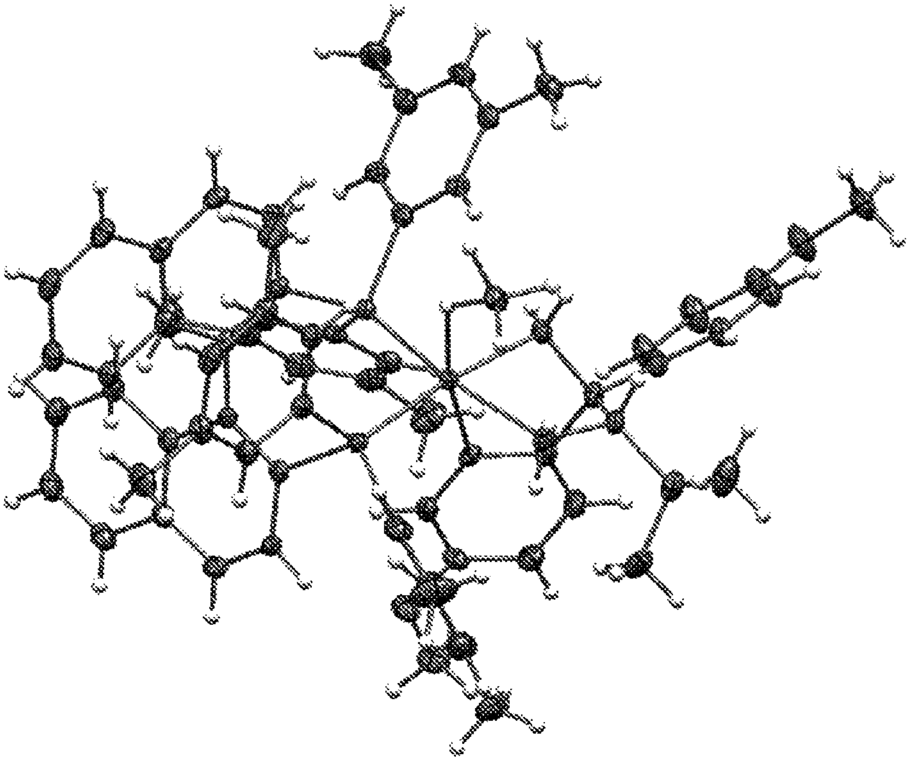
FIG. 12 shows a result of X-ray crystallography (thermal ellipsoid plot; 50% probability level) of the ruthenium complex produced in Example 7.

FIG. 12 shows a result of X-ray crystallography (thermal ellipsoid plot; 50% probability level) of the ruthenium complex ((1R,2S,aS)-1'-$A_3$) of the present invention produced in Example 7. This result reveals that the $\eta^1$-$BH_4$ ligand, which cannot be observed by $^1$H NMR, is incorporated into the complex. Note that the descriptions of solvents contained in the crystal (toluene and n-hexane) are omitted for clarity of the structure of the complex in FIG. 12.

The main parameters that guaranteed the accuracy of the analytical results were as follows. Crystal System: Orthorhombic; Space Group: $P2_12_12_1$(#19); Lattice Constant: a=13.18064(10) Å, b=15.03165(9) Å, c=33.5094(2) Å; $R_1$: 0.0305; $wR_2$: 0.0792; GOF: 1.034; Flack Parameter: −0.021 (2).

Example 8

Production of Ru($\eta^1$-$BH_4$[(1S,2R)-daipena][(R)-dm-segphos]((1S,2R,aR)-1'-$B_3$) (Formula 19)

Formula 19

[$RuCl_2$(p-cymene)]$_2$

Step 1

(R)-DM-SEGPHOS, MeOH then (R)-DAIPEN, $Et_2NH$, MeOH

RuCl[(1S,2R)-daipena][(R)-dm-segphos]

((1S,2R,aR)-2'-$B_3$)

Step 2

$NaBH_4$, Toluene, EtOH

-continued

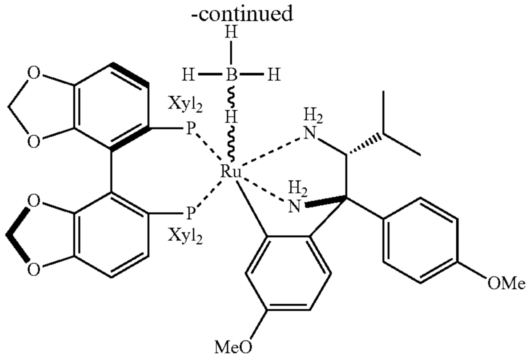

$Ru(\eta^1\text{-}BH_4)$[(1S,2R)-daipena][(R)-dm-segphos]
((1S,2R,aR)-1'-$B_3$)

Step 1: After attaching a magnetic stirring bar, a thermometer, a Dimroth condenser, and a three-way stopcock to a 100 mL four-necked round-bottomed flask, the interior of the flask was replaced with nitrogen gas. $[RuCl_2$(p-cymene)$]_2$ (1.50 g, 2.45 mmol, 1.0 equivalent), (R)-DM-SEGPHOS (3.58 g, 4.95 mmol, 2.02 equivalents), and dehydrated methanol (30 mL) were charged into the flask successively. The resulting red slurry was warmed by using an oil bath while stirring with a magnetic stirrer, and then stirred at 50° C. for 1 hour. After cooling the resulting reddish orange suspension to room temperature. (R)-DAIPEN (1.62 g, 5.15 mmol, 2.1 equivalents) and diethylamine (558 μL, 5.39 mmol, 2.2 equivalents) were added successively, and the mixture was stirred at 60° C. for 3 hours while heating by using the oil bath. Dehydrated methanol (7.5 mL) was added to the resulting yellow slurry, which was then cooled to −20° C. by using a dry ice-acetone bath and filtered by suction under a nitrogen stream. The filtered crystals were washed with dehydrated methanol cooled to −20° C. (20 mL), and then dried by heating under reduced pressure (1 Torr, 40° C., 1 hour) to produce a conventional complex, RuCl[(1S,2R)-daipena][(R)-dm-segphos], in an amount of 3.96 g as a yellow powder. Purity: 97.7% by weight (main impurity was p-cymerte); Isolated Yield: 68.5%.

$^{31}$P NMR (161 MHz, $C_6D_6$): δ=57.40 (d, J=39.0 Hz, 1 P), 52.60 (d, J=39.0 Hz, 1 P).

Step 2: After attaching a magnetic stirring bar, a thermometer, a Dimroth condenser, and a three-way stopcock to a 100 mL four-necked round-bottomed flask, the interior of the flask was replaced with nitrogen gas. RuCl[(1S,2R(-daipena][(R)-dm-segphos] (Purity: 97.7% by weight, 1.50 g, 1.25 mmol, 1.0 equivalent) produced in Step 1, dehydrated toluene (30 mL), dehydrated ethanol (7.5 mL), and sodium borohydride (236 mg, 6.25 mmol, 5.0 equivalents) were charged into the flask successively. The resulting yellowish orange suspension was warmed by using an oil bath while stirring with a magnetic stirrer, and then stirred under reflux conditions for 1 hour. Next, the solvents (ca. 30 mL) were recovered from the reaction solution under reduced pressure while stirring to give a concentrate, which was allowed to cool to room temperature before dehydrated n-hexane (30 mL) was added gently. The resulting light brown slurry was cooled to 5° C. by using an ice-water bath, followed by the addition of tap water (15 mL), and then filtered by suction under a nitrogen stream. The filtered crystals were washed with tap water (15 mL) and n-hexane (15 mL) successively, and then dried by heating under reduced pressure (1 Torr; 40° C., 1 hour) to produce a ruthenium complex ((1S,2R,aR)-1'-$B_3$) of the present invention, $Ru(\eta^1\text{-}BH_4)$[(1S,2R)-daipena][(R)-dm-seaphos], in an amount of 1.41 g as a cream-colored powder. Purity: 99.2% by weight (main impurity was n-hexane); Isolated Yield: 96.8%. Note that a single crystal of the complex could be prepared from toluene/n-hexane.

$^{31}$P NMR (161 MHz, $C_6D_6$): δ=60.48 (d, J=37.5 Hz, 1 P), 60.13 (d, J=37.5 Hz, 1 P).

Figure 13:
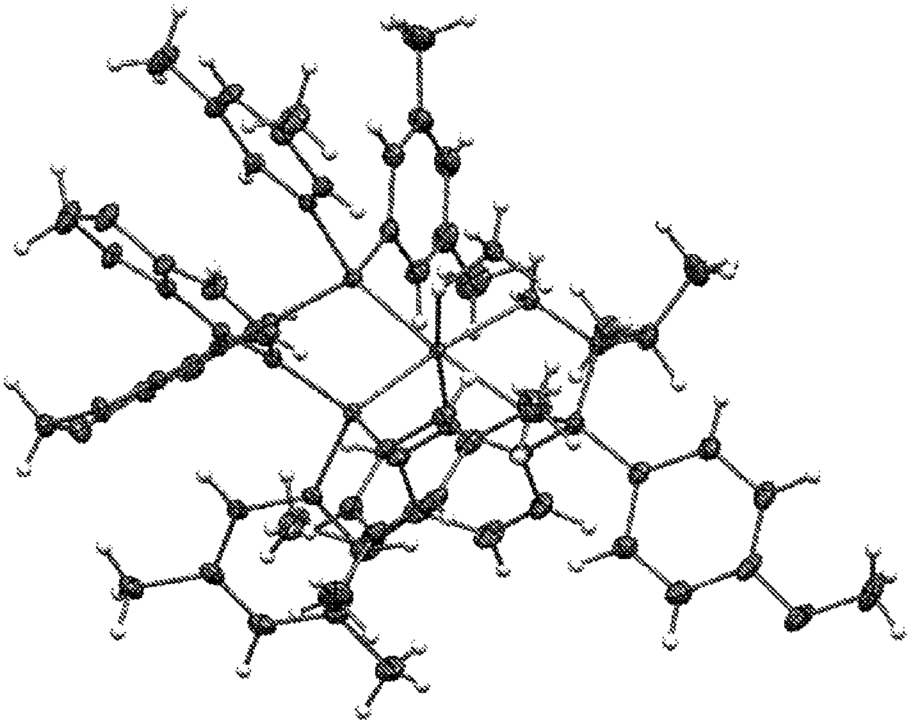
FIG. 13 shows a result of X-ray crystallography (thermal ellipsoid plot; 50% probability level) of the ruthenium complex produced in Example 8.

FIG. 13 shows a result of X-ray crystallography (thermal ellipsoid plot; 50% probability level) of the ruthenium complex ((1S,2R,aR)-1'-$B_3$) of the present invention produced in Example 8. This result reveals that the $\eta^1$-$BH_4$ ligand, which cannot be observed by $^1$H NMR, is incorporated into the complex. Note that the description of solvent contained in the crystal (toluene) is omitted for clarity of the structure of the complex in FIG. 12, The main parameters that guaranteed the accuracy of the analytical results were as follows. Crystal System: Monoclinic; Space Group: C2(#5); Lattice Constant: a=23.4930 (3) Å, b=12.54820(10) Å, c=22.9459(2) Å, β99.7850(10)°; $R_1$: 0.0270; $wR_2$: 0.0639; GOF: 1.028; Flack Parameter: −0.026(6).

Figure 14:
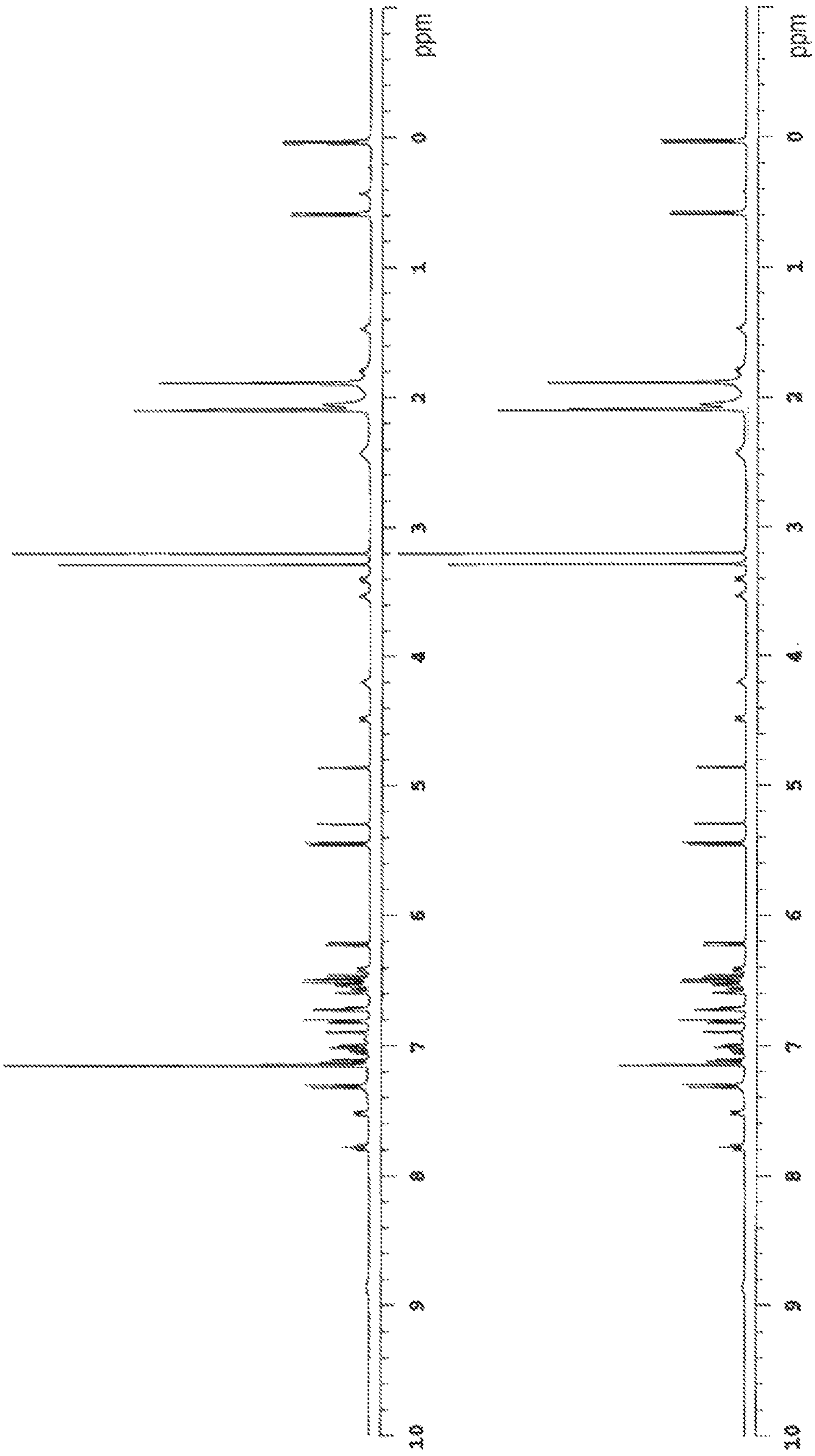
FIG. 14 is a spectrum of the ruthenium complex produced in Example 8, showing the result of $^1$H NMR measured in deuterated benzene immediately after production (right side) and after being left at room temperature in air for 4 weeks (left side).

FIG. 14 summarizes results of $^1$H NMR for the ruthenium complex ((1S,2R,aR)-1'-$B_3$) of the present invention produced in Example 8, measured in deuterated benzene immediately after production (right side) and after being left at room temperature in air for 4 weeks (left side). These analytical results indicate that the complex is extremely stable in air.

Example 9

Production of $Ru(\eta^1\text{-}BH_4)$1(1R,2S)-daipenal 1(S)-dm-segphos ((1R,2S,aS)-1'-B3) (Formula 20)

Formula 20
$[RuCl_2$(p-cymene)$]_2$

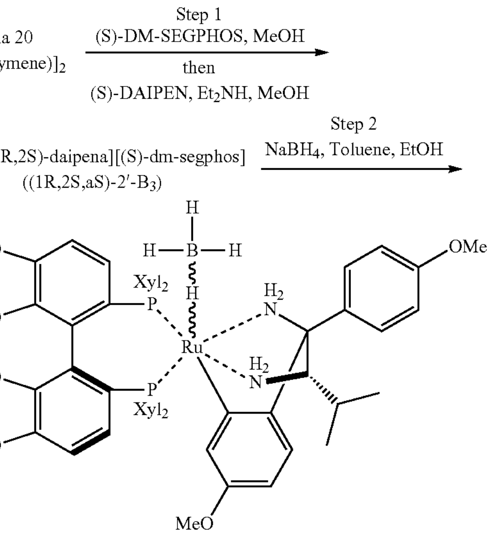

RuCl[(1R,2S)-daipena][(S)-dm-segphos]
((1R,2S,aS)-2'-$B_3$)

$Ru(\eta^1\text{-}BH_4)$[(1R,2S)-daipena][(S)-dm-segphos]
((1R,2S,aR)-1'-$B_3$)

In the same manner as in Example 8, a ruthenium complex ((1R,2S,aS)-1'-$B_3$) of the present invention ; $Ru(\eta^1\text{-}BH_4)$[(1R,2S)-daipena][(S)-dm-segphos], was produced in an amount of 1.40 g as a cream-colored powder stable at room temperature in air by using (S)-DM-SEGPHOS instead of (R)-DM-SEGPHOS and (S)-DAIPEN instead of (R)-DAIPEN. Purity: 99.0% by weight (main impurity was n-hexane); Isolated Yield in Step 2: 96.2%. Note that a single crystal of the complex could be prepared from toluene/n-hexane.

$^{31}$P NMR (161 MHz, $C_6D_6$): δ=60.49 (d, J=37.5 Hz, 1 P), 60.14 (d, J=37.5 Hz, 1 P).

Figure 15:
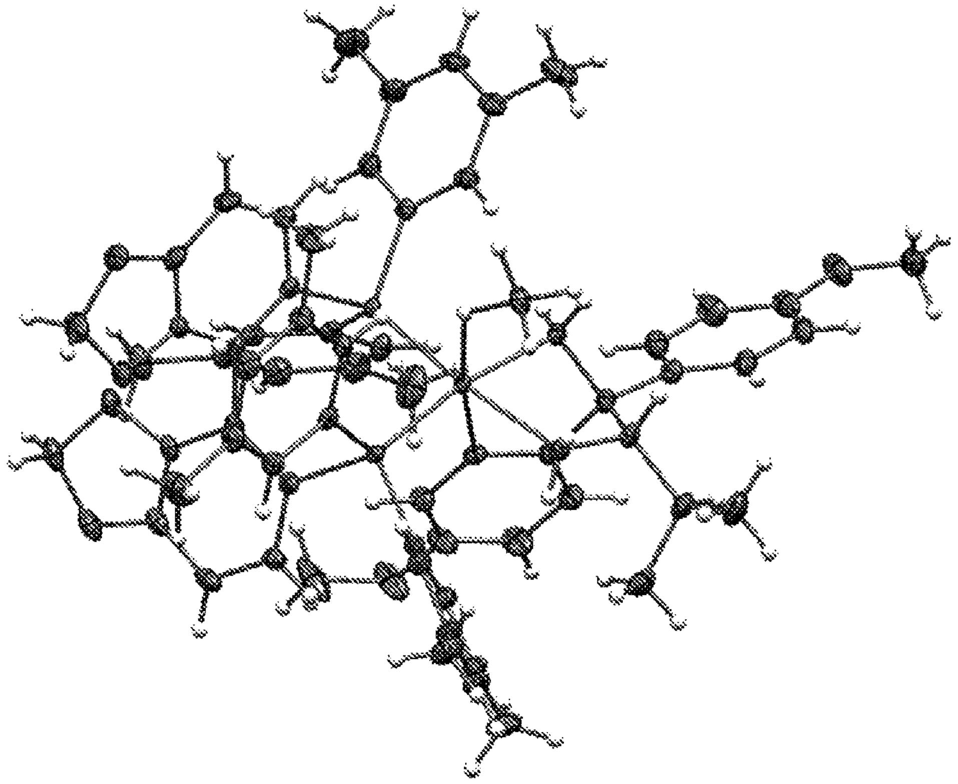
FIG. 15 shows a result of X-ray crystallography (thermal ellipsoid plot; 50% probability level) of the ruthenium complex produced in Example 9.

FIG. 15 shows a result of X-ray crystallography (thermal ellipsoid plot; 50% probability level) of the ruthenium complex ((1R,2S,aS)-1'-$B_3$) of the present invention produced in Example 9. This result reveals that the $\eta^1$-$BH_4$ ligand, which cannot be observed by $^1$H NMR, is incorporated into the complex. Note that the description of solvent contained in the crystal (toluene) is omitted for clarity of the structure of the complex in FIG. 15.

The main parameters that guaranteed the accuracy of the analytical results were as follows. Crystal System: Monoclinic; Space Group: C2(#5), Lattice Constant: a=23.5053 (2) Å, b=12.54830(10) Å, c=22.9340(3) Å, β=99,7550(10)°; $R_1$: 0.0270; $wR_2$: 0.0639; GOF: 1.028; Flack Parameter: −0.026(6),

Example 10

Production of Ru($\eta^1$-$BH_4$)[(1S,2R)-daipena][(R)-$h_8$-binap]((1S,2R,aR)-1'-$C_1$) (Formula 21)

Formula 21

[RuCl2(p-cymene)]2

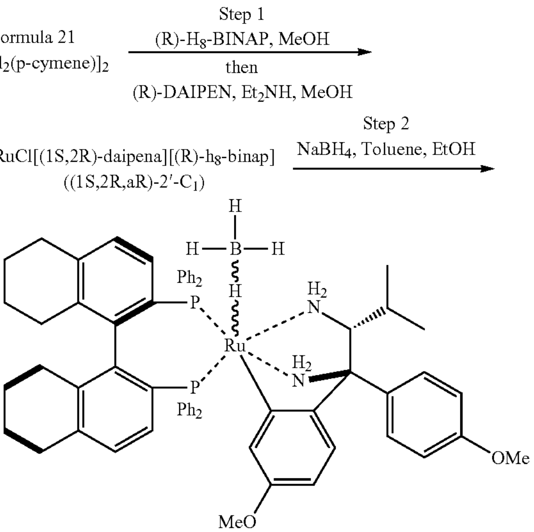

RuCl[(1S,2R)-daipena][(R)-h8-binap]
((1S,2R,aR)-2'-C1)

Ru(η1-BH4)[(1S,2R)-daipena][(R)-h8-binap)]
((1S,2R,aR)-1'-C1)

Step 1: After attaching a magnetic stirring bar, a thermometer, a Dimroth condenser, and a three-way stopcock to a 50 mL four-necked round-bottomed flask, the interior of the flask was replaced with nitrogen gas. [$RuCl_2$(p-cymene)]$_2$ (1.00 g, 1.63 mmol, 1,0 equivalent), (R)-$H_8$-BINAP (2.08 g, 3.29 mmol, 2.02 equivalents), and dehydrated methanol (20 mL) were charged into the flask successively. The resulting red slurry was warmed by using an oil bath while stirring with a magnetic stirrer, and then stirred at 50° C. for 2 hours. After cooling the resulting reddish orange slurry to room temperature, (R)-DAIPEN (1.08 g, 3.42 mmol, 2.1 equivalents), diethylamine (422 μL, 4.08 mmol, 2.5 equivalents), and dehydrated methanol (5 mL) were added successively, and the mixture was stirred at 55° C. for 2 hours while heating by using the oil bath. The resulting yellowish orange slurry was cooled to −20° C. by using a dry ice-acetone bath and then filtered by suction under a nitrogen stream. The filtered crystals were washed twice with dehydrated methanol cooled to −20° C. (5 ml×2), and then dried by heating under reduced pressure (1 Torr, 40° C., 2 hours) to produce a conventional complex. RuCl[(1S,2R)-daipena][(R)-$h_8$-binap], in an amount of 2.93 as a yellow powder. Purity: 99.1% by weight (main impurity was methanol); isolated Yield: 82.4%.

$^{31}$P NMR (161 MHz, $C_6D_6$): δ=59.25 (d, J=39.9 Hz, 1 P), 54.20 (d, J=39.9 Hz, 1 P).

Step 2: After attaching a magnetic stirring bar, a thermometer, a Dimroth condenser, and a three-way stopcock to a 100 mL four-necked round-bottomed flask, the interior of the flask was replaced with nitrogen gas. RuCl[(1R,2S)-daipena][(R)-$h_8$-binap] (Purity: 99.1% by weight, 1.50 g, 1.38 mmol, 1.0 equivalent) produced in Step 1, dehydrated toluene (30 mL), dehydrated ethanol (7.5 mL), and sodium borohydride (156 mg, 4.14 mmol, 3.0 equivalents) were charged into the flask successively. The resulting yellow suspension was warmed by using an oil bath while stirring with a magnetic stirrer, and then stirred at 35° C. for 1 hour. Next, the solvents (ca. 22.5 mL) were recovered from the reaction solution under reduced pressure while stirring to give a concentrate, which was allowed to cool to room temperature and washed four times with degassed water (7.5 mL×4), and the resulting organic layer was concentrated to dryness under reduced pressure. The obtained residue was dissolved with dehydrated toluene (4.5 mL), followed by the gentle addition of dehydrated n-hexane (90 mL) to give a cream-colored slurry, which was then - filtered by suction under a nitrogen stream. The filtered crystals were washed with n-hexane (30 mL), and then dried by heating under reduced pressure (1 Torr, 40° C., 3 hours) to produce a ruthenium complex ((1S,2R,aR)-1'-$C_1$) of the present invention, Ru($\eta^1$-$BH_4$)[(1S,2R)-daipena][(R)-$h_8$-binap], in an amount of 1.30 g as a cream-colored powder. Purity: >99.9% by weight; Isolated Yield: 88.9%.

$^{31}$P NMR (161 MHz, $C_6D_6$): δ=60.62 (d, J=38.0 Hz, 1 P), 60.18 (d, J=38.0 Hz, 1 P).

Figure 16:
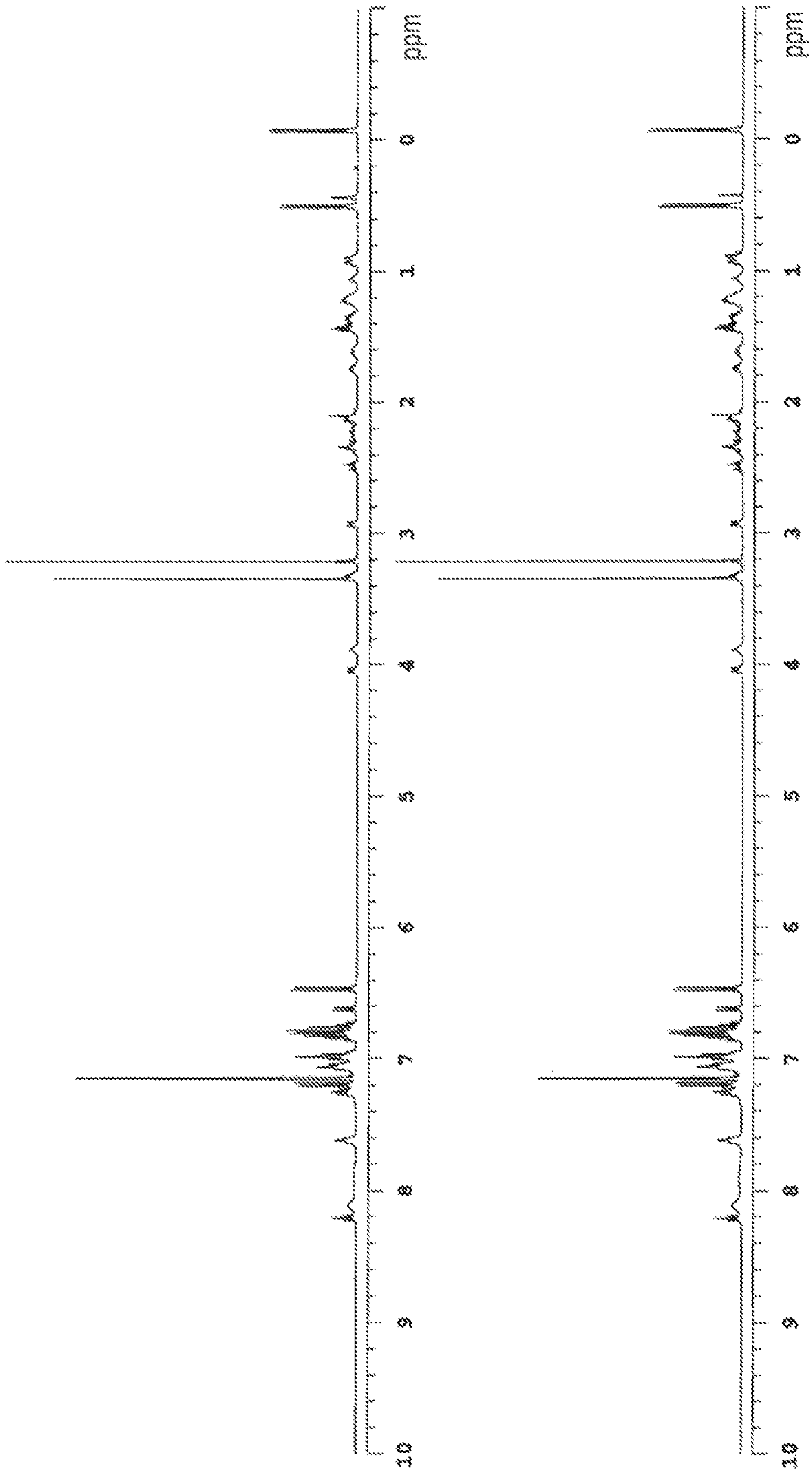
FIG. 16 is a spectrum of the ruthenium complex produced in Example 10, showing the result of $^1$H NMR measured in deuterated benzene immediately after production (right side) and after being left at room temperature in air for 4 weeks (left side).

FIG. 16 summarizes results of $^1$H NMR for the ruthenium complex ((1S,2R,aR)-1'-$C_1$) of the invention produced in Example 10, measured in deuterated benzene immediately after production (right side) and after being left at room temperature in air for 4 weeks (left side). These analytical results indicate that the complex is extremely stable in air.

Example 11

Comparative Example 1

Production of (S)-1-phenylethanol. ((S)-6-1) by asymmetric hydrogenation of acetophenone (5-1) using Ru($\eta^1$-$BH_4$)[(1S,2R)-daipena][(R)-binap]((1S, 2R,aR)-1'-$A_1$) and RuCl[(1S,2R)-daipena]l(R)-bi-napj as catalysts (Formula 22)

Formula 22

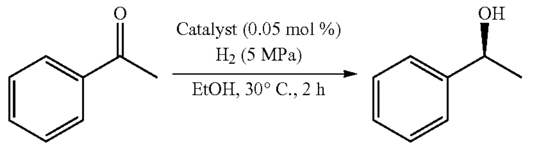

(5-1) ((S)-6-1)

-continued

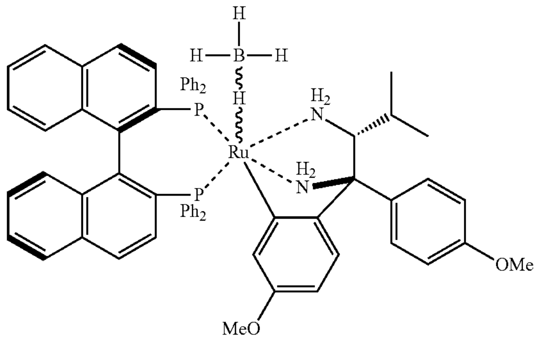

Catalyst:
Ru($\eta^1$-$BH_4$)[(1S,2R)-daipena][(R)-binap]
((1S,2R,aR)-1'-$A_1$)
Result:
Conv. >99%, Sel. >99%
97.6% ee

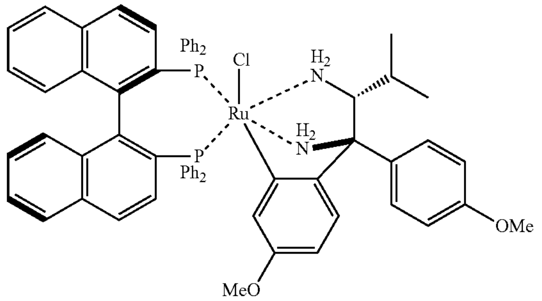

Catalyst:
RuCl[(1S,2R)-daipena][(R)-binap]
((1S,2R,aR)-2'-$A_1$)
Result: Conv. 0.3%

After attaching a magnetic stirring bar to a 50 mL stainless steel autoclave apparatus, the ruthenium complex ((1S,2R,aR)-1'-$A_1$) of the present invention produced in Example 1, Ru($\eta^1$-$BH_4$)[(1S,2R)-daipena][(R)-binap] (Purity: 86.6% by weight, 3.0 mg, 0.05 mol %), was charged into the apparatus, and the interior of the apparatus was replaced with nitrogen gas. Next, dehydrated ethanol (2.5 mL) and acetophenone (5-4) (600 mg, 583 μL, 5.00 mmol, 1.0 equivalent) were charged into the apparatus successively. The interior of the apparatus was replaced with hydrogen gas to set the internal pressure to 5 MPa, followed by stirring the reaction solution at 30° C. for 2 hours to produce a desired (S)-1-phenylethanol ((S)-6-1). Conversion: >99%; Selectivity: >99; Optical Purity: 97.6% ee (according to GC analysis). Note that the GC retention times of each compound were as follows: Acetophenone: 3.8 minutes; (R)-1-Phenylethanol: 7.1 minutes; (S)-1-Phenylethanol: 7.3 minutes.

On the other hand, as Comparative Example 1, asymmetric hydrogenation of acetophenone (5-1) was attempted under the same conditions as in Example 11 by using the conventional complex, RuCl[(1S,2R)-daipena][(R)-binap] (Purity: 99.7% by weight, 2.7 mg, 0.05 mol %), as a catalyst, but the conversion was only 0.3%.

Example 12/Comparative Example 2

Production of (S)-1-phenylethanol ((S)-6-1) by asymmetric hydrogenation of acetophenone (5-1) using Ru($\eta^1$-$BH_4$)[(1S,2R)-daipena][(R)-t-binap] ((1S,2R,aR)-1'-$A_2$) and RuCl[(1S,2R)-daipena][(R)-t-binap] as catalysts (Formula 23)

Formula 23

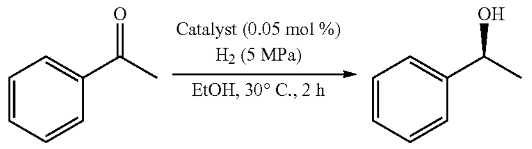

(5-1) ((S)-6-1)

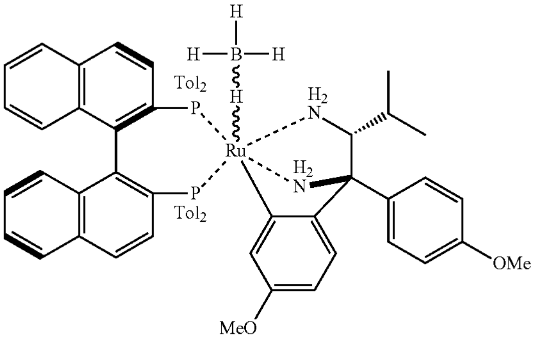

Catalyst:
Ru($\eta^1$-$BH_4$)[(1S,2R)-daipena][(R)-t-binap]
((1S,2R,aR)-1'-$A_2$)
Result:
Conv. >99%, Sel. >99%
95.7% ee

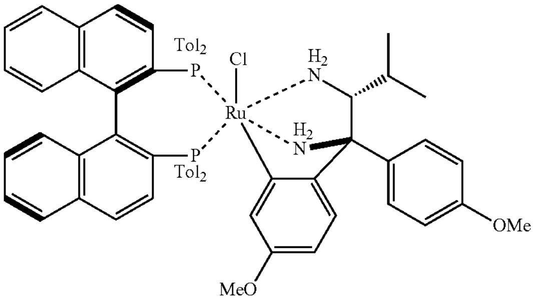

Catalyst:
RuCl[(1S,2R)-daipena][(R)-t-binap]
((1S,2R,aR)-2'-$A_2$)
Result: Conv. 1.2%

The desired (S)-1-phenylethanol ((S)-6-1) was produced from acetophenone by the reaction at 30° C. for 2 hours in the same manner as in Example 11 using the ruthenium complex ((1S,2R,aR)-1'-$A_2$) of the present invention produced in Example 3, Ru($\eta^1$-$BH_4$)[(1S,2R)-daipena][(R)-t-binap] (Purity: 92.3% by weight, 3.0 mg, 0.05 mol %), as a catalyst, Conversion: >99%; Selectivity: >99%; Optical Purity: 95.7% ee (according to GC analysis).

On the other hand, as Comparative Example 2, asymmetric hydrogenation of acetophenone (5-1) was attempted under the same conditions as in Example 12 by using the conventional complex, RuCl[(1S,2R)-daipena][(R)-t-binap]

(Purity: 99.9% by weight, 2.8 mg, 0.05 mol %), as a catalyst, but the conversion was only 1.2%.

Example 13/Comparative Example 3

Production of (S)-1-phenylethanol ((S)-6-1) by asymmetric hydrogenation of acetophenone (5-1) using Ru($\eta^1$-$BH_4$)[(1S,2R)-daipena][(R)-dm-binap] ((1S,2R,aR)-1'-$A_3$) and RuCl[(1S,2R)-daipena][R)-dm-binap] as catalysts (Formula 24)

Formula 24

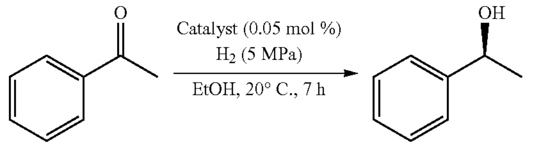

(5-1) ((S)-6-1)

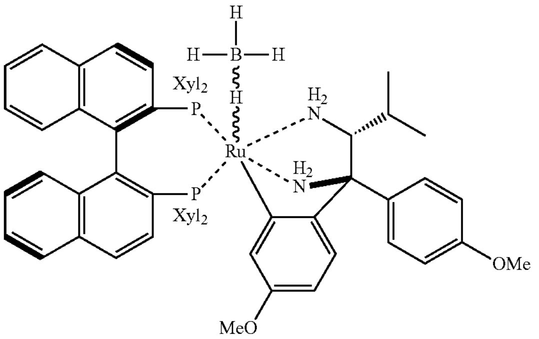

Catalyst:
Ru($\eta^1$-$BH_4$)[(1S,2R)-daipena][(R)-dm-binap]
((1S,2R,aR)-1′-$A_3$)
Result:
Conv. >99%, Sel. >99%
99.3% ee

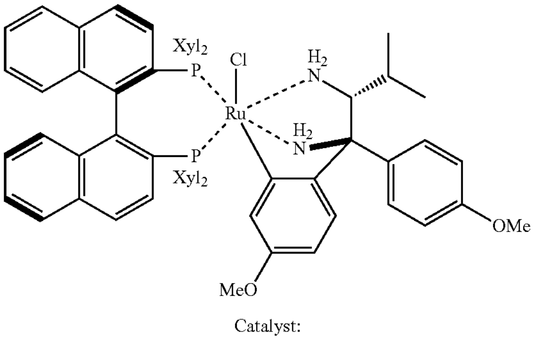

Catalyst:
RuCl[(1S,2R)-daipena][(R)-dm-binap]
((1S,2R,aR)-2′-$A_3$)
Result: Conv. 4.2%

The desired (S)-1-phenylethanol ((S)-6-1) was produced from acetophenone by the reaction at 20° C. for 7 hours in the same manner as in Example 11 using the ruthenium complex ((1S,2R,aR)-1'-$A_3$) of the present invention produced in Example 6, Ru($\eta^1$-$BH_4$)[(1S,2R)-daipena][(R)-dm-binap] (Purity: 98.8% by weight, 2.9 mg, 0.05 mol %), as a catalyst. Conversion: >99%; Selectivity: >99%; Optical Purity: 99.3ee (according to GC analysis).

On the other hand as Comparative Example 3, asymmetric hydrogenation of acetophenone (5-1) was attempted under the same conditions as in Example 13 by using the conventional complex, RuCl[(1S,2R)-daipena][(R)-dm-binap] (Purity: 97.7% by weight, 3.0 mg, 0.05 mol %), as a catalyst, but the conversion was only 4.2%.

Example 14/Comparative Example 4

Production of (S)-1-phenylethanoi ((S)-6-1) by asymmetric hydrogenation of acetophenone. (5-1) using Ru($\eta^1$-$BH_4$)[(1S,2R)-daipena][(R)-dm-sephos] ((1S,2R,aR)-1'-B3) and RuCl[(1S,2R)-daipena][(R)-dm-segphos] as catalysts (Formula 25)

Formula 25

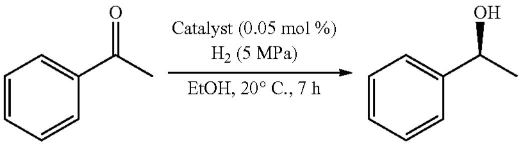

(5-1) ((S)-6-1)

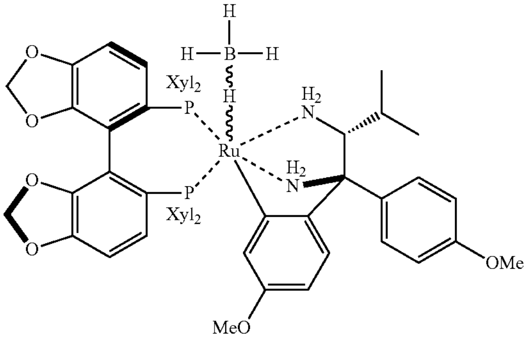

Catalyst:
Ru($\eta^1$-$BH_4$)[(1S,2R)-daipena][(R)-dm-segphos]
((1S,2R,aR)-1′-$B_3$)
Result:
Conv. >99%, Sel. >99%
98.4% ee

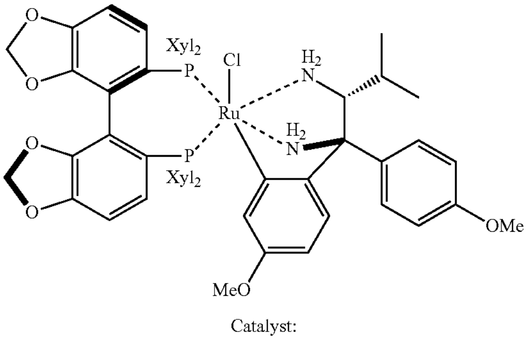

Catalyst:
RuCl[(1S,2R)-daipena][(R)-dm-segphos]
((1S,2R,aR)-2′-$B_3$)
Result: Conv. 0.5%

The desired (S)-1-phenylethanol ((S)-6-1) was produced from acetophenone by the reaction at 20° C. for 7 hours in the same manner as in Example 11 using the ruthenium complex ((1S,2R,aR)-1'-$B_3$) of the present invention produced in Example 8, Ru($\eta^1$-$BH_4$)[(1S,2R)-daipena][(R)- dm-segphos] (Purity: 99.2% by weight, 2.9 mg, 0.05 mol %), as a catalyst. Conversion: >99%; Selectivity: >99%; Optical Purity: 98.4% ee (according to GC analysis).

On the other hand, as Comparative Example 4, asymmetric hydrogenation of acetophenone (5-1) was attempted under the same conditions as in Example 14 by using the conventional complex, RuCl[(1S,2R)-daipena][(R)-dm-segphos] (Purity: 97.7% by weight, 2.9 mg, 0.05 mol %), as a catalyst, but the conversion was only 0.5%.

Example 15/Comparative Example 5

Production of (S)-1-phenylethanol ((S)-6-1) by asymmetric hydrogenation of acetophenone (5-1) using Ru($\eta^1$-$BH_4$)[(1S,2R)-daipena][(R)-$h_8$-binap] ((1S,2R,aR)-1'-$C_1$) and RuCl[(1S,2R)-daipena][(R)-$h_8$-binap] as catalysts (Formula 26)

Formula 26

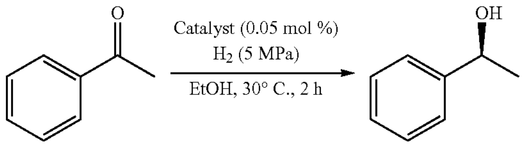

(5-1) ((S)-6-1)

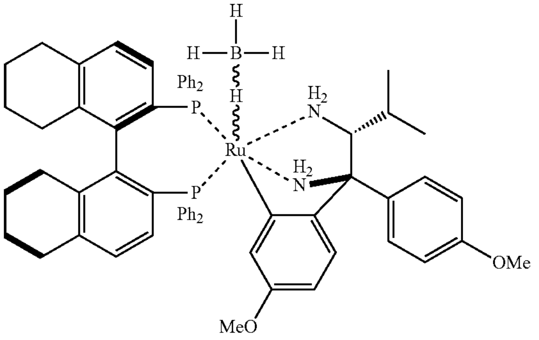

Catalyst:
Ru($\eta^1$-$BH_4$)[(1S,2R)-daipena][(R)-$h_8$-binap]
((1S,2R,aR)-1'-$C_1$)
Result:
Conv. >99%, Sel. >99%
96.5% ee

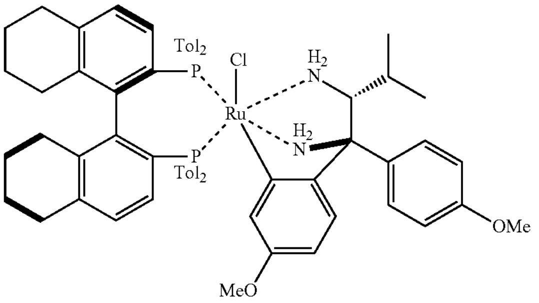

Catalyst:
RuCl[(1S,2R)-daipena][(R)-$h_8$-binap]
((1S,2R,aR)-2'-$C_1$)
Result: Conv. 1.5%

The desired (S)-1-phenylethanol ((S)-6-1) was produced from acetophenone by the reaction at 30° C. for 2 hours as in Example 11 using the ruthenium complex ((1S,2R,aR)-1'-$C_1$) of the present invention produced in Example 10, Ru($\eta^1$-$BH_4$)[(1S,2R)-daipena][(R)-$h_8$-binap] (Purity: >99.9% weight, 2.7 mg, 0.05 mol %), as a catalyst. Conversion: >99%; Selectivity: >99%; Optical Purity: 96.5% ee (according to GC analysis).

On the other hand, as Comparative Example 5, asymmetric hydrogenation of acetophenone (5-1) was attempted under the same conditions as in Example 15 by using the conventional complex, RuCl[(1S,2R)-daipena][(R)-$h_8$-binap] (Purity: 99.1% by weight, 2.7 mg, 0.05 mol %), as a catalyst, but the conversion was only 1.5%.

Following Table 1 summarizes the results of Examples 11 to 15 and Comparative Examples 1 to 5. Note that only the compound numbers corresponding to the ruthenium complexes of the present invention and the conventional complexes used as catalysts are shown in Table 1 for clarity of the results, since the combinations of the absolute configuration of central chiralities and axial chirality in these complexes in these Examples and Comparative Examples are all (1S,2R,aR).

TABLE 1

| Examples/ Comparative Examples | Compound Numbers Of the Complex | Conversion (%) | Selectivity (%) | Optical Purity (% ee) |
|---|---|---|---|---|
| Example 11 | 1'-$A_1$ | >99 | >99 | 97.6 |
| Example 12 | 1'-$A_2$ | >99 | >99 | 95.7 |
| Example 13 | 1'-$A_3$ | >99 | >99 | 99.3 |
| Example 14 | 1'-$B_3$ | >99 | >99 | 98.4 |
| Example 15 | 1'-$C_1$ | >99 | >99 | 96.5 |
| Comparative Example 1 | 2'-$A_1$ | 0.3 | — | — |
| Comparative Example 2 | 2'-$A_2$ | 1.2 | — | — |
| Comparative Example 3 | 2'-$A_3$ | 4.2 | — | — |
| Comparative Example 4 | 2'-$B_3$ | 0.5 | — | — |
| Comparative Example 5 | 2'-$C_1$ | 1.5 | — | — |

As shown in Table 1, in the asymmetric hydrogenation of acetophenone (5-1) using the ruthenium complexes ((1S,2R, aR)-1'-$A_1$) to ((1S,2R,aR)-1'-$C_1$) of the present invention as catalysts, which do not require a base for their activation, the conversion and selectivity were both >99%, and the optical purity of (S)-1-phenylethanol ((S)-6-1) produced was also excellent, ranging from 95.7 to 99.3% ee (Examples 11 to 15). On the other hand, the conversion of the reaction was only 0.3 to 4,2% when a conventional complexes ((1 S,2R, aR)-2'-$A_1$) to ((1S,2R,aR)-2'-$C_1$) were used as catalysts, which require a base for their activation (Comparative Examples 1 to 5). From these results, it is clear that the ruthenium complex (1) of the present invention exhibits excellent performance as a catalyst for asymmetric hydrogenation even in the absence of a base and is superior to the conventional complex (2).

Example 16

Production of (S)-4-(1-hydroxyethyl)benzonitrile ((S)-6-2) by asymmetric hydrogenation of 4-acetylbenzonitrile (5-2) using Ru($\eta^1$-$B_4$)[(1S,2R)-daipena][(R)-dm-binap] ((1S,2R,aR)-1'-$A_3$) as a catalyst (Formula 27)

Formula 27

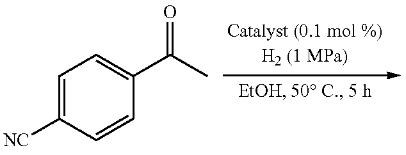

(5-2)

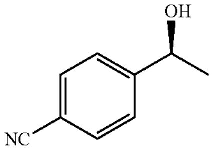

((S)-6-2)

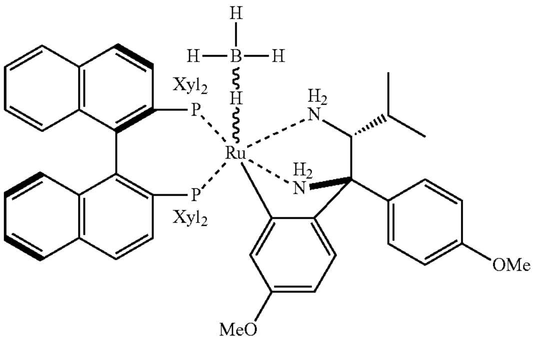

Catalyst:
Ru($\eta^1$-$BH_4$)[(1S,2R)-daipena][(R)-dm-binap]
((1S,2R,aR)-1'-$A_3$)
Result:
Conv. >99%, Sel. >99%
99.2% ee After attaching a magnetic stirring bar to a 50 mL stainless steel autoclave apparatus, the ruthenium complex ((1S,2R,aR)-1'-$A_3$) of the present invention produced in Example 6, Ru($\eta^1$-$BH_4$)[(1S,2R)-daipena][(R)-dm-binap] (Purity: 98.8% by weight, 2.9 mg, 0.1 mol %), and 4-acetylbenzonitrile (363 mg, 2.50 mmol, 1.0 equivalent) were charged into the apparatus successively, and the interior of the apparatus was replaced with nitrogen gas. Next, dehydrated ethanol (2.5 mL) was charged into the apparatus, The interior of the apparatus was replaced with hydrogen gas to set the internal pressure to 1 MPa, followed by stirring the reaction solution at 50° C. for 5 hours to produce a desired (S)-4-(1-hydroxyethyl)benzonitrile ((S)-6-2). Conversion: >99%; Selectivity: >99%; Optical Purity: 97.6% ee (according to GC analysis), Note that the GC retention times of each compound were as follows: 4-Acetylbenzonitrile: 6.8 minutes; (R)-4-(1-Hydroxyethyl)benzonitrile: 19.6 minutes; (S)-4-(1-1-lydroxyethyl)benzonitrile: 21.2 minutes.

Example 17

Production of methyl (S)-4-(1-hydroxyethyl)benzoate ((S)-6-3) by asymmetric hydrogenation of methyl 4-acetylbenzoate (5-3) using Ru($\eta^1$-$BH_4$)[(1S,2R)-daipena][(R.)-dm-binap] ((1S,2R,aR)-1'-$A_3$) as a catalyst (Formula 28)

Formula 28

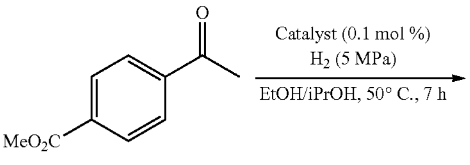

(5-3)

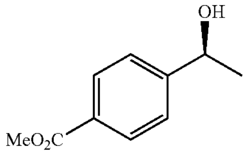

((S)-6-3)

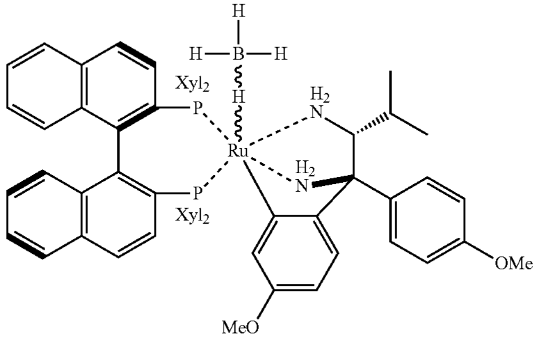

Catalyst:
Ru($\eta^1$-$BH_4$)[(1S,2R)-daipena][(R)-dm-binap]
((1S,2R,aR)-1'-$A_3$)
Result:
Conv. >99%, Sel. >99%
96.0% ee After attaching a magnetic stirring bar to a 50 mL stainless steel autoclave apparatus, the ruthenium complex ((1S,2R,aR)-1'-$A_3$) of the present invention produced in Example 6, Ru($\eta^1$-$BH_4$)[(1S,2R)-daipena][(R)-dm-binap] (Purity: 98.8% by weight, 1,2 mg, 0.1 mol %), and methyl 4-acetylbenzoate (178 mg, 1.00 mmol, 1.0 equivalent) were charged into the apparatus successively, and the interior of the apparatus was replaced with nitrogen gas. Next, dehydrated ethanol (2.0 mL) and dehydrated isopropyl alcohol (2.0 mL) were charged into the apparatus successively. The interior of the apparatus was replaced with hydrogen gas to set the internal pressure to 5 MPa, followed by stirring the reaction solution at 50° C. for 7 hours to produce a desired methyl (S)-4-(1-hydroxyethyl)benzoate ((S)-6-3). Conversion: >99%; Selectivity: >99%; Optical Purity: 96,0% ee (according to GC analysis). Note that the GC retention times of each compound were as follows: Methyl 4-acetylbenzoate: 8.6 minutes; Methyl (R)-4-(1-hydroxyethyl)benzoate: 18.2 minutes; Methyl (S)-4-(1-hydroxyethypbenzoate: 19.0 minutes.

As shown in Examples 16 and 17, the asymmetric hydrogenation of the unsymmetrical ketones having a cyano group or a tnethoxycarbonyl group, which tend to decompose in basic conditions, proceeded in a highly stereoselective manner without any loss of such functional groups to produce the desired optically active secondary alcohols in high yield by using the ruthenium complex (1) of the present invention, which does not require a base for its activation, as a catalyst. These results clearly demonstrate the usefulness of the ruthenium complex (1) of the present invention, which exhibits catalytic activity without the addition of a base.

While the present invention has been described in detail and with reference to specific embodiments thereof, it will be apparent to those skilled in the art that various changes and modifications can be made without departing from the spirit and scope of the present invention. This application is based on a Japanese patent application filed on Oct. 19, 2020 (Japanese Patent Application No. 2020-175074), the contents of which are incorporated herein by reference.

INDUSTRIAL APPLICABILITY

The ruthenium complex (1) can be easily synthesized by the reaction of the conventional complex (2) with a borohydride compound and has various advantages such as excellent crystallinity and stability, as well as exhibiting catalytic activity without the addition of a base. Furthermore, the asymmetric hydrogenation of unsymmetrical ketones (5) catalyzed by the ruthenium complex (1) can efficiently produce industrially useful optically , active secondary alcohols (6) without any loss of functional groups which tend to decompose under basic conditions.

The invention claimed is:

1. A ruthenium complex represented by following general formula (1):

(1)

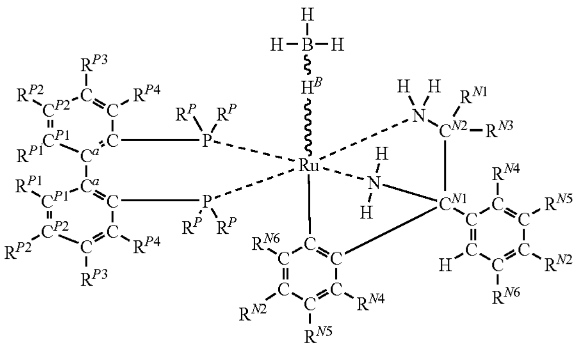

wherein a solid line represents a single bond, a double line represents a double bond, a dashed line represents a coordinate bond, and a wavy line represents three-center two-electron bond; B represents a boron atom, N represents a nitrogen atom, and P represents a phosphorus atom; H and $H^B$ each represents a hydrogen atom; C, $C^{P1}$, $C^{P2}$, $C^a$, $C^{N1}$, and $C^{N2}$ each represents a carbon atom; Ru represents a divalent ruthenium ion; $R^P$ represents a group selected from the group consisting of an alkyl group, a cycloalkyl group, a heteroaryl group, and an aryl group which may have a substituent; $R^{P1}$, $R^{P2}$, $R^{P3}$, and $R^{P4}$ each independently represents a hydrogen atom, or a group selected from the group consisting of an alkyl group, an alkenyl group, an alkoxy group, a halogenoalkoxy group, a hydroxy group, and a halogeno group; $R^{P1}$ and $R^{P2}$ may combine with each other to form a ring with $C^{P1}$ and $C^{P2}$, $R^{N1}$ and $R^{N3}$ each independently represents a hydrogen atom, or a group selected from the group consisting of an alkyl group, an aryl group, and an aralkyl group; $R^{N2}$, $R^{N4}$, $R^{N5}$, and $R^{N6}$ each independently represents a hydrogen atom, or a group selected from the group consisting of an alkyl group, a halogenoalkyl group, an alkoxy group, and a halogeno group.

2. The ruthenium complex according to claim 1, wherein $R^P$ is an aryl group which may have a substituent.

3. The ruthenium complex according to claim 2, wherein $R^{P3}$, $R^{P4}$, $R^{N3}$, $R^{N4}$, $R^{N5}$, and $R^{N6}$ are all hydrogen atoms.

4. The ruthenium complex according to claim 3, which is an optically active substance.

5. A method for producing the ruthenium complex according to claim 1, comprising a step of reacting a ruthenium complex represented by following general formula (2) with a borohydride compound, (2)

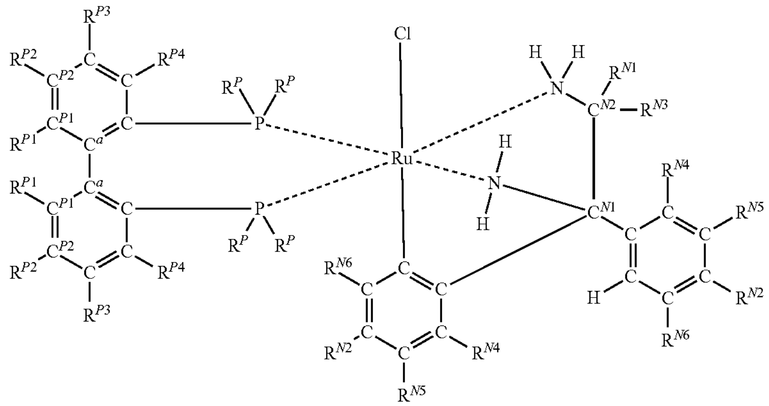

wherein a solid line represents a single bond, a double line represents a double bond, and a dashed line represents a coordinate bond; Cl represents a chlorine atom, H represents a hydrogen atom, N represents a nitrogen atom, and P represents a phosphorus atom; C, $C^{P1}$, $C^{P2}$, $C^{a}$, $C^{N1}$, and $C^{N2}$ each represents a carbon atom; Ru represents a divalent ruthenium ion; $R^{P}$ represents a group selected from the group consisting of an alkyl group, a cycloalkyl group, a heteroaryl group, and an aryl group which may have a substituent; $R^{P1}$, $R^{P2}$, $R^{P3}$, and $R^{P4}$ each independently represents a hydrogen atom, or a group selected from the group consisting of an alkyl group, an alkenyl group, an alkoxy group, a halogenoalkoxy group, a hydroxy group, and a halogeno group; $R^{P1}$ and $R^{P2}$ may combine with each other to form a ring with $C^{P1}$ and $C^{P2}$; $R^{N1}$ and $R^{N3}$ each independently represents a hydrogen atom, or a group selected from the group consisting of an alkyl group, an aryl group, and an aralkyl group; $R^{N2}$, $R^{N4}$, $R^{N5}$, and $R^{N6}$ each independently represents a hydrogen atom, or a group selected from the group consisting of an alkyl group, a halogenoalkyl group, an alkoxy group, and a halogeno group.

6. The method according to claim 5, wherein the borohydride compound is sodium borohydride.

7. A method for producing optically active secondary alcohols by catalytic asymmetric hydrogenation of unsymmetrical ketones comprising a step of reacting unsymmetrical ketones in the presence of the ruthenium complex according to claim 4 as a catalyst.

* * * * *